United States Patent
Hefner, Jr. et al.

(10) Patent No.: US 10,414,866 B2
(45) Date of Patent: Sep. 17, 2019

(54) TROGER'S BASE POLYMERS HAVING INTRINSIC MICROPOROSITY

(71) Applicant: Dow Global Technologies LLC, Midland, WI (US)

(72) Inventors: Robert E. Hefner, Jr., Rosharon, TX (US); Ian A. Tomlinson, Midland, MI (US); Brian L. Cramm, Lake Jackson, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 15/773,594

(22) PCT Filed: Nov. 10, 2016

(86) PCT No.: PCT/US2016/061214
§ 371 (c)(1),
(2) Date: May 4, 2018

(87) PCT Pub. No.: WO2017/091357
PCT Pub. Date: Jun. 1, 2017

(65) Prior Publication Data
US 2018/0319937 A1    Nov. 8, 2018

Related U.S. Application Data

(60) Provisional application No. 62/259,127, filed on Nov. 24, 2015, provisional application No. 62/410,415, filed on Oct. 20, 2016.

(51) Int. Cl.
| | |
|---|---|
| B01D 53/22 | (2006.01) |
| B01D 71/62 | (2006.01) |
| C08G 73/06 | (2006.01) |
| B01D 69/02 | (2006.01) |
| B01J 20/26 | (2006.01) |
| B01J 20/28 | (2006.01) |

(52) U.S. Cl.
CPC ....... *C08G 73/0694* (2013.01); *B01D 53/228* (2013.01); *B01D 69/02* (2013.01); *B01D 71/62* (2013.01); *B01J 20/267* (2013.01); *B01J 20/28033* (2013.01); *B01D 2325/02* (2013.01)

(58) Field of Classification Search
CPC .............................. C08G 73/06; C08G 73/0694
USPC ....................................................... 528/418
See application file for complete search history.

(56) References Cited

U.S. PATENT DOCUMENTS

| | | |
|---|---|---|
| 3,514,447 A | 5/1970 | Church |
| 3,694,410 A | 9/1972 | Oehmke |
| 4,094,852 A | 6/1978 | Sundermann et al. |
| 4,623,701 A | 11/1986 | Massingill |
| 4,701,566 A | 10/1987 | Faler et al. |
| 5,339,783 A | 8/1994 | Teichert |
| 5,629,084 A | 5/1997 | Moya |
| 5,736,620 A | 4/1998 | Earls et al. |
| 7,410,525 B1 | 8/2008 | Liu et al. |
| 7,485,173 B1 | 2/2009 | Liu et al. |
| 7,690,514 B2 | 4/2010 | McKeown et al. |
| 7,758,751 B1 | 7/2010 | Liu et al. |
| 7,771,857 B2 | 8/2010 | Fritsch et al. |
| 7,806,962 B2 | 10/2010 | Liu et al. |
| 7,943,543 B1 | 5/2011 | Liu et al. |
| 8,048,198 B2 | 11/2011 | Liu et al. |
| 8,056,732 B2 | 11/2011 | McKeown et al. |
| 8,132,677 B2 | 3/2012 | Liu et al. |
| 8,575,414 B2 | 11/2013 | Liu et al. |
| 8,613,362 B2 | 12/2013 | Liu et al. |
| 8,623,928 B2 | 1/2014 | Du et al. |
| 8,686,104 B2 | 4/2014 | Du et al. |
| 8,809,488 B2 | 8/2014 | Du et al. |
| 8,814,982 B2 | 8/2014 | Liu et al. |
| 8,894,859 B2 | 11/2014 | Livingston et al. |
| 8,969,628 B2 | 3/2015 | Priske et al. |
| 9,018,270 B2 | 4/2015 | McKeown et al. |
| 9,126,185 B2 | 9/2015 | Laskoski |
| 9,238,202 B2 | 1/2016 | Liskey et al. |
| 2004/0198587 A1 | 10/2004 | McKeown et al. |
| 2006/0246273 A1 | 11/2006 | McKeown et al. |
| 2007/0209505 A1 | 9/2007 | Liu et al. |

(Continued)

FOREIGN PATENT DOCUMENTS

| | | |
|---|---|---|
| KR | 20150027605 | 3/2015 |
| WO | 2005113121 | 12/2005 |

(Continued)

OTHER PUBLICATIONS

Grogojo et al., Adv. Funct. Mater. 2014, 24, 4729-4737.

(Continued)

*Primary Examiner* — Duc Truong

(57) ABSTRACT

A polymer including a sub-unit comprising a Troger's base moiety represented by: Formula (I) wherein L comprises an arylene group including at least one substituent group selected from: i) a crosslinking bond and ii) a functional group selected from at least one of: hydroxyl, phosphonic acid, carboxylic acid and sulfonic acid and their corresponding salt or ester; alkynyl, alkynyl ether, cyanate, epoxide, glycidyl ether or ester.

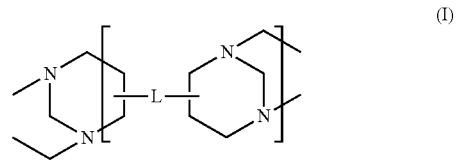

(I)

6 Claims, No Drawings

(56) References Cited

U.S. PATENT DOCUMENTS

| | | |
|---|---|---|
| 2009/0031897 A1 | 2/2009 | Liu et al. |
| 2009/0120875 A1 | 5/2009 | Liu et al. |
| 2009/0155464 A1 | 6/2009 | Liu et al. |
| 2010/0130634 A1 | 5/2010 | Fritsch |
| 2012/0157743 A1 | 6/2012 | Liu et al. |
| 2012/0273421 A1 | 11/2012 | Perry et al. |
| 2013/0085191 A1 | 4/2013 | Laskoski |
| 2013/0112619 A1 | 5/2013 | Livingston et al. |
| 2013/0146538 A1 | 6/2013 | Liu et al. |
| 2013/0172433 A1 | 7/2013 | McKeown et al. |
| 2013/0217799 A1 | 8/2013 | Visser et al. |
| 2013/0247756 A1 | 9/2013 | Li et al. |
| 2013/0267616 A1 | 10/2013 | McKeown et al. |
| 2014/0251897 A1 | 9/2014 | Livingston et al. |
| 2014/0255636 A1 | 9/2014 | Odeh et al. |
| 2015/0148439 A1 | 5/2015 | Eddaoudi et al. |
| 2015/0165383 A1 | 6/2015 | Liskey et al. |
| 2015/0239806 A1 | 8/2015 | Wendland |

FOREIGN PATENT DOCUMENTS

| | | |
|---|---|---|
| WO | 2012035328 | 3/2012 |
| WO | 2014186108 | 11/2014 |
| WO | 2015018576 | 2/2015 |
| WO | 2015095026 | 6/2015 |
| WO | 2015095034 | 6/2015 |
| WO | 2015095044 | 6/2015 |
| WO | 2015129925 | 9/2015 |
| WO | 2016148869 | 9/2016 |
| WO | 2016161367 | 10/2016 |
| WO | 2016195977 | 12/2016 |
| WO | 2016206008 | 12/2016 |
| WO | 2017030450 | 2/2017 |
| WO | 2017091357 | 6/2017 |
| WO | 2018048515 | 3/2018 |
| WO | 2018057119 | 3/2018 |

OTHER PUBLICATIONS

Fritsch et al., Journal of Membrane Science 401-402 (2012) 222-231.

Xiaohua Ma et al., Synthesis and Gas Transport Properties of Hydroxyl-Functionalized Polyimides with Intrinsic Microporosity, Macromolecules, vol. 45, No. 9 (May 8, 2012).

Xiaohula Ma et al., Novel Spirobifluorene and Dibromospirobifluorene-based Polyimides of Intrinsic Microporosity for Gas Separation Applications, Macromolecules, vol. 46, No. 24, (Dec. 23, 2013).

Fu Yun Li et al., High-Performance Thermally Self-Cross-Linked Polymer of Intrinsic Microporosity (PIM-1) Membranes for Energy Development, Macromolecules, vol. 45, No. 3, (Feb. 14, 2012).

McKeown, et al., Polymers of Intrinsic Microporosity, Enc. Polymer Sci. & Tech., John Wiley & Sons Ltd., (2009).

Pinnau, I. et al., Hydrocarbon/hydrogen mixed gas permeation in PTMSP, poly(1-phenyl-1-propyne) (PPP), and PTMSP/PPP blends, J. Polymer Sci. Part B: Polymer Physics, 34, 15 (1996) 2612-2621.

Pinnau, I and Toy, L.G. (1996) Transport of organic vapors through PTMSP, J. Mem. Sci., 116, 199.

Budd, P.M. et al. (2004) PIMs: robust, solution-processable, organic nanoporous materials, Chem. Commun., (2), 230-231.

Mckeown, Budd, et al., Polymers of Intrinsic Microporosity (PIMS): Bridging the Void between Microporous and Polymeric Materials, Chem. Eur. J. (2005), 2610-2620.

Budd, McKeown & Fritsch, Free Volume and Intrinsic Microporosity in Polymers, J. Mater. Chem. (2005) 15, 1977-1986.

Budd, McKeown, Fritsch, et al., Gas Separation Membranes from Polymers of Intrinsic Microporosity, J. Mem. Sci. 251, (2005) 263-269.

Budd, McKeown & Fritsch, Polymers of Intrinsic Microporosity (PIMS): High Free Volume Polymer for Membrane Applications, Macromol. Symp., 245-246 (2006) 403-405.

Xinhuai Ye, et al., Synthesis and Characterization of New Sulfonated Polyimides as Proton-Exchange Membranes for Fuel Cells, J. Mem. Sci, 279, issues 1-2 (2006) 570-577.

Thomas, S. et al., Pure and mixed-gas permeation properties of a microporous spirobisindane-based ladder polymer (PIM-1), J. Mem. Sci. 333 (2009) 125-131.

Naiying Du, et al., Azide-based Cross-Linking of Polymers of Intrinsic Microporosity (PIMs) for Condensable Gas Separation, Macromolecular Rapid Communication, (2011), 32, 631-636.

Ma, et al., Macromolecules 45 (2012) 3841.

Choi, et al., Bulletin of the Korean Chemical Society 34, 12 (2013) 3888.

Xin Du, et al., Troger's base-functionalised organic nanoporous polymer for heterogeneous catalysis, Chem. Commun., 2010, 46, 970-972.

TROGER'S BASE POLYMERS HAVING INTRINSIC MICROPOROSITY

FIELD

The invention relates to polymers having intrinsic microporosity, particularly polymers including a sub-unit including a Troger's based moiety. The subject polymers have particular utility as membranes useful in gas and liquid separations.

INTRODUCTION

Polymers with intrinsic microporosity (PIMs) are characterized by having macromolecular structures that are both rigid and contorted so as to have extremely large fractional free volumes. Examples include poly(1-trimethylsilyl-1-propyne) (PTMSP), poly(4-methyl-2-pentyne) (PMP) and polybenzodioxane (PIM-1). Because of their exceptional free volume, all are extremely permeable. See: Baker, Membrane Technology and Applications, $3^{rd}$ ed., (2012), and Polymers of Intrinsic Microporosity, Enc. Polymer Sci. & Tech., (2009)—both by John Wiley & Sons Ltd. See also: WO2016/148869; WO2005/113121; US2004/01985587; US2013/0146538; US2013/0172433; US2013/0267616; US2014/0251897; U.S. Pat. Nos. 9,018,270; 8,623,928; 8,575,414; 8,056,732; 7,943,543; 7,690,514 and 7,410,525 which are incorporated herein in their entirety. By way of example, US2014/0251897 describes a thin layer composite membrane including a thin selective layer of a networked microporous polymer having intrinsic microporosity formed via an interfacial polymerization of monomers having concavity (e.g. spirobisindanes, bisnapthalenes, ethanoanthracenes). Similarly, U.S. Pat. No. 9,018,270 describes an interfacial polymerization technique for preparing thin film composite membranes including a thin layer of PIMs. In one embodiment, the polymer includes a repeating unit including a Troger's base moiety, e.g.

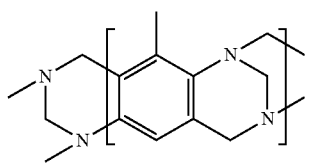

See also D. Xin et al., "Troger's base-functionalized organic nanoporous polymer for heterogeneous catalyst," Chem. Comm. (2009) pp. 970-972, which provides a description of the preparation of so-called Troger's base nanoporous polymers and their use as catalyst in the addition reaction of diethyl zinc to an aromatic aldehyde.

SUMMARY

The present invention includes "Troger's base" polymers having intrinsic microporosity and corresponding methods for making the same. The term "Troger's base polymer" refers to polymers including sub-units (and preferably repeating units) having a Troger's base moiety as represented by Formula I. In distinction to the polymers described in U.S. Pat. No. 9,018,270, the present invention includes embodiments that incorporate functional groups capable of reacting to form covalent crosslinks or activating unsubstituted arylene positions toward nucleophilic aromatic substitution to form covalent crosslinks, along with corresponding covalently crosslinked polymers. Covalently crosslinked embodiments have superior stability as compared with corresponding ionically crosslinked polymers. That being said, the subject polymers may include both or either covalent and ionic crosslinks. The crosslinked polymers of U.S. Pat. No. 9,018,270 are quaternary ammonium cationic polymers formed by reaction of an alkyl dihalide with the bicyclic diamine repeat unit in the polymeric backbone. Ionically crosslinked polymers of the present invention are formed via reaction of a pendant sulfonic acid moiety present on the aromatic ring of the Troger's base polymer with a diamine or polyamine (See reaction pathway XVI). This approach avoids quaternization of the bicyclic diamine ([1,5]diazocine) groups in the main chain of the Troger's base polymer as taught by U.S. Pat. No. 9,018,270. The prior art quaternization of bicyclic diamine groups in the main chains of the Troger's base polymer may be deleterious to nanoporosity and polymer stability. The novel ionically crosslinked amine sulfonate Troger's base polymers of the present invention can additionally be converted to highly preferred covalently crosslinked Troger's base polymers (See reaction pathway XVII), something that cannot be done with the ionically crosslinked polymers of U.S. Pat. No. 9,018,270. Embodiments including combinations of different polar functional groups provide a synthetic pathway for preparing polymers possessing novel solubility characteristics along with unique reactivity characteristics. In an alternative embodiment, the subject polymer may be chain terminated and then crosslinked through the polymer chain end groups, see for example Reaction pathways XXI, XXIV and accompanying text.

In one embodiment, the invention includes a polymer including a sub-unit (and more preferably a repeating unit) including a Troger's base moiety represented by Formula I:

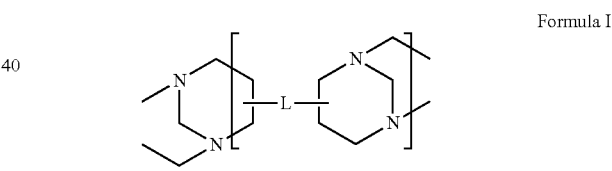

Formula I wherein L comprises an arylene group including at least one substituent group selected from: a crosslinking bond (preferably covalent) and a functional group selected from at least one of: hydroxyl, phosphonic acid, carboxylic acid and sulfonic acid and their corresponding salt or ester; alkynyl (having 1 to 6 carbon atoms); alkynyl ether (having 1 to 6 carbon atoms, e.g. propargyl ether), cyanate, epoxide, and glycidyl ether or ester. In one embodiment, the arylene group includes a ring or multi-ring moiety (e.g. preferably 1 to 3 rings, e.g. phenylene, biphenylene, napthalene and spirobisindane) fused to the Troger's base moiety. In preferred embodiments, the subject polymers having from 2 to 50 and more preferably from 3 to 20 repeating units as illustrated in Formula I. In additional embodiments, the invention includes thin films, coatings and membranes, (e.g. thin film composite membranes) made using the subject polymers, including B-stage and network forms of the polymers useful in the formation of such films, coatings and membranes.

In preferred embodiments, the subject polymers address one or more of the shortcomings associated with known PIMs technology, e.g. increased membrane durability, rejection, fouling resistance, rigidity and dimensional stability leading to better maintenance of nanoporous structure under varied end use conditions, better tolerance toward functional groups needed to enhance selectivity, improved processability and fabrication, higher glass transition temperature, higher thermal stability, higher thermooxidative stability, increased moisture resistance, increased resistance to acids and bases, and organic solvent resistance.

DETAILED DESCRIPTION

In a preferred embodiment, the subject polymers (also including copolymers, collectively referred to herein as "polymers") possess intrinsic microporosity. The term "intrinsic microporosity" refers to a polymer having a continuous network of interconnected intermolecular voids which form as a direct consequence of the shape and rigidity of at least a portion of the component monomers of the polymer. The term "microporous" refers to a material having an interconnected system of voids of a diameter less than 2 nm as defined by the IUPAC. Preferably, the subject polymers have average pore diameters of from 0.2 to 20 nm as determined by standard bubble point test (e.g. ASTM F316-03 (2011)). The copolymers also have high apparent surface areas (e.g. greater than 100 m$^2$/g, and more preferably greater than 150 m$^2$/g as determined by the Brunauer-Emmett-Teller (BET) method.

In several embodiments, the subject polymers are partially branched or branched, B-stage copolymers and networked copolymers. Partially branched or branched polymers are characterized as copolymers in which one of the component monomers contains three or more amine groups which are all capable of participating in the Troger's base forming reaction e.g. 1,3,5-triaminobenzene, tetrakis(4-aminophenyl)methane. The branched polymers of the present invention possess branches along the polymer chain. Thus, one end of the branch is connected to a polymer chain with the terminal end(s) of the branch remaining unconnected to another polymer chain. The branched polymers are generally formed by use of one or more aromatic primary triamine-containing reactants in the reaction to form the Troger's base polymer. The presence of the branched structure modifies packing of the polymer molecules, typically reducing the regularity of the packing and promoting chain entanglement. This may beneficially impact properties, such as solubility and processability. Crosslinked polymers of the present invention possess branches that connect polymer chains. The crosslinks typically reduce mobility of the polymer chains and produce a rigid network. Formal definitions for "branch" (1.53), "branch point" (1.54), "branch unit" (1.55), "network" (1.58), and "crosslink" (1.59), are given in: IUPAC INTERNATIONAL, Union Of Pure And Applied Chemistry Macromolecular Division Commission On Macromolecular Nomenclature, Glossary of Basic Terms in Polymer Science, A. D. Jenkins, P. Kratochvíl, R. F. T. Stepto, and U. W. Suter, Pure Appl. Chem., 68, 2287 (1996), which is included herein by reference in its entirety. The term "B-stage" is defined as "an intermediate stage in a thermosetting resin reaction in which the plastic softens but does not fuse when heated, and swells but does not dissolve in contact with certain liquids,"—see McGraw-Hill Dictionary of Scientific & Technical Terms, 6E, Copyright 2003 by The McGraw-Hill Companies, Inc. The term "network" is defined as a covalently crosslinked 3-dimension polymer network in contrast to a "non-network polymer" or linear polymer which does not having a covalently crosslinked 3-dimension network.

Membranes made using the subject polymers may be formed by conventional techniques, e.g. casting, in-situ polymerization upon a porous support, dip coating and subsequent polymerization or crosslinking onto a porous support, etc. Such membranes are useful in separations based upon the relative rates of mass transfer of different species across a membrane. A driving force, typically a pressure or a concentration difference, is applied across the membrane so that selected species preferentially pass across the membrane. The membranes may be used for purification, separation or adsorption of a particular species (e.g. salts, organics, ionic species) in the liquid (e.g. aqueous, organic) or gas phase. In particular, the subject membranes exhibit excellent pH and solvent stability and as a consequence, are suitable for use in a wide range of applications including: gas separation, ion exchange, water softening, water purification, ultra high purity water production in applications such as electronics, metal separation including rare earths, catalysis, remediation of mining waste water, uranium processing, leach mining, and processing of liquids in dairy, sugar, fruit juice and pharmaceuticals and ethanol production in a continuous fermentation/membrane pervaporation system. In specific embodiments, the subject copolymers include hydrophilic functional groups, e.g. hydroxyl, carboxylic acid, and/or sulfonic acid that provide improved selectivity in many applications.

The subject membrane is not particularly limited to a specific type, construction or application. For example, the subject polymers may be fabricated into flat sheet (film), tubular and hollow fiber configurations that find utility in a variety of applications including gas separations, pervaporation, forward osmosis (FO), reverse osmosis (RO), nano-filtration (NF), ultra-filtration (UF), micro-filtration (MF) and pressure retarded fluid separations. One preferred design is a thin film composite structure, see for example WO 2005/113121 and US2014/0251897. With a thin film composite design a "thin film" of the subject polymer is formed upon a support using well known techniques, e.g. dip coating, casting, etc., a solution of the subject polymer and conducting a phase separation (e.g. via quench, cooling, etc.) to form the desired porosity. The polymer may additionally include one or more curing agents or co-reactants for crosslinking reaction, curing catalysts, cure accelerators or promoters, mixtures thereof and the like. The resulting membrane may be further subject to radiation, photo-curing, heating, chemical reaction or some combination thereof to facilitate crosslinking By way of a more specific example, the composite membrane may include a bottom layer (back side) of a nonwoven backing web (e.g. PET or polypropylene scrim), a middle layer of a porous support having a typical thickness of about 25-125 µm and top layer (front side) comprising a thin film polymer layer having a thickness typically less than about 1 micron, e.g. from 0.01 micron to 1 micron but more commonly from about 0.01 to 0.1 µm. The porous support is typically a polymeric material having pore sizes which are of sufficient size to permit essentially unrestricted passage of permeate but not large enough so as to interfere with the bridging over of a thin film polymer layer formed thereon. For example, the pore size of the support preferably ranges from about 0.001 to 0.5 µm. Non-limiting examples of porous supports include those made of: polyetheretherketone, polysulfone, polyether sulfone, polyimide, polyamide, polyetherimide, polyacrylonitrile, crosslinked polyacrylonitrile, poly(methyl methacrylate), polyethylene, polypropylene, and various halogenated polymers such as polyvinylidene fluoride. For most applications, the porous support provides strength but offers little resistance to fluid flow due to its relatively high porosity.

It is to be understood that the formulae and reaction pathways provided herein are not intended to represent every possible regioisomer and combination of regioisomers present. Likewise, the formulae and reaction pathways do not show the chiral centers and combination of diasteroisomers which may be present. Nevertheless, those skilled in the art will appreciate that such species form part of the present invention. Tetrahedron Letters, 45, pages 5601-5604 (2004) is representative of the literature providing discussion and illustration of various isomeric forms present in Troger's bases.

The invention includes polymers having intrinsic microporosity and membranes made therefrom. In one embodiment, the invention includes a polymer including a sub-unit (and more preferably a repeating unit) including a Troger's base moiety represented by Formula I:

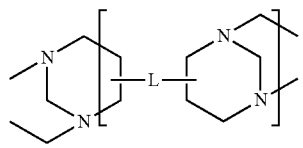

Formula I wherein L comprises an arylene group, e.g. a ring fused to the Troger's base moiety (e.g. phenylene,) or a multi-ring moiety (e.g. 2 to 4 rings) fused to the Troger's base moiety (e.g. biphenylene, napthalene and spirobisindane), where the arylene group includes at least one substituent group selected from: i) a crosslinking bond and ii) a functional group selected from at least one of: hydroxyl, phosphonic acid, carboxylic acid and sulfonic acid and their corresponding salt or ester; alkynyl (having 1 to 6 carbon atoms); alkynyl ether (having 1 to 6 carbon atoms, e.g. propargyl ether), cyanate, epoxide, and glycidyl ether or ester.

Representative examples of preferred polymers (and copolymers) include those having repeating units as represented in the following formulae along with their regioisomers:

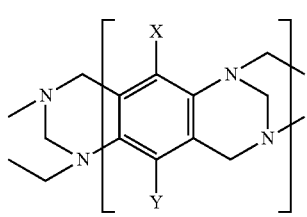

Formula IIa

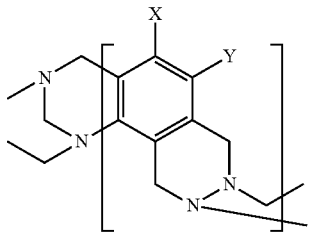

Formula IIb

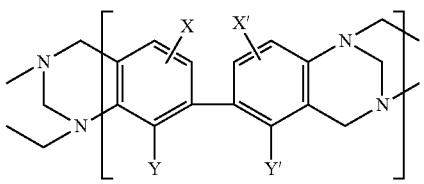

Formula III

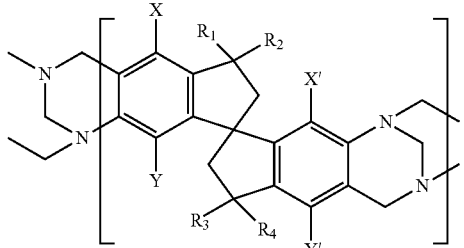

Formula IVa

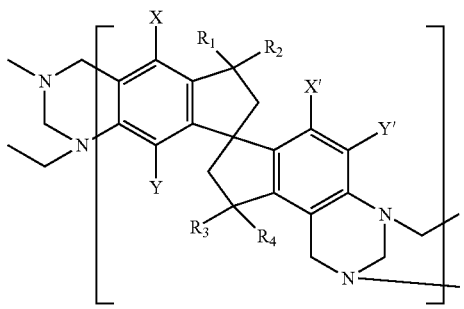

Formula IVb

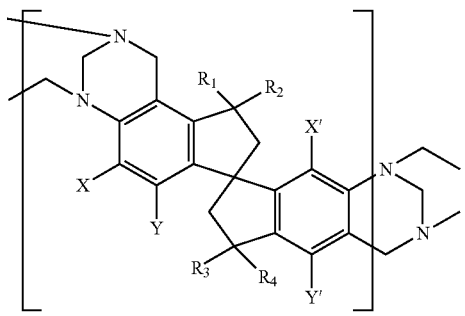

Formula IVc wherein: X and Y, and X' and Y' are independently selected from: a crosslinking bond (preferably covalent), hydroxyl, phosphonic acid, carboxylic acid and sulfonic acid and their corresponding salt or ester; alkynyl (having from 1 to 6 carbon atoms), alkynyl ether (having from 1 to 6 carbon atoms, e.g. propargyl ether), cyanate, epoxide, glycidyl ether or ester, and hydrogen with the proviso that no more than three of X, Y, X' and Y' are hydrogen.

$R_1$, $R_2$, $R_3$, and $R_4$ are independently selected from alkyl groups comprising from 1 to 6 carbon atoms, and $R_1$ and $R_2$ may collectively form a ketone group or a 9,9'-fluorene group, and $R_3$ and $R_4$ may collectively form a ketone group or a 9,9'-fluorene group. In a preferred embodiment, the polymer is covalently crosslinkable or covalently crosslinked (e.g. at least one of X, X', Y and Y' is a group which may be reacted to form a covalent crosslink bond, a covalent crosslink bond, a functional group that activates the arylene ring for nucleophilic substitution (e.g. a hydroxyl group that activates the aromatic ring toward nucleophilic substitution and crosslinking, e.g. by a bisdiazonium salt) or a functional group that favors reaction with nitrene and/or free radical intermediates (e.g., an isopropyl group providing C—H reactive with the nitrene intermediate from a bis(azide) or bis(sulfonyl azide).

Representative species of repeating units are shown below.

Formula V

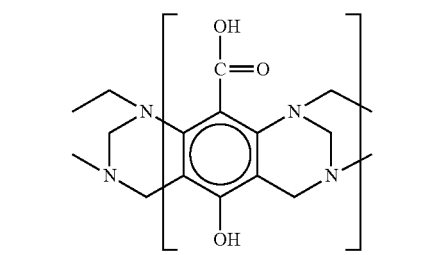

Formula VI

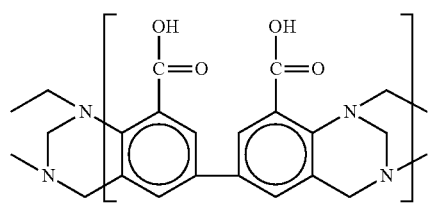

Formula VII

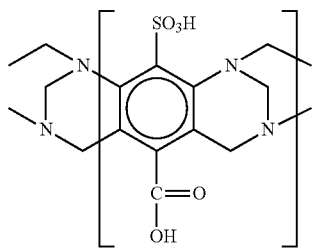

Formula VIII

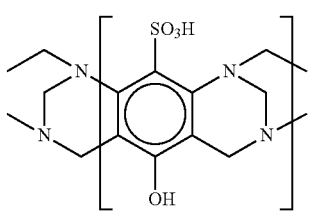

Formula IX

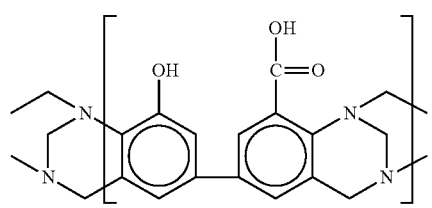

Formula X

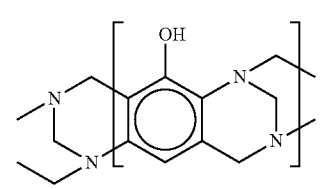

Formula XI

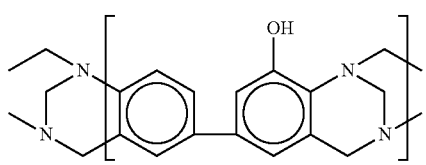

Formula XII

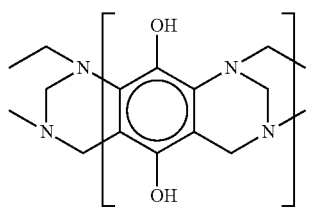

Formula XIII

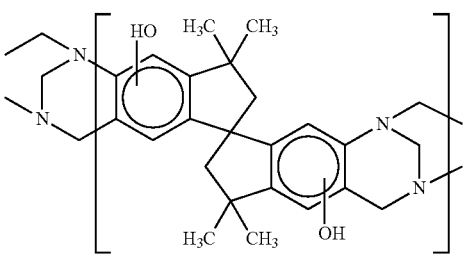

Formula XIV

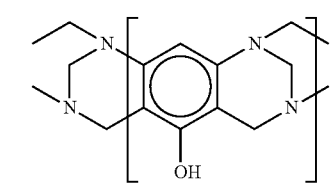

The subject polymer may be prepared using known starting materials and techniques.

Several representative reaction pathways are provided below, where the abbreviation TFA is for trifluoroacetic acid.

Reaction Pathway I:

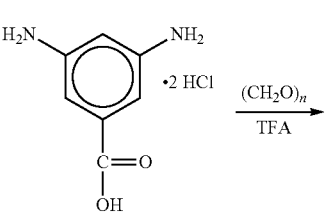

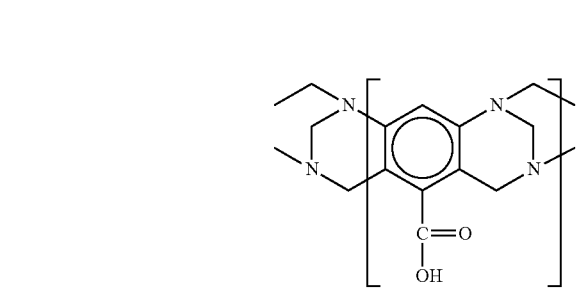

Reaction Pathway II:

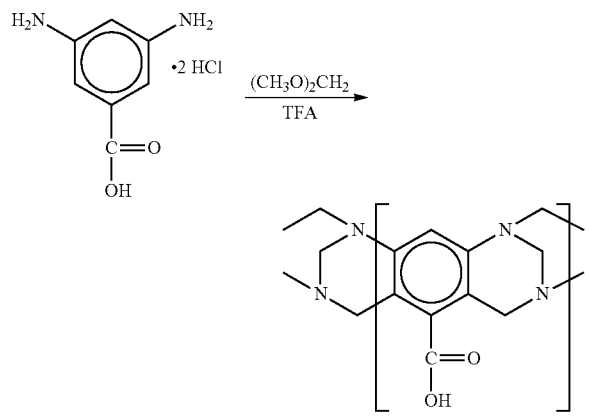

Reaction Pathway III:

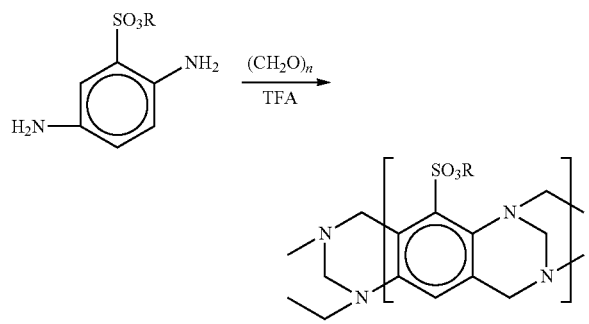

R = H, Na

Reaction Pathway IV:

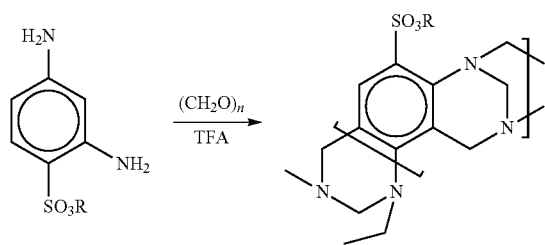

R = H, Na

Reaction Pathway V:

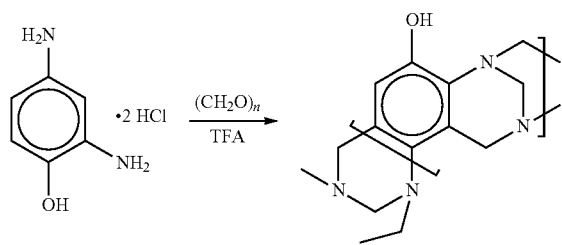

Reaction Pathway VI:

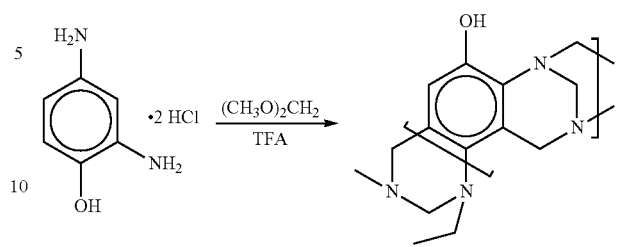

Reaction Pathway VII:

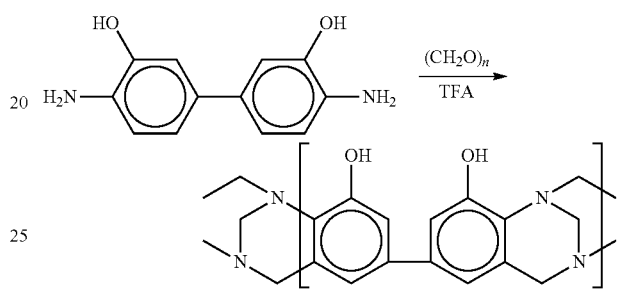

The subject polymers may include additional repeating units or branching or both, i.e. be to formed via a copolymerization; however, the subject polymers preferably comprise at least 50 molar %, 75 molar % and more preferably at least 90 molar % of repeating units represented by Formula I (e.g. 50-100 molar %, 75-100 molar % and 90 to 100 molar % of the subject monomers).

A number of variations of the polymer synthesis are useful for modifying the physical and mechanical properties of the polymer. These variations include structural changes in the co-monomers employed and changes in the stoichiometric ratio of co-monomers employed. Examples of structural changes in the co-monomers employed include addition of one or more substituents to the "L" moiety and variations of co-monomers. Changes in the stoichiometric ratio of co-monomers employed include: variations in equivalent ratio of co-monomers used (can markedly change molecular weight and/or crosslink density and/or hydrophilic functional groups present), inclusion of additional co-monomers. The functionalization of the finished thermoplastic polymers, e.g., to introduce O-carboxymethyl or O-alkyl sulfonic acid substituents, makes a good extension on the membrane separation application. The high hydrophilicity and surface charge are preferred for higher selectivity in gas separations, or water flux and solute rejection in liquid separations. A representative reaction pathway is provided below where the two separate structural units present in the copolymer are separately shown.

Reaction Pathway VIII:

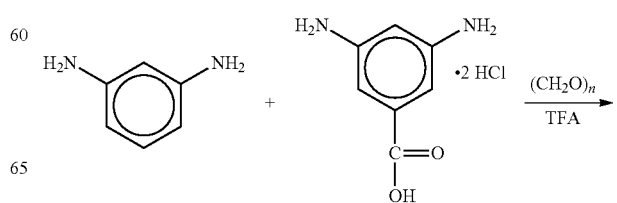

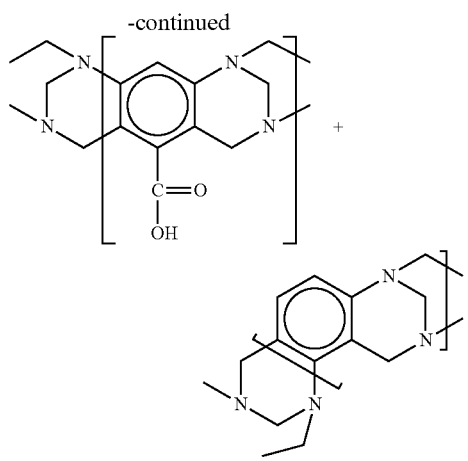

Many classic techniques for crosslinking polymers are applicable for crosslinking the subject polymers, e.g. amide formation can be adapted for crosslinking of the copolymers containing carboxylic acid groups. Formation of the amide typically requires activation of the carboxylic acid moiety with a coupling reagent. This activation converts the hydroxyl group of the carboxylic acid to a suitable leaving group, thus avoiding formation of a carboxylic acid salt with the amine reactant.

The reaction of the activated intermediate with the amine is the coupling reaction and the activator used is the coupling reagent, see Han, S.-Y.; Kim, Y.-A.; Tetrahedron, 60, 2447 (2004). Depending upon the specific chemistry used, the reactive acylating agent may be formed in a separate reaction and then reacted with the amine or it may be formed in situ by adding the activating agent to the mixture of carboxylic acid and amine reactants. Additives, such as N-hydroxysuccinimide and 1-hydroxybenzotriazole, that enhance the reactivity of the coupling reagent, may also be used. A specific example is an additive that forms an active ester with the carboxylic acid, such as an O-acylisourea or a benzotriazole active ester. Coupling reagents may be prepared by reaction of a carboxylic acid ester to a hydrazide which is then further reacted with nitrous acid or an alkyl nitrite to give the azide for reaction with the amine reactant. Diphenylphosphoryl azide can perform coupling in the presence of a base as a single high yield step, see Shioiri, T.; Ninomiya, K.; Yamada, S.; J. Am. Chem. Soc. 94, 6203 (1972). Reaction of a carboxylic acid phosphinothioester with an azide provides a iminophosphorane that rearranges to an amido phosphonium salt which hydrolyzes to the amide, see Nilsson, B. L.; Hondal, R. J.; Soellner, M. B.; Raines, R. T.; J. Am. Chem. Soc. 125, 5268 (2003). A mixed anhydride, for example, generated via reaction of pivaloyl chloride with the carboxylic acid group, is then reacted with the amine reactant to produce the amide. Ethyl chloroformate or isobutyl chloroformate are also used for synthesis of mixed carbonic anhydrides. A separate reaction of the carboxylic acid with the chloroformate is typically followed by reaction of the resultant mixed carbonic anhydride with the amine compound. Mixed ethyl carbonic anhydrides can be synthesized via reaction of a carboxylic acid with 1-ethoxycarbonyl-2-ethoxy-1,2-dihydroquinoline in the presence of the amino component as a single step direct coupling, see Belleau, B.; Malek, G.; J. Am. Chem. Soc. 90 (1968). Carboxylic acids may be crosslinked by a primary amine compound in the presence of a carbodiimide compound to prepare an oligomer or polymer simultaneously containing nanoporosity. In the reaction, one or more carboxylic acid groups are reacted with one or more primary amine containing compounds (monoamine, diamine, and/or polyamines may be used) and one or more carbodiimide crosslinking agents. For to crosslinking in aqueous media, a water-soluble carbodiimide is employed, such as 1-ethyl-3-(-3-dimethylaminopropyl) carbodiimide hydrochloride. For crosslinking in non-aqueous media, an organic solvent soluble carbodiimide is employed, such as N',N'-dicyclohexyl carbodiimide. In the crosslinking chemistry, the carbodiimide reacts with carboxylic acid group to form an active O-acylisourea intermediate that is easily displaced by nucleophilic attack from a primary amino group in the reaction mixture. Reaction with the primary amine results in an amide bond formed with the original carboxyl group, with the carbodiimide by-product released as an urea derivative. 1-Ethyl-3-(-3-dimethylamino propyl) carbodiimide hydrochloride crosslinking is most efficient in acidic (pH 4.5) conditions and must be performed in buffers devoid of extraneous carboxyls and amines. 4-Morpholinoethanesulfonic acid buffer is a suitable carbodiimide reaction buffer. Phosphate buffers and neutral pH (up to 7.2) conditions are compatible with the reaction chemistry, but with lower efficiency.

B-staging or prepolymerization of copolymerizable mixtures wherein at least one comonomer contains a thermosettable moiety can be accomplished by using lower temperatures and/or shorter curing times and/or reduced catalyst concentration. Curing of the thus formed B-staged (prepolymerized) copolymers can then be accomplished at a later time or immediately following B-staging (prepolymerization) by increasing the temperature and/or curing time.

One preferred class of embodiments of the present invention includes Troger's base polymers including an "L" moiety substituted with a cyanate group. A representative species of a cyanate-containing Troger's base is represented by Formula XV.

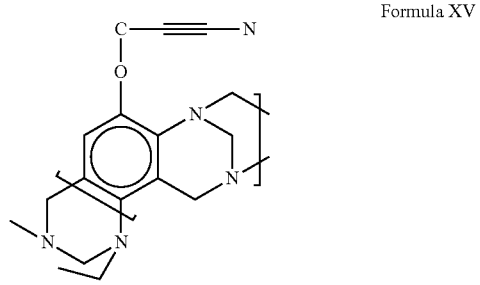

Formula XV

Such "polycyanates" may be prepared by reacting one or more of Troger's base polymers containing phenolic hydroxyl groups with a stoichiometric quantity or a slight stoichiometric excess (up to about 20 percent excess) of a cyanogen halide per phenolic hydroxyl group in the presence of a stoichiometric quantity or a slight stoichiometric excess (up to about 20 percent excess) of a base compound per phenolic hydroxyl group and in the presence of a suitable solvent. Reaction temperatures of from about −40° C. to about 60° C. are operable, with reaction temperatures of −15° C. to 10° C. being preferred, and reaction temperatures of −10° C. to 0° C. being most preferred. Reaction times can vary substantially, for example, as a function of the reactants being employed, the reaction temperature, solvent(s) used, the scale of the reaction, and the like, but are generally between 15 minutes and 4 hours, with reaction times of 30 minutes to 90 minutes being preferred. Suitable cyanogen halides include cyanogen chloride and cyanogen bromide. Alternately, the method of Martin and Bauer described in Organic Synthesis, volume 61, pages 35-68 (1983) published by John Wiley and Sons can be used to generate the required cyanogen halide in situ from sodium cyanide and a halogen such as chlorine or bromine. Suitable base compounds include both inorganic bases and tertiary amines such as sodium hydroxide, potassium hydroxide, trimethylamine, triethylamine, mixtures thereof, and the like. Triethylamine is most preferred as the base. Suitable solvents for the cyanation reaction include water, aliphatic ketones, chlorinated hydrocarbons, aliphatic and cycloaliphatic ethers and diethers, aromatic hydrocarbons, mixtures thereof and the like. Tetrahydrofuran, acetone, methylethylketone, methylene chloride or chloroform are particularly suitable as the solvent.

Such polycyanates may be crosslinked, ("cured" or "thermoset") by heating from about 50° C. to about 400° C. (preferably from 100° C. to 250° C.), optionally in the presence of a suitable catalyst. Suitable catalysts include, for example, acids, bases, salts, nitrogen and phosphorus compounds, such as for example, Lewis acids such as $AlCl_3$, $BF_3$, $FeCl_3$, $TiCl_4$, $ZnCl_2$, $SnCl_4$; protonic acids such as HCl, $H_3PO_4$; aromatic hydroxy compounds such as phenol, p-nitrophenol, pyrocatechol, dihydroxynaphthalene; sodium hydroxide, sodium methylate, sodium phenolate, trimethylamine, triethylamine, tributylamine, diazabicyclo[2.2.2]octane, quinoline, isoquinoline, tetrahydroisoquinoline, tetraethylammonium chloride, pyridine-N-oxide, tributyl phosphine, zinc octoate, tin octoate, zinc naphthenate, cobalt naphthenate, cobalt octoate, cobalt acetylacetonate and the like. Also suitable as catalysts are the metal chelates such as, for example, the chelates of transition metals and bidentate or tridentate ligands, particularly the chelates of iron, cobalt, zinc, copper, manganese, zirconium, titanium, vanadium, aluminum and magnesium. These and other operable catalysts are disclosed in U.S. Pat. Nos. 3,694,410 and 4,094,852 which are incorporated herein by reference in their entirety. Cobalt naphthenate, cobalt octoate and cobalt acetylacetonate are most preferred as the catalysts. The quantity of catalyst used, if any, depends on the structure of the particular catalyst, the structure of the polycyanate being cured, the cure temperature, the cure time, and the like. Generally, catalyst concentrations of from about 0.001 to about 2 percent by weight are preferred. The cured (thermoset) products prepared from the polycyanates possess the cyanate group homopolymerization structure, (the polytriazine ring) unless other functionalities are present in the polycyanate that participate in the curing process.

Another preferred class of embodiments of the present invention includes Troger's base polymers including an "L" moiety substituted with a glycidyl ether (or glycidyl ester) group. A representative species of a glycidyl ether-containing Troger's base is represented by Formula XVI.

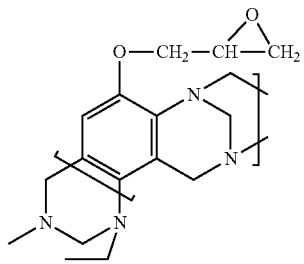

Formula XVI

The glycidyl ethers may be prepared by reacting a Troger's base polymer containing one or more to phenolic hydroxy groups with an epihalohydrin particularly in the presence of a suitable basic acting substance, in the presence or absence of a catalyst, and in the presence or absence of a solvent. The corresponding glycidyl esters also may be prepared by reacting a Troger's base polymer containing one or more carboxylic acid groups with an epihalohydrin particularly in the presence of a suitable basic acting substance, in the presence or absence of a catalyst, and in the presence or absence of a solvent. For the various embodiments, the reaction preferably takes place at a temperature of about 5° C. to about 75° C., more preferably at a temperature of about 10° C. to about 60° C., and most preferably at a temperature of about 20° C. to about 55° C. The reaction also preferably takes place at a pressure of about 30 mm Hg vacuum to about 690 KPa, more preferably at a pressure of about 30 mm Hg vacuum to about 345 KPa, and most preferably at a pressure of about 60 mm Hg vacuum to about 101 KPa (about 1 atmosphere). The reaction can take place at a time sufficient to complete the reaction, preferably from about 5 minutes to about 3 hours, more preferably from about 10 minutes to about 2 hour, and most preferably from about 15 minutes to about 1 hour. For the various embodiments, the reaction also uses from about 1.1:1 to 100:1, preferably from about 2:1 to about 50:1, and most preferably from about 5:1 to about 30:1 moles of epihalohydrin per phenolic hydroxy group. This initial reaction, unless the catalyst is an alkali metal or alkaline earth metal hydroxide employed in stoichiometric or greater quantities, produces a halohydrin intermediate which is then reacted with the basic acting substance to convert the vicinal halohydrin groups to epoxide groups. The resultant product is a glycidyl ether compound. Details concerning preparation of glycidyl ethers are given in U.S. Pat. No. 5,736,620; Handbook of Epoxy Resins by Lee and Neville, McGraw-Hill (1967); and Journal of Applied Polymer Science, volume 23, pages 1355-1372 (1972); and U.S. Pat. No. 4,623,701.

For the various embodiments, suitable epihalohydrins that can be employed include, for example, epichlorohydrin, epibromohydrin, epiiodohydrin, methylepichlorohydrin, methylepibromohydrin, methylepiiodohydrin and combinations thereof. Most preferred as the epihalohydrin is epichlorohydrin. A suitable basic acting substance is employed to prepare the glycidyl ethers, including, for example, the alkali metal or alkaline earth metal hydroxides, carbonates and bicarbonates, and combinations thereof. Particularly suitable compounds include sodium hydroxide, potassium hydroxide, lithium hydroxide, calcium hydroxide, barium hydroxide, magnesium hydroxide, manganese hydroxide, sodium carbonate, potassium carbonate, lithium carbonate, calcium carbonate, barium carbonate, magnesium carbonate, manganese carbonate, sodium bicarbonate, potassium bicarbonate, magnesium bicarbonate, lithium bicarbonate, calcium bicarbonate, barium bicarbonate, manganese bicarbonate and combinations thereof. Most preferred is sodium hydroxide or potassium hydroxide.

Catalysts that can optionally be employed to prepare the glycidyl ethers include, for example, the ammonium or phosphonium halides, such as, for example, benzyltrimethylammonium chloride, benzyltrimethylammonium bromide, tetrabutylammonium chloride, tetrabutylammonium bromide, tetraoctylammonium chloride, tetrabutylammonium bromide, tetramethylammonium chloride, tetramethylammonium bromide, tetrabutylphosphonium chloride, tetrabutylphosphonium bromide, tetrabutylphosphonium iodide, ethyltriphenylphosphonium chloride, ethyltriphenylphosphonium bromide, ethyltriphenylphosphonium iodide and combinations thereof.

Suitable solvents that can optionally be employed to prepare the glycidyl ethers include aliphatic and aromatic hydrocarbons, aliphatic secondary alcohols, halogenated aliphatic hydrocarbons, aliphatic ethers, aliphatic nitriles, cyclic ethers, ketones, amides, sulfoxides, and combinations thereof. Particularly suitable solvents include pentane, hexane, octane, toluene, xylene, methylethylketone, methylisobutylketone, N,N-dimethylformamide, dimethylsulfoxide, diethyl ether, tetrahydrofuran, 1,4-dioxane, dichloromethane, chloroform, ethylene dichloride, methyl chloroform, ethylene glycol dimethyl ether, N,N-dimethylacetamide, acetonitrile, isopropanol, isobutanol, propylene glycol monomethyl ether, and combinations thereof. The solvent may be removed at the completion of the reaction using conventional means, such as, for example, vacuum distillation. One possible process for preparing the glycidyl ethers is done in the absence of a solvent, where the epihalohydrin being used in the reaction, such as epichlorohydrin, is used in an amount to function as both the solvent and reactant.

Recovery and purification of the glycidyl ethers can be performed using a variety of methods. For example, gravity filtration, vacuum filtration, centrifugation, water washing or extraction, solvent extraction, decantation, column chromatography, vacuum distillation, falling film distillation, electrostatic coalescence, and other processing methods and the like may be used. Vacuum distillation is a most preferred method for removal and recovery of lighter boiling fractions, for example, unused epihalohydrin, which may then be recycled.

Numerous variations within the Troger's base polymer synthesis are useful for production of novel polymers with modified physical and mechanical properties. A particularly useful variation involves partial replacement of the monomer containing a polar functional group, such as for example, —OH, —COOH, or —SO$_3$H, with a non-functionalized monomer. A representative example is given in Reaction pathway IX where a portion of the —OH functional monomer, (2,4-diamino phenol) is replaced with a non-functional monomer; (e.g. 1,3-phenylenediamine) where the two separate structural units present in the copolymer are separately shown. This synthetic scheme can to be employed to produce Troger's base polymers with lesser amounts of —OH which are converted to the glycidyl ether or cyanate group and thermoset to produce lower crosslink density polymers. Additionally, incorporation of the non-functionalized monomer can beneficially modify solubility and processability of the resultant Troger's base polymer.

Reaction Pathway IX:

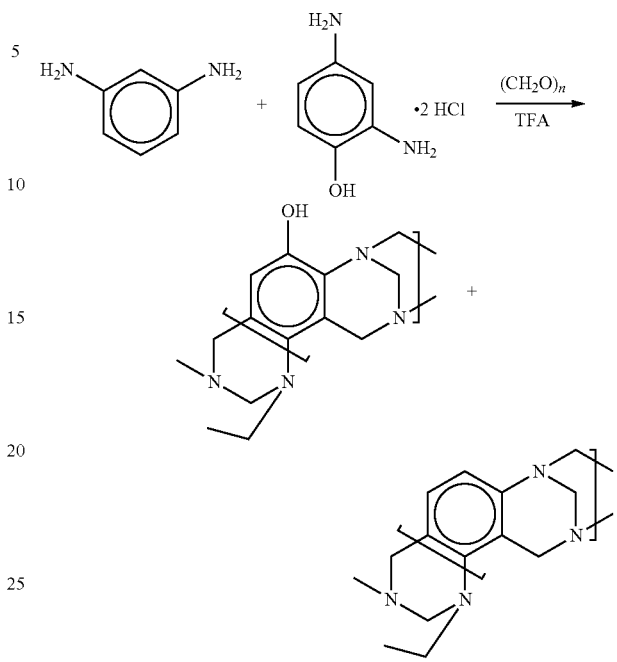

Another representative example is given in Reaction pathway X where a portion of the —SO$_3$H functional monomer, (2,5-diaminobenzenesulfonic acid); is replaced with the non-functional monomer; (1,3-phenylenediamine) where the two separate structural units present in the copolymer are separately shown. The Troger's base polymer made with only 2,5-diamino benzenesulfonic acid is partially water soluble and thus of limited utility in membranes or thin layer composites used with aqueous media (unless it is partially crosslinked). The Troger's base polymer made with 2,4-diaminobenzenesulfonic acid is even more water soluble and thus replacement with the non-functional monomer is particularly beneficial to reduce aqueous solubility. This synthetic scheme can be employed to produce Troger's base polymers with lesser amounts of —SO$_3$H and thus reduced solubility in aqueous media.

Reaction Pathway X:

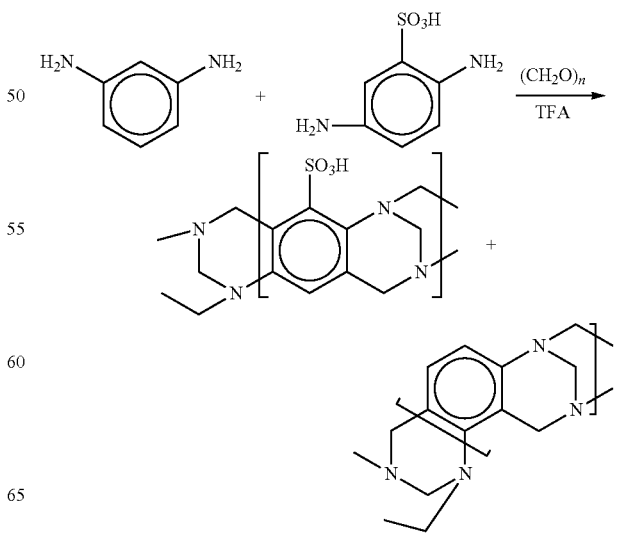

Another particularly useful variation involves partial replacement of the monomer containing functional group, such as, for example, —OH, —COOH, or —SO₃H; with a monomer containing a different functional group. A representative example is given in Reaction pathway XI where a —COOH functional monomer, e.g., 3,5-diaminobenzoic acid, and a —OH functional monomer, e.g., 2,4-diaminophenol, are copolymerized and where the two separate structural units present in the copolymer are separately shown. The Troger's base polymer made with only 3,5-diaminobenzoic acid has low organic solvent solubility, whereas the Troger's base polymer made to with 2,4-diaminophenol has comparatively much greater organic solvent solubility. Thus, this synthetic scheme can be employed to produce Troger's base polymers with —COOH functionality but with improved solubility in organic solvents. The improved solubility can aid in the preparation of membranes and thin film composites.

Reaction Pathway XI:

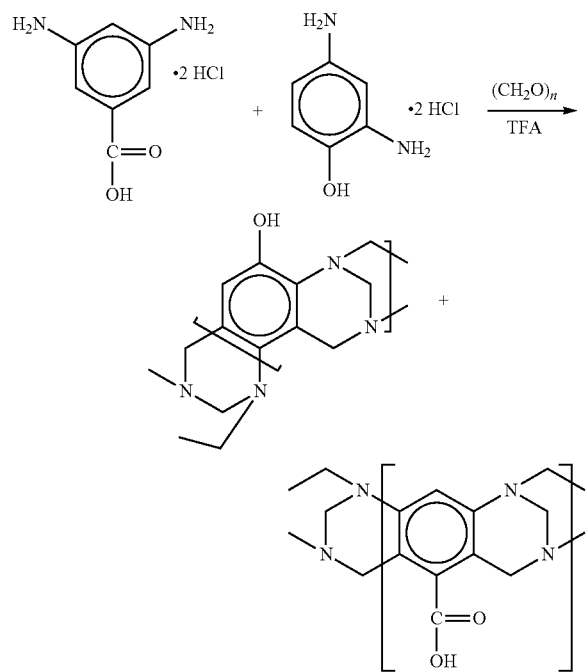

Yet another particularly useful variation involves use of a polyfunctional primary amino aromatic co-monomer to provide some extent of branching during the synthesis of the Troger's base copolymer. This is accomplished by partial replacement of the diamino monomer containing a functional group, such as, for example, —OH, —COOH, or —SO₃H, and optionally containing non-functionalized diamino monomer, with one or more poly functional amino aromatic monomers. A tetra functional amino aromatic compound is most preferred as the comonomer. A representative example is the replacement of 20% of the —NH₂ and —OH functional monomer, 2,4-diaminophenol with the tetra amino functional aromatic monomer, tetrakis(4-aminophenyl)methane. Other representative poly functional amino aromatic comonomers include 4,4',5,5-tetraamino-1,1'-binaphthyl; 2,2',7,7'-tetraamino-9,9'-spirobifluorene; 1,4,5,8-tetraamino-9,10-anthracenedione; and the following:

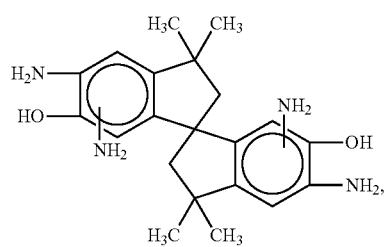

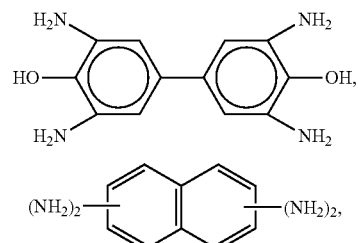

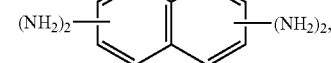

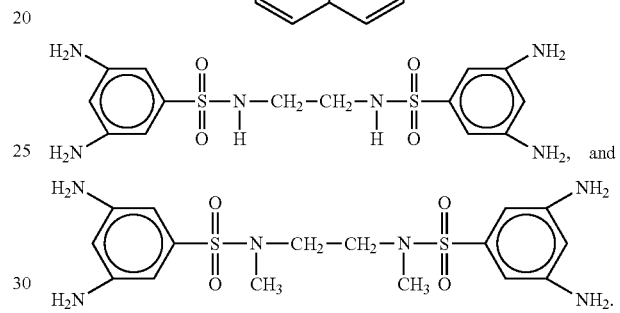

The synthesis of 4,4',5,5'-tetraamino-1,1'-binaphthyl is given in Journal of Chemical and Engineering Data, volume 18, number 1, pages 105-108 (1973). In Reaction pathways XII-XV the two separate structural units present in the copolymer are separately shown.

Reaction Pathway XII:

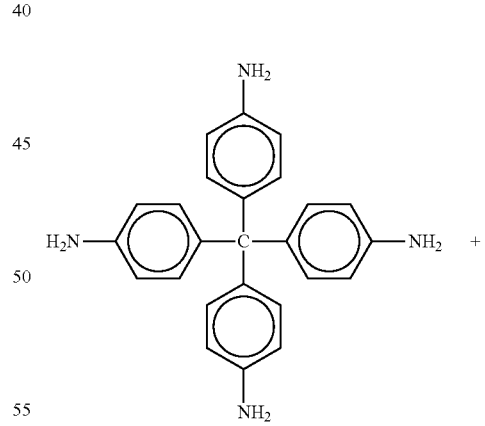

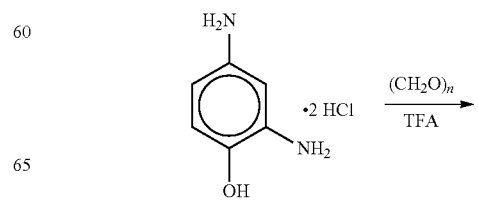

19
-continued
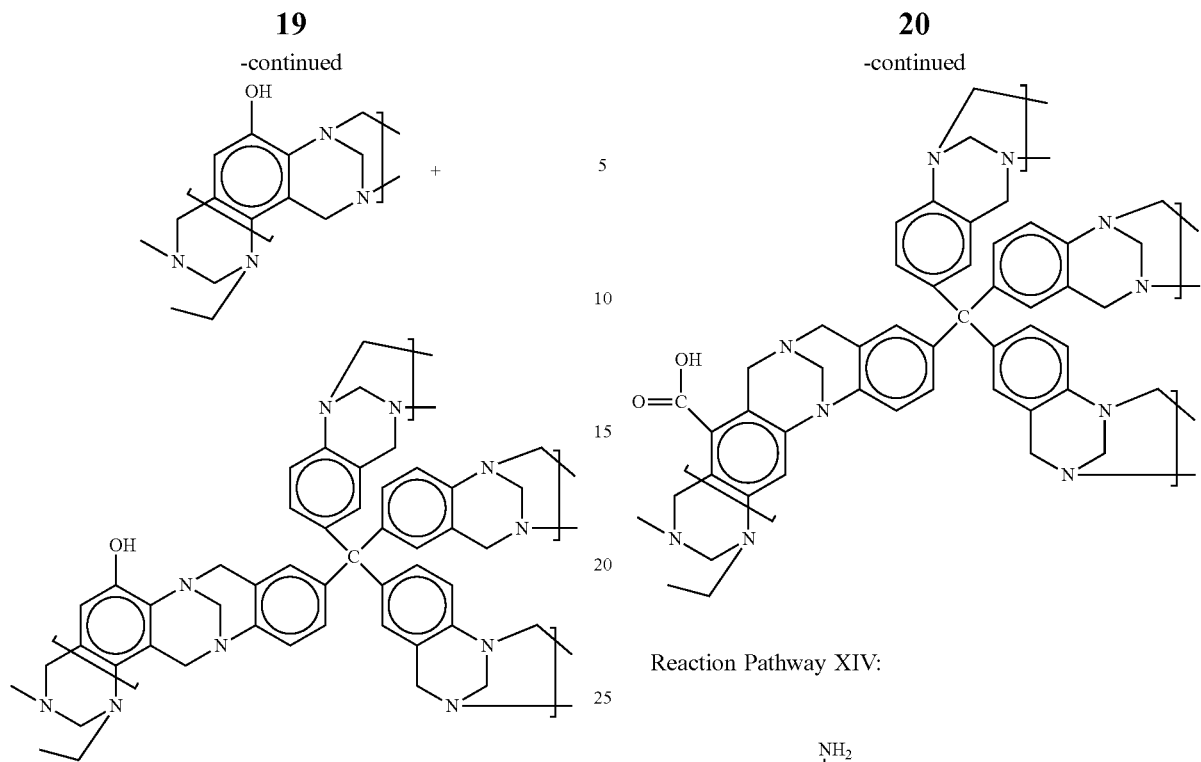
Reaction Pathway XIII:
20
-continued
Reaction Pathway XIV:
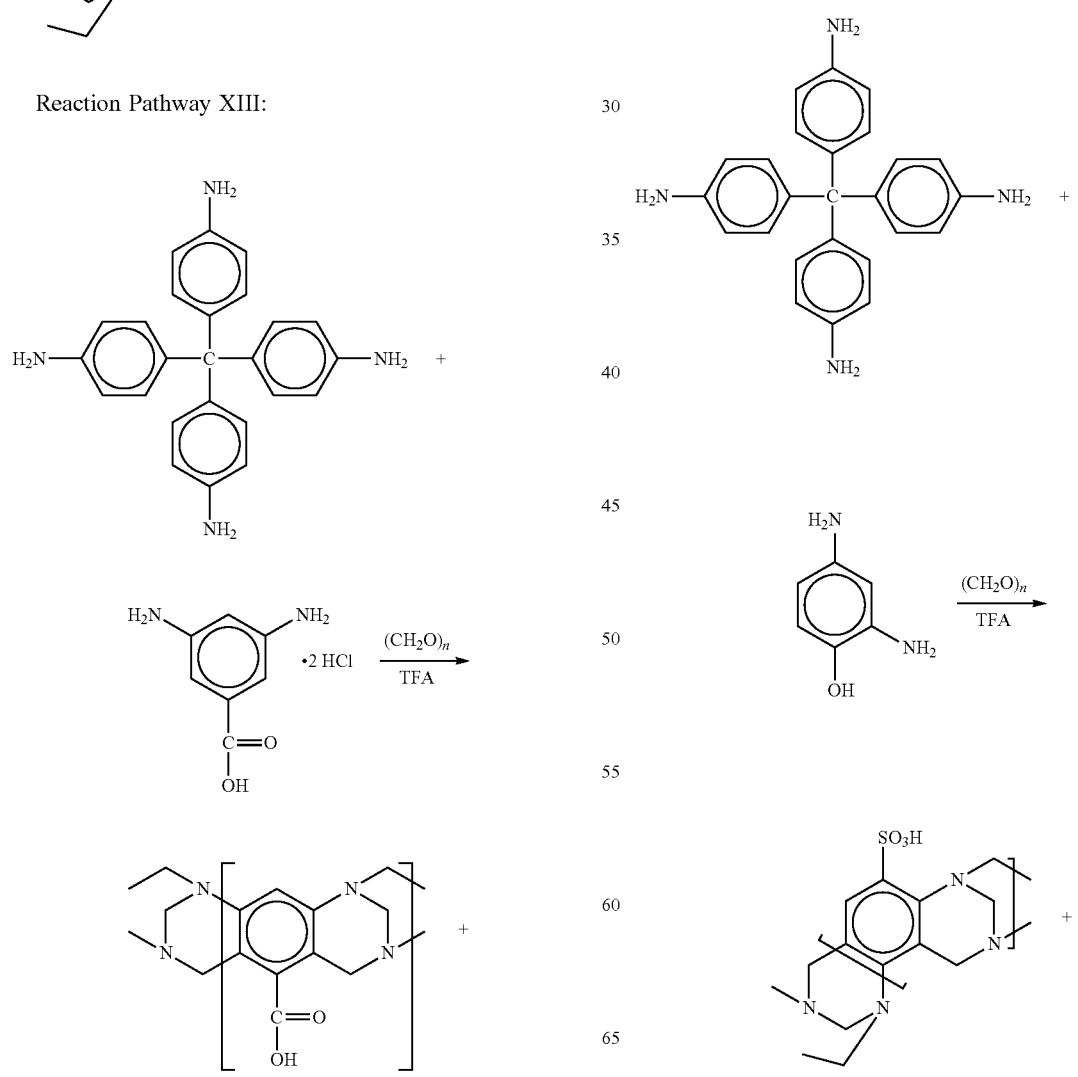

tional group, such as, for example, —OH, —COOH, or —SO₃H, and optionally containing non-functionalized diamino monomer, with one or more trifunctional amino aromatic monomers. Thus, this synthetic scheme can be employed to produce Troger's base polymers with polar group to functionality and chain entanglement induced by the branching. This can result in improved solubility in organic solvents and improved processability for fabrication of membranes and thin film composites. In Reaction pathway XVI the two separate structural units present in the copolymer are separately shown.

Reaction Pathway XVI:

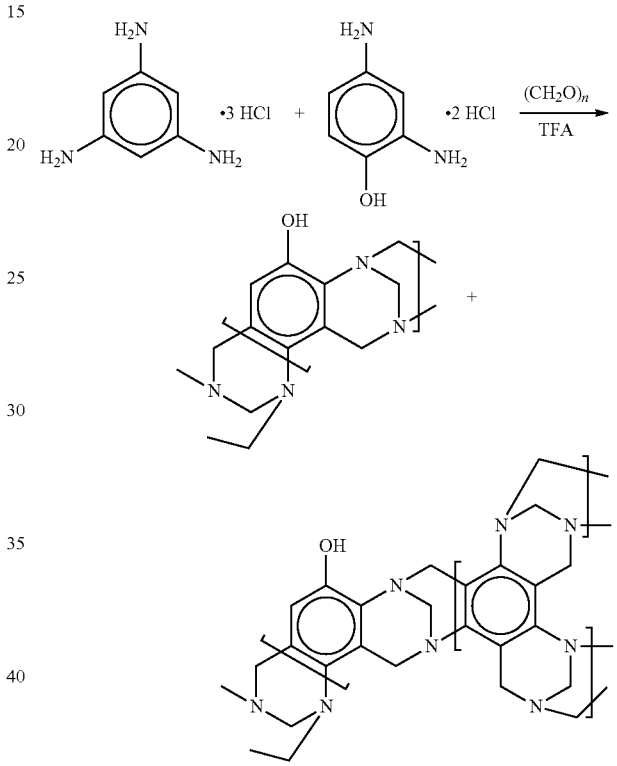

Ionically crosslinked Troger's base polymers are produced by reaction of a diamine (or polyamine) with sulfonic acid groups present in said polymer. Use of less than stoichiometric diamine provides ionic crosslinking while still maintaining free sulfonic acid groups.

Reaction Pathway XVI:

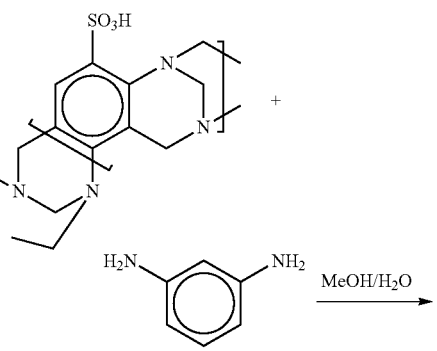

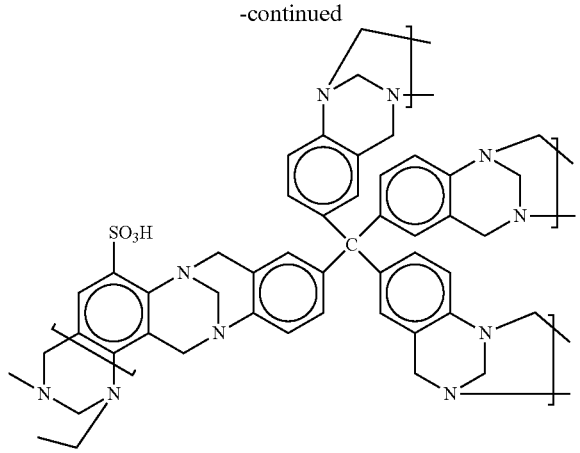

Reaction Pathway XV:

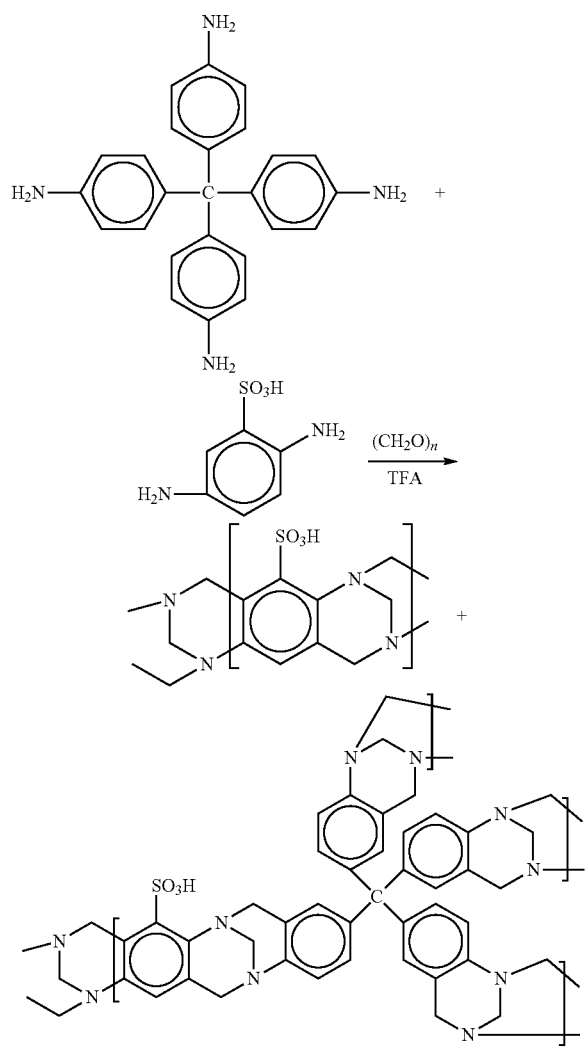

Yet another particularly useful variation involves use of a trifunctional primary amino aromatic co-monomer to provide some extent of branching during the synthesis of the Troger's base polymer. This is accomplished by partial replacement of the diamino monomer containing a func- Covalently crosslinked Troger's base polymers are produced by reaction of the partial or totally ionically crosslinked Troger's base polymer under conditions forming sulfonamide groups. Use of the Troger's base polymer with partial ionic crosslinking provides the corresponding Troger's base polymer with covalent sulfonamide crosslinking while still maintaining free sulfonic acid groups.

Reaction Pathway XVII:

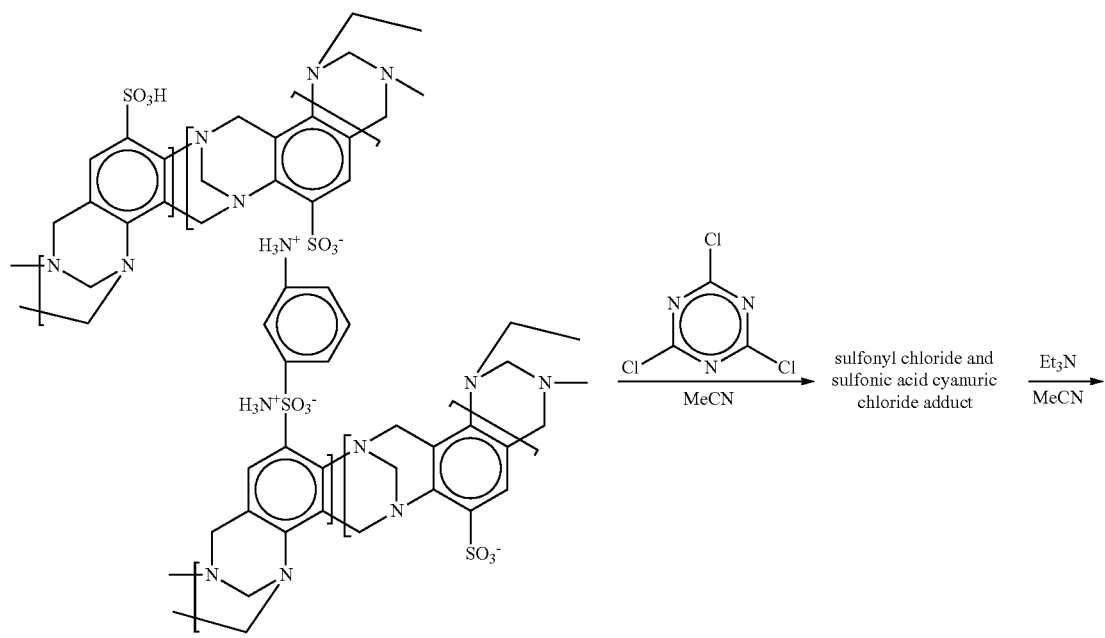

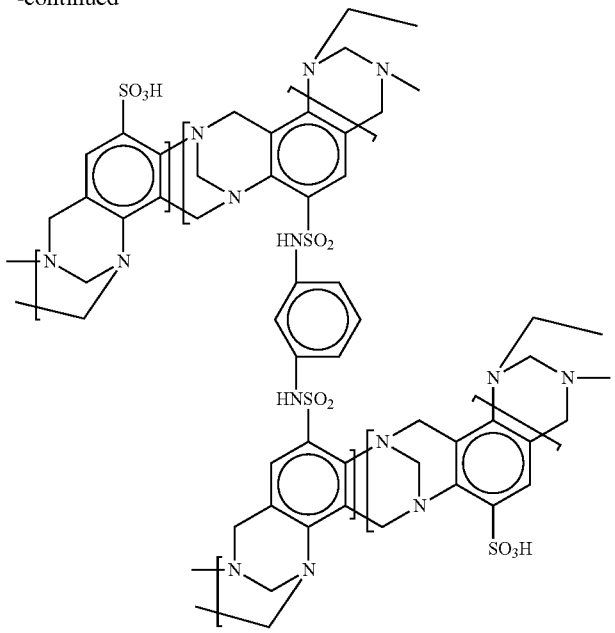

When the polar functional group is a phenolic hydroxyl, unsubstituted ortho and para positions are activated towards aromatic nucleophilic substitution, particularly in reaction with aromatic diazonium salts to form the diazosubstituted polymer. Thus, an additional route to the covalently cross-linked Troger's base polymers involves the formation of bis-diazo linkages by reaction of the polymer chain with bis-diazonium salts. When the diazonium reactant contains two or more diazonium groups adjacent polymer chains can be crosslinked, This is a preferred method to of crosslinking for applications where it is important not to introduce hydrolysable functional groups. Blending an aryl diamine such as m-phenylenediamine, p-phenylenediamine, 4,4'-diaminobiphenyl, or an isomeric mixture of diamino spirobis-indane diols with a hydroxyl substituted Troger's base polymer or copolymer, for example as a thin film, then treating with nitrous acid (solution of sodium nitrite and hydrochloric acid) between 5° C. and 25° C. prepares the bis-diazonium salt. Adjusting the pH above 9 by the addition of aqueous base catalyzes the covalent azo-coupling reactions resulting in covalent crosslinking of the polymer chains. A representative example is given in Reaction pathway XVIII.

Reaction Pathway XVIII:

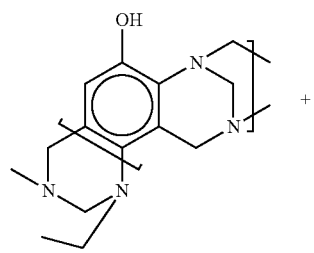

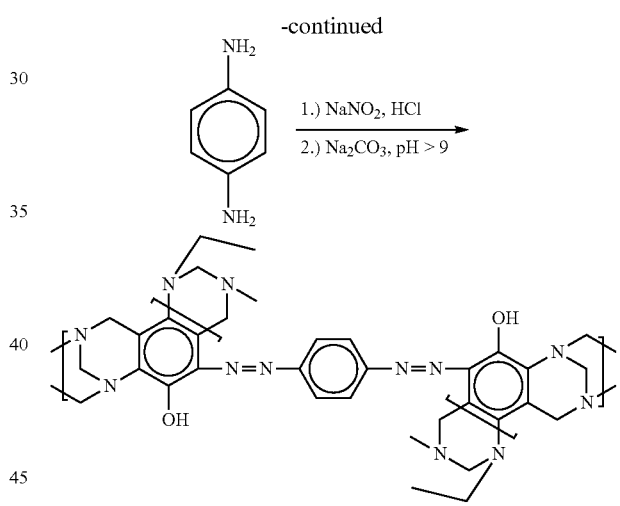

Azide-alkyne cycloaddition chemistry (Click Chemistry, Huisgen 1,3-Dipolar Cycloaddition) may be employed to produce covalently crosslinked Troger's base polymers. In one example, the phenolic hydroxyl group of a Troger's base polymer is either partially or totally converted to the corresponding propargyl ether. Partial conversion of the phenolic hydroxyl groups to propargyl ether groups is particularly desirable for control over crosslink density and resultant membrane properties, for example selectivity, which may be enhanced by the presence of free to hydroxyl groups. Reaction with a diazide is then performed, for example, using conditions given in Angew. Chem. Int. Ed., volume 41, pages 2596-2599 (2002). The crosslinking produces a structure containing the 1,2,3-triazole heterocycle. For the thermal reaction, 1,4-substituted and the 1,5-substituted regioisomers of 1,2,3-triazole are expected to form.

Reaction Pathway XIX:

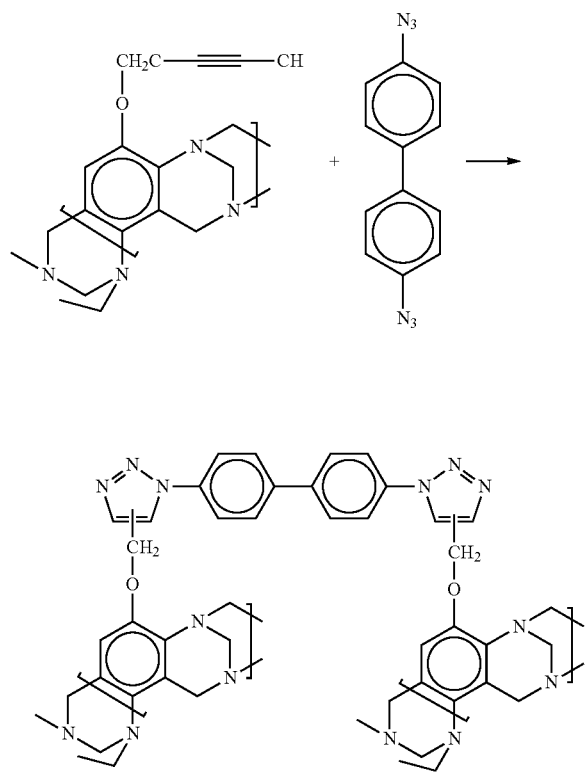

Copper catalyzed versions of the azide-alkyne cycloaddition are known and can even be performed in aqueous media and at room temperature. These reactions specifically produce the 1,4-disubstituted regioisomers. Representative examples for the synthetic methodology include: J. Am. Chem. Soc., volume 127, pages 210-216 (2005); Synlett, pages 3163-3166 (2009); Synlett, volume 24, pages 843-846 (2013); J. Org. Chem., volume 77, pages 4117-4122 (2012); J. Org. Chem., volume 76, pages 2367-2373 (2011); J. Org. Chem., volume 76, pages 6832-6836 (2011); Org. Lett., volume 13, pages 1102-1105 (2011); and Org. Lett., volume 13, pages 620-623 (2011). A ruthenium catalyzed version of the azide-alkyne cycloaddition specifically provides the 1,5-disubstituted regioisomeric 1,2,3-triazoles, see J. Am. Chem. Soc., volume 130, pages 8923-8930 (2008).

Crosslinkers containing the diazirine moiety may be employed to produce covalently crosslinked Troger's base PIMs. One or more diazirine-containing materials and one or more Troger's base PIMs are combined. Covalent crosslinking may be induced as the photoreactive diazirine changes to a highly reactive carbene by absorbing light, for example at 360 nm. Particularly preferred are the bis(diazirine)s. One class of said bis(diazirine)s is described in U.S. Pat. No. 3,514,447 which is incorporated herein by reference. In one example, the phenolic hydroxyl group of a Troger's base polymer is either partially or totally converted to the corresponding diazirine-containing structure. Partial conversion of the phenolic hydroxyl groups to diazirine groups is particularly desirable for control over crosslink density and resultant membrane properties, for example selectivity, which may be enhanced by the presence of free hydroxyl groups. Representative examples of such diazirine functionalized Troger's base polymers include:

Formula XX

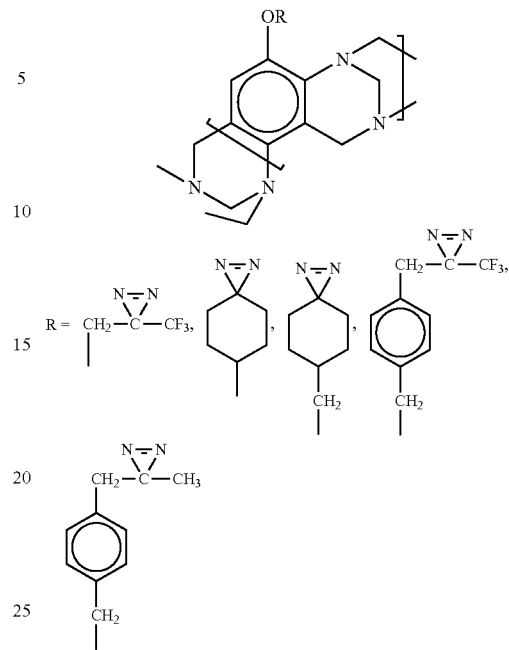

In another example, the Troger's base polymer which has been partially or totally reacted to contain diazirine groups, is blended with one or more additional Troger's base polymers to form crosslinkable mixtures. Diazines may be prepared using methods given in Journal of the American Chemical Society, volume 87, number 12, pages 2665-2671 (Jun. 20, 1965); Journal of Organic Chemistry, volume 35, number 8, pages 2465-2471 (August, 1970); and Journal of Medicinal Chemistry, volume 15, number 5, pages 514-518 (1972).

The Troger's base polymer preferably includes a chain terminating group, which may optionally include one or more functional groups amenable to further reaction to provide covalent crosslinking or chain extension through the polymer end groups. The use of selective chain terminating groups can provide Troger's base polymers with improved solubility, stability, reactivity, and/or processability. Incorporation of certain chain terminating groups, for example, phenyl, can remove unwanted end groups that may interfere with incorporation and/or reaction of various thermosettable groups. Incorporation of isopropylphenyl chain terminating groups can provide methine groups giving enhanced reactivity with bis(azide) and bis(sulfonylazide)s. Incorporation of hydroxyphenyl (or carboxyphenyl) chain terminating groups can provide the hydroxy (or carboxylic acid) group for conversion to the thermosettable cyanate or glycidyl ether (or glycidyl ester group). A preferred chain terminating group is represented by Formula XXI.

Formula XXI

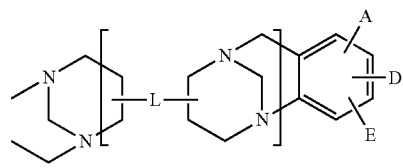

wherein A, D and E are independently selected from: hydrogen, hydroxyl, carboxylic acid, cyanate, epoxide, glycidyl ether, glycidyl ester, or a hydrocarbon group including from 1 to 8 carbon atoms (e.g. alkyl, alkenyl, alkynyl and benzyl) and which may optionally include an ether linkage (e.g. alkyl ether, alkenyl ether and alkynyl ether, benzyl ether) and which may be unsubstituted or substituted with a ketone or epoxy group. Representative groups include:

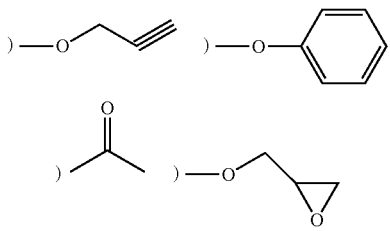

Representative reaction pathways for preparing polymers with such chain terminated groups include:

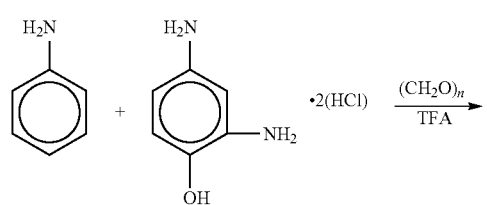

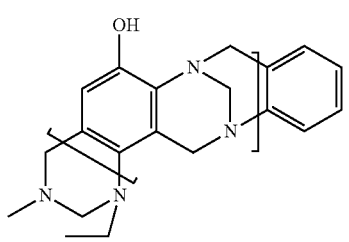

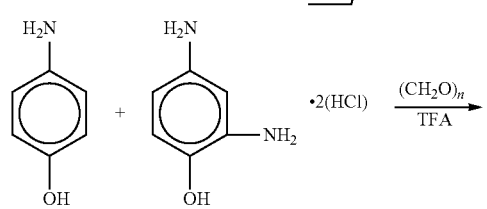

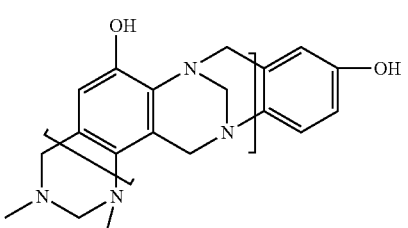

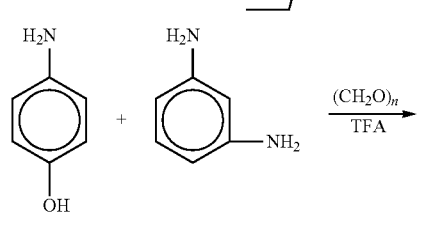

-continued

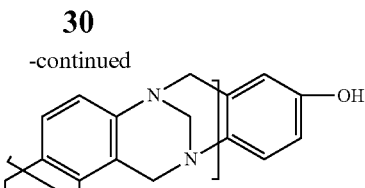

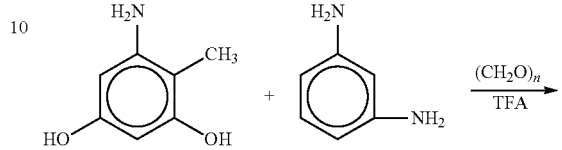

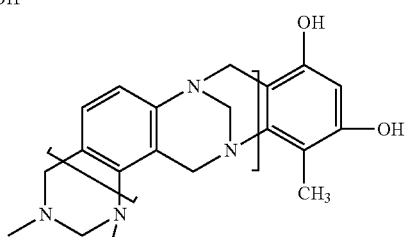

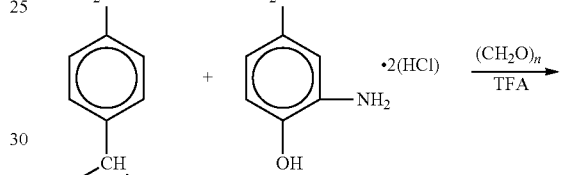

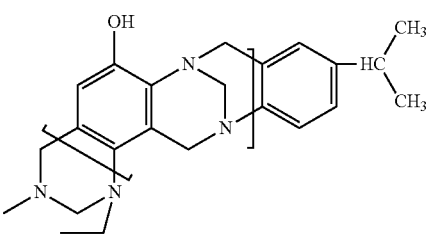

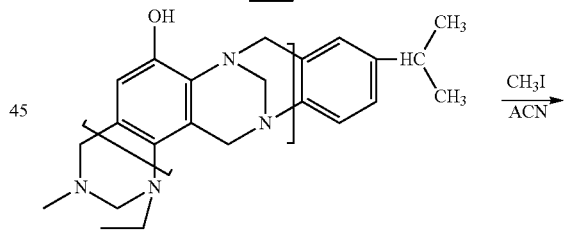

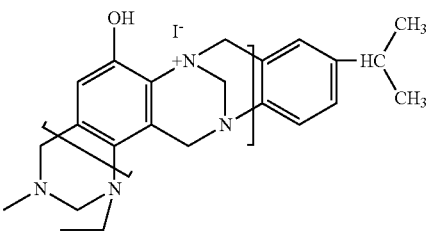

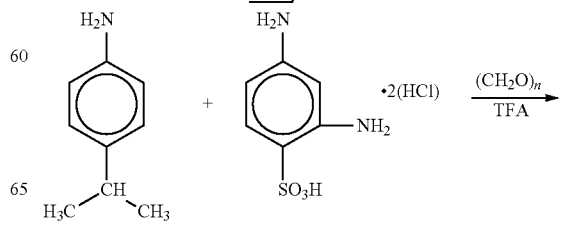

31

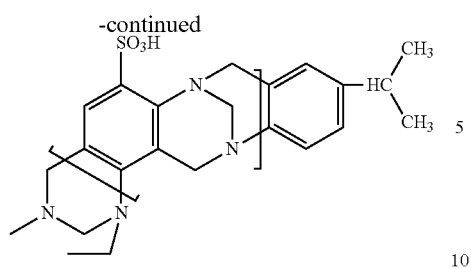

32

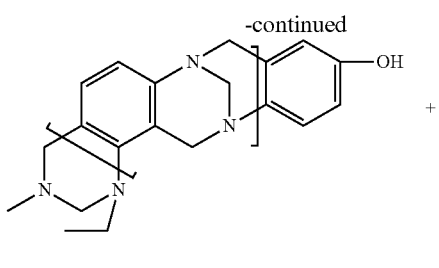

Representative thermosettable Troger's base polymers prepared by reaction of epichlorohydrin with a hydroxyl functional Troger's base polymer possessing a chain terminating to group are shown in the reaction pathways provided below.

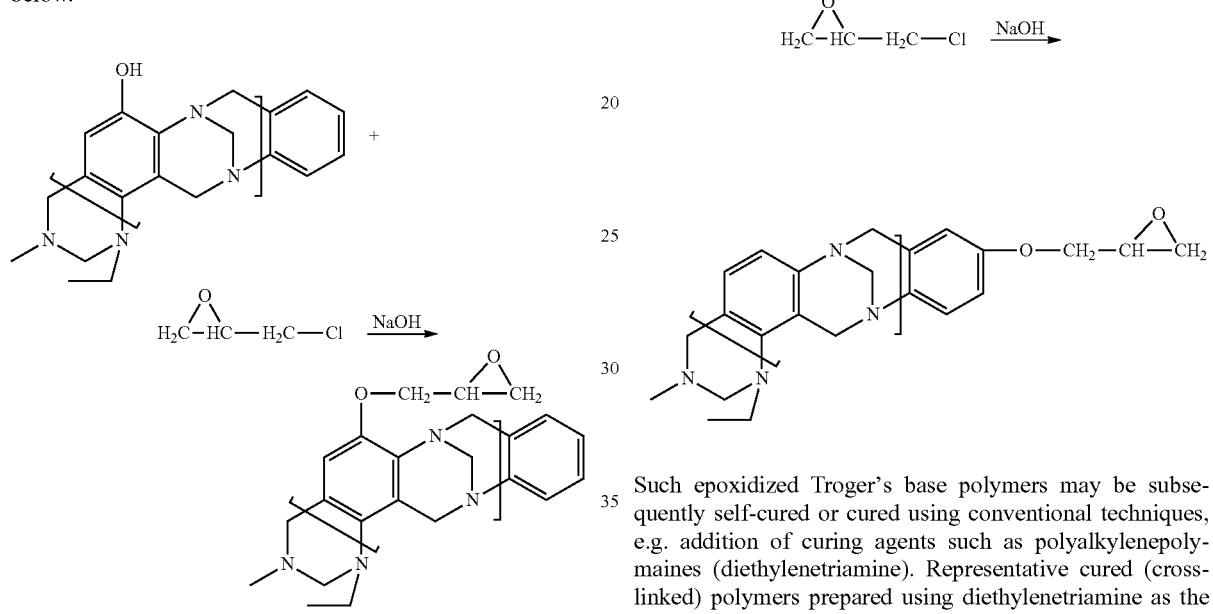

Such epoxidized Troger's base polymers may be subsequently self-cured or cured using conventional techniques, e.g. addition of curing agents such as polyalkylenepolymaines (diethylenetriamine). Representative cured (cross-linked) polymers prepared using diethylenetriamine as the curing agent include structures provided below.

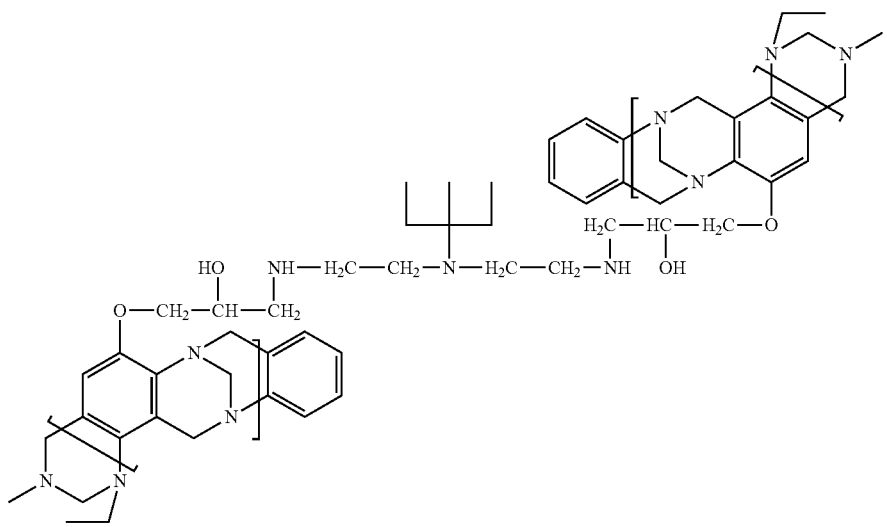

-continued

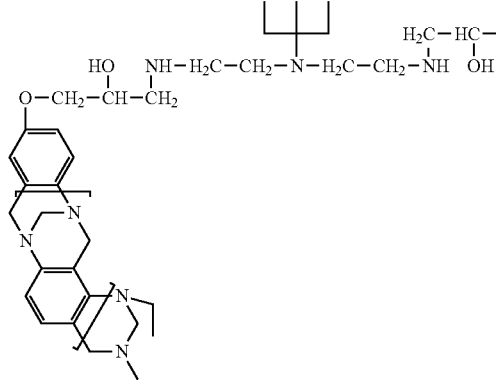
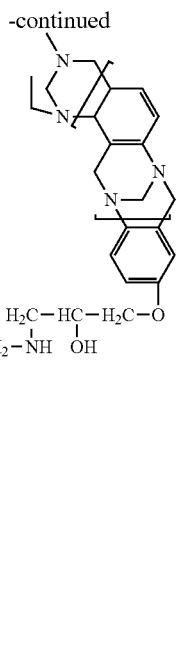

A representative cured (crosslinked) structure using a hydroxy functional Troger's base polymer as the curing agent is provided below.

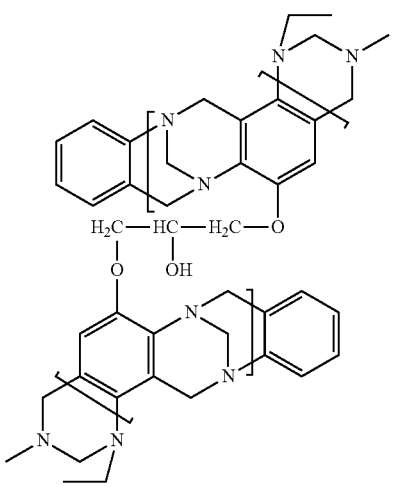

A monoamine co-reactant may be employed in the synthesis of the Troger's base PIMs to produce a chain terminating structure. A representative example is shown in Reaction pathway XXII wherein the use of 4-aminophenyl-propargyl ether provides terminal propargyl moieties which may be reacted with a diazide to provide 1,4-substituted and 1,5-substituted regioisomers of 1,2,3-triazole as the crosslinking structure. This selective placement of the crosslinking at the termination of the Troger's base polymer may enhance nanoporosity and performance by leaving the main chain repeat units free of crosslinking structure, and improve processability to form the membrane.

Reaction Pathway XXII:

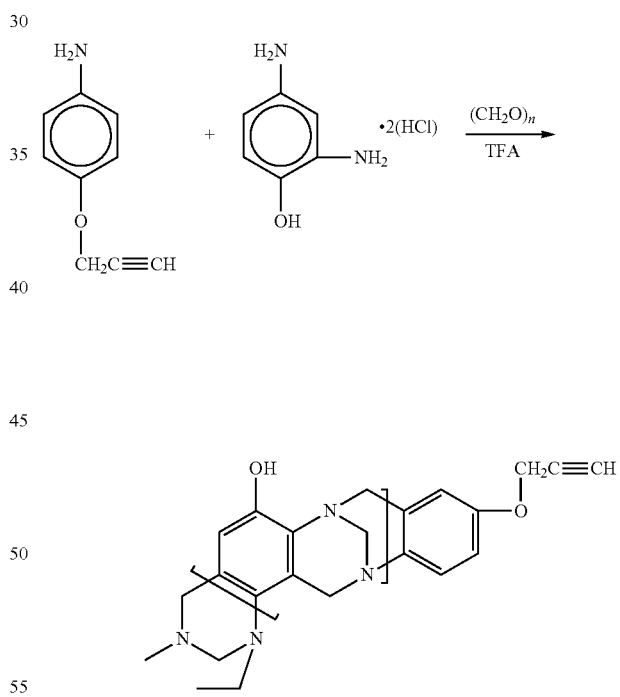

In further representative examples of the selective placement of the crosslinking structure at the termination of the Troger's base polymers, 1-(4-aminophenyl)acetone or 4-aminobenzophenone to are used as the monoamine co-reactant (Reaction pathways XXIII and XXIV, respectively). This provides terminal ketone moieties which may be reacted to produce the corresponding diazirine. Covalent crosslinking may be induced as the terminating photoreactive diazirine changes to a highly reactive carbene by absorbing light.

Reaction Pathway XXIII:

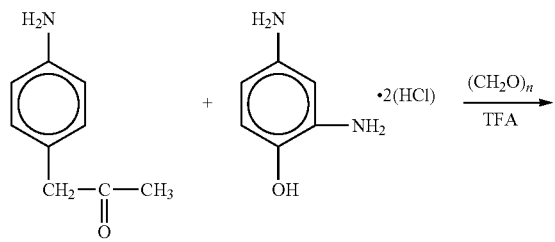

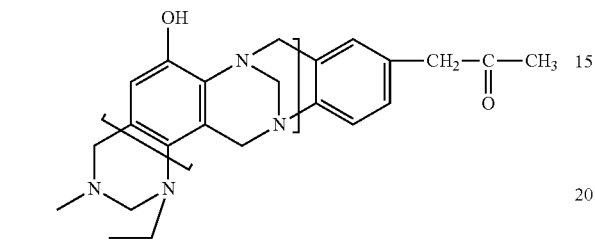

Reaction Pathway XXIV:

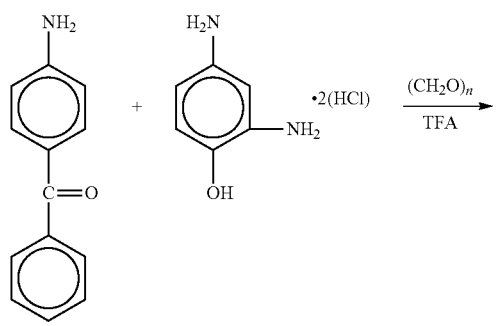

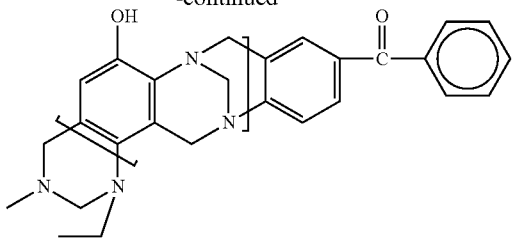

When the polar functional group is 1,3-phenolic hydroxyl disubstituted, the 2-positions are highly activated towards aromatic nucleophilic substitution. As representative examples of the selective placement of the 1,3-phenolic hydroxyl disubstituted structure at the termination of the Troger's base polymers, 1,3-dihydroxy-4-aminobenzene; 1,3-dihydroxy-5-aminobenzene; or 3',5'-dihydroxy-4-aminobiphenyl are used as the monoamine co-reactant. The resultant partially or totally 1,3-phenolic hydroxyl disubstituted Troger's base polymers may then be covalently crosslinked via the formation of bis-diazo linkages by reaction of the 2-position of the terminal 1,3-phenolic hydroxyl disubstituted moieties with bis-diazonium salts. This is a preferred method of crosslinking for applications where it is important not to introduce hydrolysable functional groups and conduct the covalent crosslinking predominantly through the terminal positions of the Troger's to base polymer chains. Blending an aryl diamine such as m-phenylenediamine, p-phenylenediamine, 4,4'-diaminobiphenyl, or an isomeric mixture of diamino spirobisindane diols with a 1,3-phenolic hydroxyl disubstituted Troger's base polymer, for example as a thin film, then treating with nitrous acid (solution of sodium nitrite and hydrochloric acid) between 5° C. and 25° C. prepares the bis-diazonium salt. Adjusting the pH above 9 by the addition of aqueous base catalyzes the covalent azo-coupling reactions resulting in covalent crosslinking of the polymer chains. A representative example is given in Reaction pathway XXV:

Reaction Pathway XXV

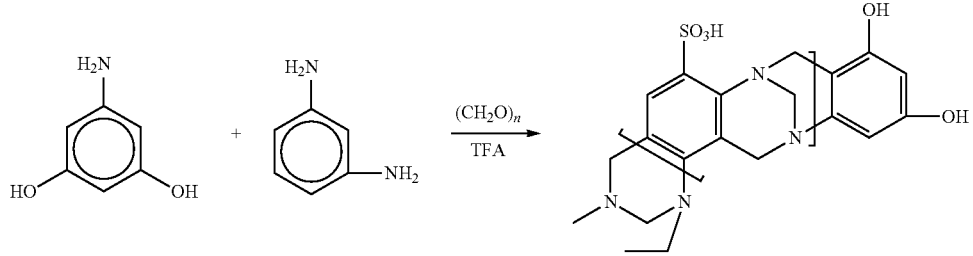

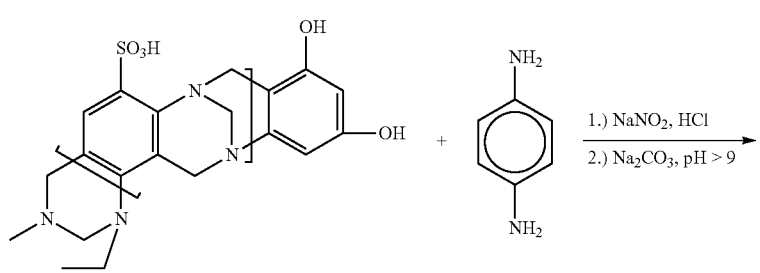

-continued

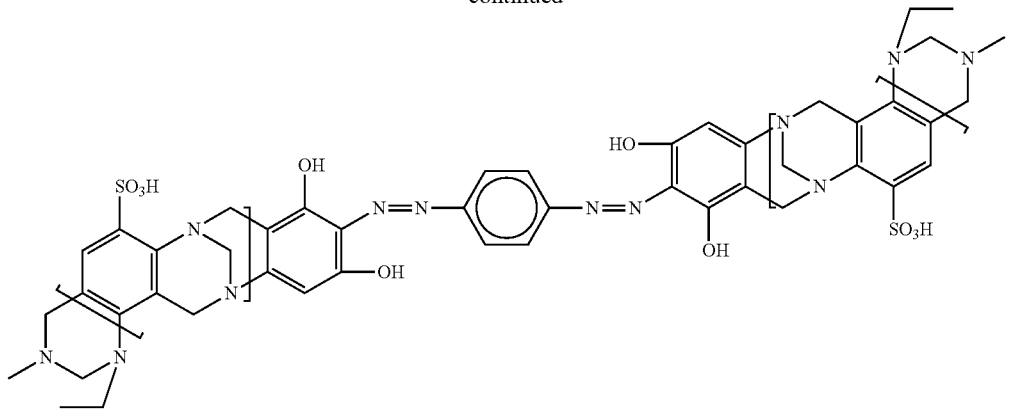

A desirable class of Troger's base polymers are prepared using a primary diamino spirobisindane monomer, for example an isomeric mixture of diamino spirobisindane diols shown in Formula XXVI. The diamino spirobisindane monomer may be the only diamine reactant used or may be used with one or more other primary diamine or polyamine containing reactants.

Formula XXVI

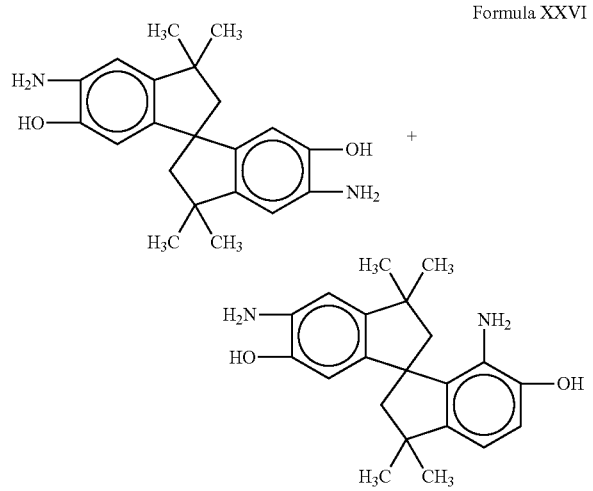

Spirobisindane monomers may be prepared using the methods described by Chen, W-F.; Lin, H-Y.; Dai, S. A.; Organic Letters, 6, 14, 2341-2343 (2004); Faler, G. R.; Lynch, J. C.; U.S. Pat. No. 4,701,566 (Oct. 20, 1987); Ito, M.; Iimuro, S.; U.S. Pat. No. 5,339,783 (Mar. 21, 1995); Curtis, R. F.; Lewis, K. O.; J. Chem. Soc., 418-421 (1962); Baker, W.; J. Chem. Soc., 1678-1681 (1934); Fisher, C. H.; Furlong, R. W.; Grant, M.; Journal of the American Chemical Society 58, 820-822 (1936); Baker, W.; Besly, D. M.; J. Chem. Soc., 1421-1424 (1939); Baker, W.; Besly, D. M.; J. Chem. Soc., 347-353 (1938); Ma, X; Swaidan, Y. B.; Zhu, Y.; Litwiller, E.; Jouiad, I. P.; Han, Y.; Macromolecules, 45, 3841-3849 (2012); Li, S.; Jo, H. J.; Han, S. H.; Park, C. H.; Kim, S.; Budd, P. M.; Lee, Y. M.; Journal of Membrane Science, 434, 137-147 (2013).

Quaternary ammonium groups may be formed within a part or all of the Troger's base polymer repeat units via reaction of a tertiary amine group within the bicyclic diamine structure of the main chain of the Troger's base polymer with an alkyl halide (Menshutkin reaction), dialkyl sulfate, alkylarylsulfonates, or trialkyl phosphate. Iodomethane, dimethyl sulfate, diethyl sulfate, toluenesulfonic acid methyl ester, or trimethyl phosphate are particularly preferred. Functional groups in the Troger's base polymer that are inert to the reactant and solvent used, if any, are preferred. Solvents useful for the quaternization reaction include aprotic solvents, such as dimethylsulfoxide, as well as acetonitrile. An excess of the alkyl halide, dialkyl sulfate or trialkyl phosphate may be used as both reactant and solvent or co-solvent. Methods used for quaternization reactions are given in J. Am. Chem. SOC., 113, 2873-2879 (1991); J. Org. Chem., 72, 9663-68 (2007); J. Chem. Soc., Perkin Trans. 2, 325-329 (1979); Dyes and Pigments 15, 83-88 (1991). Quaternization of the Troger's base polymers can beneficially improve water solubility, providing an aqueous solution from which a membrane can be fabricated and then crosslinked.

EXAMPLES

The following examples illustrate representative synthetic routes for preparing various embodiments of the invention. The identity of each polymer was confirmed by Fourier transform infrared (FTIR) spectrophotometric analysis, thermogravimetric analysis (TGA), and differential scanning calorimetry (DSC) analysis.

Example 1

Condensation of 3,5-diaminobenzoic Acid Dihydrochloride, with Dimethoxymethane in Trifluoroacetic Acid as Represented in Reaction Pathway II Reaction Stoichiometry: 1) 3,5-Diaminobenzoic acid dihydrochloride, 99%, 1.50 grams used (6.665 millimole). 2) Dimethoxymethane, 99.9% actual GC purity on COA, 2.03 grams used (26.658 millimole). 3) Trifluoroacetic acid (TFA), 99%, 99.8% actual GC purity on COA, 20 milliliters used.

3,5-Diaminobenzoic acid dihydrochloride was weighed under dry nitrogen into a 2 ounce glass bottle containing a magnetic stirring bar and TFA was added. The bottle was sealed and magnetically stirred to give a light amber colored solution and thereafter dimethoxymethane was added, the bottle resealed with continued stirring until a bright yellow colored slurry initially formed. After 67.5 hours, the slurry was transferred to a 500 milliliter glass beaker along with 200 milliliters of DI water with continued stirring and pH adjustment from 1 with dilute 5% weight sodium hydroxide solution to 9. At pH 7, the bright orange powder went into solution with only a slight haziness. The solution remained when pH 9 was reached. The pH was then adjusted to 3 and the resultant orange powder recovered by gravity filtration on paper. The solids on the filter paper were washed with DI water and allowed to air dry overnight. The resulting bright orange colored solids were added to a 2 ounce glass bottle along with methanol (20 milliliters) and acetone (20 milliliters) and magnetically stirred overnight. The product was recovered by gravity filtration on paper and washed with methanol (50 volume %) and acetone (50 volume %) solution to cover. A medium orange colored powder (1.23 grams) was recovered after air drying overnight.

A TA Instruments Q500 was employed for TGA. The sample for analysis (15.014 milligrams) was weighed into a platinum pan. The analysis was conducted under 60 cubic centimeters per minute of nitrogen flow by heating the sample to 150° C. and holding for 60 minutes followed by cooling to 25° C. then heating to 500° C. at a rate of 10° C. per minute. Onset of transition temperature (Td), end of Td, and volatiles (% weight) lost up to onset to Td after prehold at 150° C. for 60 minutes were 216.04° C., 254.26° C. (minor step, 4.201 weight % loss), and 6.81%, respectively. A second distinct step was noted giving an onset to Td of 322.84° C.

A TA Instruments Q100 was employed for DSC analysis. The sample for analysis (6.4 milligrams) was weighed into an aluminum hermetic pan and covered loosely (not crimped). The analysis was completed using a rate of heating of 7° C. per minute from 0° C. to 175° C. under a stream of nitrogen flowing at 35 cubic centimeters per minute. A second analysis was immediately conducted on the sample using the aforementioned conditions, after the first analysis was completed, with no events detected.

FTIR spectrophotometric analysis was completed using a neat KBr pellet of the product. O—H stretching characteristic of —COOH is apparent as a shallow broad absorbance with two minima at 2961 and 2927 cm$^{-1}$ and a second shallow broad absorbance at 2566 cm$^{-1}$. Strong carbonyl absorbance characteristic of aryl —COOH is apparent at 1702 cm$^{-1}$ and is followed by a shoulder at 1679 cm$^{-1}$. Aromatic ring absorbance appears at 1604, 1584 (shoulder), and 1468 cm$^{-1}$. Isolated out-of-plane C—H bending for a single —H on a benzene ring is apparent at 875 cm$^{-1}$. An absorbance at 1258 cm-1 and an absorbance at 1189 cm-1 are in the correct range for aromatic and aliphatic C—N stretching vibrations, respectively.

Example 2

Condensation of 3,5-Diaminobenzoic Acid Dihydrochloride, with Paraformaldehyde in Trifluoroacetic Acid as Represented in Reaction Pathway I Reaction Stoichiometry: 1) 3,5-diaminobenzoic acid dihydrochloride, 99%, 1.50 grams used (6.665 millimole). 2) Paraformaldehyde, ≥88%, 0.80 gram used (26.658 millimole). 3) Trifluoroacetic acid (TFA), 99.8% actual GC purity on COA, 20 milliliters used. 3,5-Diaminobenzoic acid dihydrochloride and paraformaldehyde were weighed under dry nitrogen into a 2 ounce glass bottle along with a magnetic stirring bar and TFA was added with magnetic stirring. The bottle was sealed and magnetically stirred to give a yellow colored slurry. After 67 hours, the slurry was transferred to a 500 milliliter glass beaker along with 200 milliliters of DI water with continued stirring and pH adjustment from 1 with dilute 5% weight sodium hydroxide solution to 7. At pH 7, the bright orange powder went into solution with only a slight haziness. The pH was then adjusted to 3, stirred overnight. The resultant orange powder was recovered by gravity filtration on paper. The solids on the filter were washed with DI water to cover and allowed to air dry overnight on the filter paper. The bright orange colored solids were added to a 2 ounce glass bottle along with methanol (20 milliliters) and acetone (20 milliliters) and magnetically stirred overnight. The product was recovered by gravity filtration on paper and washed with methanol (50 volume %) and acetone (50 volume %) solution to cover. A medium orange colored powder (1.21 grams) was recovered after air drying overnight.TGA of a sample (5.2040 milligrams) was completed using the method of Example 1. Onset to Td, end of Td, and volatiles (% weight) lost up to onset to Td after prehold at 150° C. for 60 minutes were 215.01° C., 247.37° C. (minor step, 7.445 weight % loss), and 6.80%, respectively. A second distinct step was noted giving an onset to Td of 319.93° C. DSC analysis of a sample (8.0 milligrams) was completed using the method of Example 1 with no events detected in the second analysis.

The condensation reaction of 3,5-diaminobenzoic acid dihydrochloride with paraformaldehyde in TFA was repeated using the method given above with a four-fold increase in scale. The product recovered from extraction with methanol (80 milliliters) and acetone (80 milliliters) was additionally extracted overnight with tetrahydrofuran (80 milliliters). The product was recovered by gravity filtration on paper and washed with tetrahydrofuran to cover. A medium orange colored powder (4.78 grams) was recovered after drying in the vacuum oven at 50° C. overnight.

TGA of a sample (4.1890 milligrams) was completed using the method of Example 1. Onset to Td, end of Td, and volatiles (% weight) lost up to onset to Td after prehold at 150° C. for 60 minutes were 215.23° C., 248.14° C. (minor step, 5.794 weight % loss), and 10.88%, respectively. A second distinct step was noted giving an onset to Td of 319.93° C. DSC analysis of a sample (11.1 milligrams) was completed using the method of Example 1 with no events detected in the second analysis.

Matrix-assisted laser desorption/ionization mass spectrometry (MALDI MS) was completed demonstrating a 188 dalton repeat unit expected for the $C_{10}H_8O_2N_2$ repeat structure. Thermal desorption/pyrolysis gas chromatographic mass spectroscopic analysis of a sample heated to 550° C. released a significant amount of carbon dioxide indicative of decomposition of the carboxylic acid moiety. Additionally observed pyrolysis products including methylaniline, dimethyl benzenamine, diaminobenzene, methyl benzenediamine, dimethyl benzenediamine, and trimethylbenzenediamine, may be indicative of repeat unit decomposition.

Example 3

Condensation of 2,4-diaminophenol Dihydrochloride with Dimethoxymethane in Trifluoroacetic Acid as Represented in Reaction Pathway VI Reaction Stoichiometry: 1) 2,4-Diaminophenol dihydrochloride, 98%, 1.50 grams used (7.612 millimole). 2) Dimethoxymethane, 99.9% actual GC purity on COA, 2.32 grams used (30.45 millimole). 3) Trifluoroacetic acid (TFA), 99.8% actual GC purity on COA, 20 milliliters used.

2,4-diaminophenol dihydrochloride was weighed under dry nitrogen into a 2 ounce glass bottle containing a magnetic stirring bar and TFA was added. The bottle was sealed and magnetically stirred to give a gray colored slurry and thereafter dimethoxymethane was added, the bottle resealed with continued stirring until a hazy dark amber colored solution formed. After 67.5 hours, the hazy solution was transferred to a 500 milliliter glass beaker along with 200 milliliters of DI water with continued stirring and pH adjustment from 1 with dilute 5% weight sodium hydroxide solution to 7. At pH 4, a white precipitate formed. At pH 7, a white slurry was present. The product was recovered by gravity filtration on paper and washed with DI water to cover. A brown colored damp powder (3.57 grams) was recovered after air drying overnight. TGA of a sample (7.3830 milligrams) was completed using the method of Example 1. Onset to Td and volatiles (% weight) lost up to onset to Td after prehold at 150° C. for 60 minutes were 219.01° C. and 5.85%, respectively. DSC analysis of a sample (15.1 milligrams) was completed using the method of Example 1 with no events detected in the second analysis.

Example 4

Condensation of 2,4-diaminophenol Dihydrochloride with Paraformaldehyde in Trifluoroacetic Acid as Represented in Reaction Pathway V Reaction Stoichiometry: 1) 2,4-Diaminophenol dihydrochloride, 98%, 1.50 grams used (7.612 millimole). 2) Paraformaldehyde, ≥88%, 0.91 gram used (30.45 millimole). 3) Trifluoroacetic acid (TFA), 99.8% actual GC purity on COA, 20 milliliters used.

2,4-Diaminophenol dihydrochloride and paraformaldehyde were weighed under dry nitrogen into a 2 ounce glass bottle along with a magnetic stirring bar and TFA was added with magnetic stirring. The bottle was sealed and magnetically stirred to give a gray colored slurry. After 44.9 hours, the hazy dark amber colored solution was transferred to a 500 milliliter glass beaker along with 200 milliliters of DI water with continued stirring and pH adjustment from 1 with dilute 5% weight sodium hydroxide solution to 7. At pH 4, a tan colored precipitate formed. At pH 7, a brown colored slurry was present. The product was recovered by gravity filtration on paper and to washed with DI water to cover. A brown colored damp powder (1.87 grams) was recovered after air drying overnight.

TGA of a sample (3.7750 milligrams) was completed using the method of Example 1. Onset to Td and volatiles (% weight) lost up to onset to Td after prehold at 150° C. for 60 minutes were 224.40° C. and 5.39%, respectively. DSC analysis of a sample (11.7 milligrams) was completed using the method of Example 1 with no events detected in the second analysis. MALDI MS was completed demonstrating a 160 dalton repeat unit expected for the $C_9H_8ON_2$ repeat structure. Thermal desorption/pyrolysis gas chromatographic mass spectroscopic analysis of a sample heated to 550° C. demonstrated the presence of pyrolysis products including diaminobenzene, methyl aminophenol, and dimethyl aminophenol, which may be indicative of species containing phenolic hydroxyl with attached nitrogen. Breakdown products with molecular weights of 148, 162, and 176 may be indicative of repeat unit decomposition. Electrospray ionization mass spectrometry (ESI-MS) of the sample soluble in N,N-dimethylformamide showed the expected 160 dalton repeat unit. Tandem mass spectrometry (MS MS) showed the loss of water suggesting phenolic hydroxyl loss from the protonated molecular ion.

Example 5

Condensation of 3,3'-dihydroxybenzidine with Paraformaldehyde in Trifluoroacetic Acid as Illustrated in Reaction Pathway VII Reaction Stoichiometry: 1) 3,3'-dihydroxybenzidine, >99%, 1.00 gram used (4.625 millimole). 2) Paraformaldehyde, ≥88%, 0.55 gram used (18.498 millimole). 3) Trifluoroacetic acid (TFA), 99%, 99.8% actual GC purity on COA, 20 milliliters used.

3,3'-Dihydroxybenzidine and paraformaldehyde were weighed under dry nitrogen into a 2 ounce glass bottle along with a magnetic stirring bar and TFA was added with magnetic stirring. The bottle was sealed and magnetically stirred to give a light amber yellow colored solution. After 47.4 hours, the light amber yellow colored solution was transferred to a 500 milliliter glass beaker along with 200 milliliters of DI water with continued stirring and pH adjustment from 1 with dilute 5% weight sodium hydroxide solution to 7. At pH 7, a thick brown colored slurry was present. The product was recovered by gravity filtration on paper and washed with DI water to cover. A medium brown colored powder (1.13 grams) was recovered after air drying overnight. TGA of a sample (4.5040 milligrams) was completed using the method of Example 1. Onset to Td and volatiles (% weight) lost up to onset to Td after prehold at 150° C. for 60 minutes were 217.80° C. and 2.95%, respectively. DSC analysis of a sample (11.5 milligrams) was completed using the method of Example 1 with no events detected in the second analysis.

Example 6

Condensation of 2,4-diaminophenol Dihydrochloride (10%) and 1,3-Phenylenediamine with Paraformaldehyde in Trifluoroacetic Acid as Illustrated in Reaction Pathway VIII Reaction Stoichiometry: 1) 2,4-Diaminophenol dihydrochloride, 0.60 gram used (3.045 millimole). 2) 1,3-Phenylenediamine, ≥99%, 2.96 grams used (27.403 millimole). 3) Paraformaldehyde, ≥88%, 3.64 grams used (0.1212 mole). 4) Trifluoroacetic acid (TFA), 99.8% actual GC purity on COA, 80 milliliters used.

2,4-Diaminophenol dihydrochloride and 1,3-phenylenediamine were weighed under dry nitrogen into a 4 ounce glass bottle along with a magnetic stirring bar and TFA was added with magnetic stirring. The bottle was sealed and magnetically stirred to give a gray colored solution to which the pre-weighed paraformaldehyde was added. After stirring for 5 minutes, a medium amber colored solution formed. Two minutes later, a gelatinous medium amber colored mixture formed and was immediately placed on a mechanical shaker. After 22.6 hours, the mixture was transferred to a 2 liter glass beaker along with 300 milliliters of DI water with continued stirring followed by pH adjustment from 0-1 to 4 with dilute 5% weight sodium hydroxide solution. The product was recovered by gravity filtration on paper and washed with DI water and allowed to air dry overnight. The resulting damp powder was recovered (7.55 grams) and added to a 2 ounce glass bottle along with tetrahydrofuran (80 milliliters) and a magnetic stir bar, sealed, and stirred overnight. The product was recovered by vacuum filtration on a medium fitted glass funnel. The product was washed with tetrahydrofuran, recovered, and added back into the glass bottle along with fresh tetrahydrofuran (80 milliliters) and magnetically stirred overnight. The product was recovered by vacuum filtration on the fritted glass funnel, washed with tetrahydrofuran, and placed overnight in a vacuum oven at 50° C. The resulting product was a dull red brown colored powder (5.03 grams). TGA of a sample (5.0990 milligrams) was completed using the method of Example 1. Onset to Td, end of Td, and volatiles (% weight) lost up to onset to Td after prehold at 150° C. for 60 minutes were 205.84° C., 229.38° C. (minor step, 10.12 weight % loss), and 10.59%, respectively. A second distinct step was noted giving an onset to Td of 420.58° C. DSC analysis of a sample (12.8 milligrams) was completed using the method of Example 1 with no events detected in the second analysis.

The condensation reaction of 2,4-diaminophenol dihydrochloride and 1,3-phenylenediamine with paraformaldehyde in TFA was repeated using the method given above with a two-fold increase in scale, giving 9.93 grams of product. TGA of a sample (5.7190 milligrams) was completed using the method of Example 1. Onset to Td, end of Td, and volatiles (% weight) lost up to onset to Td after prehold at 150° C. for 60 minutes were 202.92° C., 226.61° C. (minor step, 8.336 weight % loss), and 8.43%, respectively. A second distinct step was noted giving an onset to Td of 423.06° C. DSC analysis of a sample (10.5 milligrams) was completed using the method of Example 1 with no events detected in the second analysis.

Example 7

Condensation of 3,5-diaminobenzoic Acid Dihydrochloride (50%) and 1,3-Phenylenediamine with Paraformaldehyde in Trifluoroacetic Acid as Illustrated in Reaction Pathway IX Reaction Stoichiometry: 1) 3,5-diaminobenzoic acid dihydrochloride, 99%, 3.00 grams used (13.329 millimole). 2) 1,3-Phenylenediamine, ≥99%, 1.44 grams used (13.329 millimole). 3) Paraformaldehyde, ≥88%, 3.20 grams used (0.1066 mole). 4) Trifluoroacetic acid (TFA), 99.8% actual GC purity on COA, 80 milliliters used.

3,5-Diaminobenzoic acid dihydrochloride and 1,3-phenylenediamine were weighed under dry nitrogen into a 4 ounce glass bottle along with a magnetic stirring bar and TFA was added with magnetic stirring. The bottle was sealed and magnetically stirred to give a white slurry, to which the pre-weighed paraformaldehyde was added. After stirring for 2 minutes, a medium yellow colored thick slurry formed. Twelve minutes later, the medium yellow colored thick slurry was placed on a mechanical shaker. After 22.6 hours, the orange yellow colored slurry was transferred to a 2 liter glass beaker along with 350 milliliters of DI water with continued stirring followed by pH adjustment from 0-1 to 7 with dilute 5% weight sodium hydroxide solution. At pH 7, the orange yellow colored powder partially went into solution. The pH was adjusted back to 3. The product was recovered by gravity filtration on paper and washed with DI water to cover. The resulting damp powder was recovered (8.51 grams) and added to a 2 ounce glass bottle along with tetrahydrofuran (80 milliliters) and a magnetic stir bar, sealed, and stirred overnight. The product was recovered by vacuum filtration on a medium fritted glass funnel, washed with tetrahydrofuran, and placed overnight in a vacuum oven at 50° C. The resulting product was a medium orange colored powder (4.62 grams).

TGA of a sample (4.1390 milligrams) was completed using the method of Example 1. Onset to Td, end of Td, and volatiles (% weight) lost up to onset to Td after prehold at 150° C. for 60 minutes were 205.07° C., 234.75° C. (minor step, 3.803 weight % loss), and 12.16%, respectively. A second distinct step was noted giving an onset to Td of 382.97° C. DSC analysis of a sample (9.5 milligrams) was completed using the method of Example 1 with no events detected in the second analysis.

The condensation reaction of 3,5-diaminobenzoic acid dihydrochloride and 1,3-phenylenediamine with paraformaldehyde in TFA was repeated using the method given above with a two-fold increase in scale, addition of a second tetrahydrofuran extraction in the purification step, and increase of the temperature to 100° C. in the vacuum oven drying step, giving 9.66 grams of light orange colored powder product. TGA of a sample (4.7340 milligrams) was completed using the method of Example 1. Onset to Td, end of Td, and volatiles (% weight) lost up to onset to Td after prehold at 150° C. for 60 minutes were 205.71° C., 234.07° C. (minor step, 5.234 weight % loss), and 8.43%, respectively. A second distinct step was noted giving an onset to Td of 378.68° C. DSC analysis of a sample (10.6 milligrams) was completed using the method of Example 1 with no events detected in the second analysis.

Example 8

Condensation of 2,5-diaminobenzenesulfonic Acid with Paraformaldehyde in Trifluoroacetic Acid as Represented by Reaction Pathway III Reaction Stoichiometry: 1) 2,5-diaminobenzenesulfonic acid, ≥97%, 6.00 grams (31.881 millimole). 2) Paraformaldehyde, ≥88%, 3.83 grams used (0.1275 mole). 3) Trifluoroacetic acid (TFA), 99%, 99.8% actual GC purity on COA, 80 milliliters used.

2,5-Diaminobenzenesulfonic acid and paraformaldehyde were weighed under dry nitrogen into a 4 ounce glass bottle along with a magnetic stirring bar and TFA was added with magnetic stirring. The bottle was sealed and magnetically stirred to give red brown colored solution. After 114.75 hours, the solution was transferred to a 2 liter glass beaker along with 200 milliliters of DI water with continued stirring followed by pH adjustment from 0-1 to 3 with dilute 5% weight sodium hydroxide solution. At pH 3, a slurry of bright yellow colored powder in orange colored liquid formed. The product was recovered by gravity filtration on paper. The solids on the filter paper were washed with DI water and allowed to air dry overnight. The resulting damp powder was recovered (16.96 grams) and added to a 2 ounce glass bottle along with tetrahydrofuran (80 milliliters) and a magnetic stir bar, sealed, and stirred overnight. The product was recovered by vacuum filtration on a medium fritted glass funnel. The product was washed with tetrahydrofuran, recovered by vacuum filtration, and recombined with tetrahydrofuran (50 milliliters) and stirred overnight. The product was recovered by vacuum filtration, washed with tetrahydrofuran, and placed overnight in a vacuum oven at 100° C. The resulting product was a mustard yellow colored powder (4.09 grams). TGA of a sample (4.0130 milligrams) was completed using the method of Example 1. Onset to Td, end of Td, and volatiles (% weight) lost up to onset to Td after prehold at 150° C. for 60 minutes were 199.19° C., 234.67° C. (minor step, 1.662 weight % loss), and 7.82%, respectively. A second distinct step was noted giving an onset to Td of 376.75° C. DSC analysis of a sample (10.7 milligrams) was completed using the method of Example 1 with no events detected in the second analysis.

The condensation reaction of 2,5-diaminobenzenesulfonic acid with paraformaldehyde in TFA was repeated using the method given above giving 4.26 grams of mustard yellow colored powder product. TGA of a sample (5.0930 milligrams) was completed using the method of Example 1. Onset to Td, end of Td, and volatiles (% weight) lost up to onset to Td after prehold at 150° C. for 60 minutes were 204.80° C., 242.95° C. (minor step, 4.743 weight % loss), and 7.67%, respectively. A second distinct step was noted giving an onset to Td of 370.77° C. DSC analysis of a sample (10.0 milligrams) was completed using the method of Example 1 with no events detected in the second analysis.

MALDI MS was completed demonstrating a 224 dalton repeat unit expected for the $C_9H_8O_3N_2S$ repeat structure. Thermal desorption/pyrolysis gas chromatographic mass spectroscopic analysis of a sample heated to 550° C. released a significant amount of sulfur dioxide indicative of decomposition of the sulfonic acid moiety. Additionally observed pyrolysis products including aniline, methyl benzenamine, diaminobenzene, methyl benzenediamine, and methyl aminobenzonitrile, may be indicative of repeat unit decomposition.

Example 9

Condensation of 2,4-diaminobenzenesulfonic Acid with Paraformaldehyde in Trifluoroacetic Acid as Represented by Reaction Pathway IV Reaction Stoichiometry: 1) 2,4-diaminobenzenesulfonic acid, ≥98%, 6.00 grams used (31.881 millimole). 2) Paraformaldehyde, ≥88%, 3.83 grams used (0.1275 mole). 3) Trifluoroacetic acid (TFA), 99%, 99.8% actual GC purity on COA, 80 milliliters used.

2,4-Diaminobenzenesulfonic acid and paraformaldehyde were weighed under dry nitrogen into a 4 ounce glass bottle along with a magnetic stirring bar and TFA was added with magnetic stirring. The bottle was sealed and magnetically stirred to give brown colored slurry. After 116.7 hours, the solution was transferred to a 2 liter glass beaker along with 200 milliliters of DI water with continued stirring followed by pH adjustment from 0-1 to 3 with dilute 5% weight sodium hydroxide solution, giving an orange colored slurry. The product was recovered by gravity filtration on paper. The solids on the filter paper were allowed to air dry overnight. The resulting powder was recovered (3.53 grams) and added to a 2 ounce glass bottle along with tetrahydrofuran (50 milliliters) and a magnetic stir bar, sealed, and stirred overnight. The product was recovered by gravity filtration on paper, with much of the product not recovered due to strong adhesion to the filter paper. The product was recombined with tetrahydrofuran (50 milliliters) and stirred overnight. The product was recovered by vacuum filtration on a medium fritted glass funnel, washed with tetrahydrofuran, and placed overnight in a vacuum oven at 100° C. The resulting product was a light orange colored powder (3.06 grams). TGA of a sample (3.7270 milligrams) was completed using the method of Example 1. Onset to Td and volatiles (% weight) lost up to Td after prehold at 150° C. for 60 minutes were 213.08° C. and 9.42%, respectively. DSC analysis of a sample (10.7 milligrams) was completed using the method of Example 1 with no events detected in the second analysis.

The condensation reaction of 2,4-diaminobenzenesulfonic acid with paraformaldehyde in TFA was repeated using the stoichiometry given above. After 68.95 hours, the solution was transferred to a 2 liter glass beaker along with 200 milliliters of DI water with continued stirring followed by pH adjustment from 0-1 to 3 with dilute 5% weight sodium hydroxide solution, giving an orange colored slurry. The product was recovered by vacuum filtration on a medium fitted glass funnel. The resulting powder was recovered (14.68 grams) and added to a 4 ounce glass bottle along with tetrahydrofuran (60 milliliters) and a magnetic stir bar, sealed, stirred overnight. The product was recovered by vacuum filtration and washed with tetrahydrofuran. The product was recombined with tetrahydrofuran (60 milliliters) and stirred overnight. The product was recovered by vacuum filtration, washed with tetrahydrofuran, and placed overnight in a vacuum oven at 100° C. The resulting product was an orange colored powder (7.54 grams). TGA of a sample (2.9680 milligrams) was completed using the method of Example 1. Onset to Td and volatiles (% weight) lost up to Td after prehold at 150° C. for 60 minutes were 217.46° C. and 9.73%, respectively. DSC analysis of a sample (10.4 milligrams) was completed using the method of Example 1 with no events detected in the second analysis.

Example 10

Condensation of 2,4-diaminophenol Dihydrochloride (50%) and 3,5-Diaminobenzoic Acid Dihydrochloride with Paraformaldehyde in Trifluoroacetic Acid as Illustrated in Reaction Pathway XI Reaction Stoichiometry: 1) 2,4-Diaminophenol dihydrochloride, 6.00 grams used (30.448 millimole). 2) 3,5-diaminobenzoic acid dihydrochloride, 99%, 6.85 grams used (30.448 millimole). 3) Paraformaldehyde, >88%, 7.31 grams used (0.2436 mole). 4) Trifluoroacetic acid (TFA), 99.8% actual GC purity on COA, 160 milliliters used.

2,4-Diaminophenol dihydrochloride; 3,5-diaminobenzoic acid dihydrochloride; and paraformaldehyde were weighed under dry nitrogen into an 8 ounce glass bottle along with a magnetic stirring bar and TFA was added with magnetic stirring. The bottle was sealed and magnetically stirred to give a dark brown colored hazy solution. After 95.0 hours, the mixture was transferred to a 2 liter glass beaker along with 350 milliliters of DI water with continued stirring followed by pH adjustment from 0-1 to 4 with dilute 5% weight sodium hydroxide solution. After adjustment back to a pH of 2, the fine light brown colored slurry gravity filtered on paper and washed with DI water to cover and allowed to air dry overnight. The resulting damp powder was recovered (20.85 grams) and added to an 8 ounce glass bottle along with tetrahydrofuran (80 milliliters) and a magnetic stir bar, sealed, and stirred overnight. The product was recovered by vacuum filtration on a medium fritted glass funnel. The product was washed with tetrahydrofuran, recovered, and added back into the glass bottle along with fresh tetrahydrofuran (50 milliliters) and magnetically stirred overnight. The product was recovered by vacuum filtration on the fritted glass funnel, washed with tetrahydrofuran, and placed overnight in a vacuum oven at 100° C. The resulting product was a light brown colored powder (8.67 grams). TGA of a sample (2.9090 milligrams) was completed using the method of Example 1. Onset to Td, end of Td, and volatiles (% weight) lost up to onset to Td after prehold at 150° C. for 60 minutes were 214.08° C., 245.12° C. (minor step, 11.74 weight % loss), and 10.99%, respectively. A second distinct step was noted giving an onset to Td of 348.83° C. DSC analysis of a sample (10.4 milligrams) was completed using the method of Example 1 with no events detected in the second analysis.

Example 11

Condensation of 2,5-diaminobenzenesulfonic Acid (50%) and 1,3-phenylenediamine with Paraformaldehyde in Trifluoroacetic Acid as Illustrated in Reaction Pathway X Reaction Stoichiometry: 1) 2,5-diaminobenzenesulfonic acid, ≥97%, 6.00 grams used (31.881 millimole). 2) 1,3-Phenylenediamine, ≥99%, 3.45 grams used (31.881 millimole). 3) Paraformaldehyde, ≥88%, 3.20 grams used (0.2551 mole). 4) Trifluoroacetic acid (TFA), 99.8% actual GC purity on COA, 160 milliliters used.

2,5-Diaminobenzenesulfonic acid dihydrochloride and 1,3-phenylenediamine were weighed under dry nitrogen into an 8 ounce glass bottle along with a magnetic stirring bar and TFA was added with magnetic stirring. The bottle was sealed and magnetically stirred to give a lavender colored slurry which became a purple colored solution 4 minutes later. Pre-weighed paraformaldehyde was added and after stirring for 4 minutes, a dark amber colored solution formed. One minute later, a dark amber red colored fine slurry formed. After 71.0 hours, the dark amber red colored slurry was transferred to a 2 liter glass beaker along with 350 milliliters of DI water with continued stirring followed by pH adjustment from 0-1 to 7 with dilute 5% weight sodium hydroxide solution. At pH 7, a yellow colored slurry formed and the pH was adjusted back to 2 using dilute aqueous hydrochloric acid. The bright orange colored slurry was gravity filtrated on paper and washed with DI water to cover. After air drying overnight, the damp powder was recovered (24.35 grams) and added to an 8 ounce glass bottle along with tetrahydrofuran (80 milliliters) and a magnetic stir bar, sealed, and magnetically stirred overnight. The product was recovered by vacuum filtration on a medium fitted glass funnel, washed with tetrahydrofuran, and placed overnight in a vacuum oven at 100° C. The resulting product was a medium orange colored powder (10.69 grams).

TGA of a sample (3.6110 milligrams) was completed using the method of Example 1. Onset to Td, end of Td, and volatiles (% weight) lost up to onset to Td after prehold at 150° C. for 60 minutes were 205.36° C., 249.98° C. (minor step, 11.06 weight % loss), and 9.48%, respectively. A second distinct step was noted giving an onset to Td of 397.20° C. DSC analysis of a sample (10.3 milligrams) was completed using the method of Example 1 with no events detected in the second analysis.

Example 12

Condensation of 2,5-diaminobenzenesulfonic Acid (50%) and 3,5-diaminobenzoic Acid Dihydrochloride with Paraformaldehyde in Trifluoroacetic Acid as Illustrated in Reaction Pathway XI Reaction Stoichiometry: 1) 2,5-Diaminobenzenesulfonic acid, ≥97%, 5.73 grams used (30.448 millimole). 2) 3,5-Diaminobenzoic acid dihydrochloride, 99%, 6.85 grams used (30.448 millimole). 3) Paraformaldehyde, ≥88%, 7.31 grams used (0.2436 mole). 4) Trifluoroacetic acid (TFA), 99.8% actual GC purity on COA, 160 milliliters used.

2,5-Diaminobenzenesulfonic acid; 3,5-diaminobenzoic acid dihydrochloride; and paraformaldehyde were weighed under dry nitrogen into an 8 ounce glass bottle along with a magnetic stirring bar and TFA was added with magnetic stirring. The bottle was sealed and magnetically stirred to give a yellow colored slurry which became a orange red colored solution 79 minutes later. After 47.0 hours, the cloudy orange red colored mixture was transferred to a 2 liter glass beaker along with 300 milliliters of DI water with continued stirring followed by pH adjustment from 0-1 to 2 with dilute 5% weight sodium hydroxide solution. The orange red colored slurry was gravity filtered on paper and washed with DI water to cover and allowed to air dry overnight. The resulting damp orange colored powder was recovered (13.30 grams) and added to an 8 ounce glass bottle along with tetrahydrofuran (60 milliliters) and a magnetic stir bar, sealed, and stirred overnight. The product was recovered by vacuum filtration on a medium fitted glass funnel. The product was washed with tetrahydrofuran, recovered, and added back into the glass bottle along with fresh tetrahydrofuran (60 milliliters) and magnetically stirred overnight. The product was recovered by vacuum filtration on the fitted glass funnel, washed with tetrahydrofuran, and placed overnight in a vacuum oven at 100° C. The resulting product was a medium orange colored powder (10.03 grams).

TGA of a sample (4.0140 milligrams) was completed using the method of Example 1. Onset to Td, end of Td, and volatiles (% weight) lost up to onset to Td after prehold at 150° C. for 60 minutes were 214.07° C., 247.66° C. (minor step, 7.054 weight % loss), and 7.32%, respectively. A second distinct step was noted giving an onset to Td of 362.44° C. DSC analysis of a sample (11.0 milligrams) was completed using the method of Example 1 with no events detected in the second analysis.

Example 13

Condensation of 2,4-diaminophenol Dihydrochloride (0.0122 Amine Equivalent) and Tetrakis(4-aminophenyl)Methane (0.003045 Amine Equivalent) with Paraformaldehyde in Trifluoroacetic Acid as Illustrated in Reaction Pathway XII Reaction Stoichiometry: 1) 2,4-Diaminophenol dihydrochloride, 98%, 1.20 grams used (6.090 millimole). 2) Tetrakis(4-aminophenyl)methane, 0.2896 gram used (0.7612 millimole). 3) Paraformaldehyde, ≥88%, 0.91 gram used (30.447 millimole). 4) Trifluoroacetic acid (TFA), 99.8% actual GC purity on COA, 25 milliliters used.

2,4-Diaminophenol dihydrochloride; tetrakis(4-aminophenyl)methane; and paraformaldehyde were weighed under dry nitrogen into a 2 ounce glass bottle along with a magnetic stirring bar and TFA was added with magnetic stirring. The bottle was sealed and magnetically stirred to give a yellow brown colored slurry which became a dark brown colored solution 17 minutes later. After 67.95 hours, the dark brown colored solution was transferred to a 1 liter glass beaker along with ice to the 100 milliliter mark with continued stirring followed by pH adjustment from 0-1 to 4 with dilute 5% weight sodium hydroxide solution. The slurry was gravity filtered on paper and washed with DI water to cover and allowed to air dry overnight. The resulting powder was recovered and added to 2 ounce glass bottle along with tetrahydrofuran (20 milliliters) and a magnetic stir bar, sealed, and stirred overnight. The product was recovered by gravity filtration on paper. The medium brown colored powder product was washed on the filter paper with tetrahydrofuran, recovered, and added back into the glass bottle along with fresh tetrahydrofuran (20 milliliters) and magnetically stirred overnight. The product was recovered by gravity filtration on paper, washed with tetrahydrofuran, and placed overnight in a vacuum oven at 100° C. The resulting product was a medium brown colored powder (0.81 gram).

FTIR analysis of a KBr pellet of the product confirmed the co-polymer structure. TGA of a sample (3.1140 milligrams) was completed using the method of Example 1. Onset to Td, end of Td, and volatiles (% weight) lost up to onset to Td after prehold at 150° C. for 60 minutes were 216.62° C., 253.59° C. (29.85 weight % loss), and 6.26%, respectively. DSC analysis of a sample (12.2 milligrams) was completed using the method of Example 1 with no events detected in the second analysis.

The condensation reaction of 2,4-diaminophenol dihydrochloride and tetrakis(4-amino phenyl)methane with paraformaldehyde in TFA was repeated using the method given above with 7.5-fold increase in scale. After 42.83 hours, the dark brown colored solution was transferred to a 2 liter glass beaker along with ice to the 400 milliliter mark with continued stirring followed by pH adjustment from 0-1 to 10 with dilute 5% weight sodium hydroxide solution. The pH was adjusted back to 4 with dilute aqueous hydrochloric acid. The product was recovered by gravity filtration on filter paper, washed with DI water to cover, allowed to air dry overnight, and then partially dried at 100° C. in the vacuum oven to 12.01 grams. The powder product was added to a 4 ounce glass bottle along with tetrahydrofuran (120 milliliters) and a magnetic stir bar, sealed, and stirred overnight. The product was recovered by gravity filtration on paper and washed with tetrahydrofuran. The product was recombined with fresh tetrahydrofuran (80 milliliters) and stirred overnight. The product was recovered by vacuum filtration, washed with tetrahydrofuran, and placed overnight in a vacuum oven at 100° C. The resulting product was a medium brown colored powder (10.63 grams).

FTIR analysis of a KBr pellet of the product confirmed the co-polymer structure. TGA of a sample (4.5820 milligrams) was completed using the method of Example 1. Onset to Td, end of Td, and volatiles (% weight) lost up to onset to Td after prehold at 150° C. for 60 minutes were 211.79° C., 252.39° C. (34.66 weight % loss), and 5.26%, respectively. DSC analysis of a sample (13.4 milligrams) was completed using the method of Example 1 with no events detected in the second analysis.

The condensation reaction of 2,4-diaminophenol dihydrochloride and tetrakis(4-aminophenyl)methane with paraformaldehyde in TFA was repeated using the stoichiometry and method for the prior reaction with the 7.5-fold increase in scale with the only change being an increase in reaction time from 42.83 hours to 91.62 hours. The resulting product was a medium brown colored powder (10.63 grams). FTIR analysis of a KBr pellet of the product confirmed the co-polymer structure. TGA of a sample (4.0760 milligrams) was completed using the method of Example 1. Onset to Td, end of Td, and volatiles (% weight) lost up to onset to Td after prehold at 150° C. for 60 minutes were 220.44° C., 254.76° C. (38.47 weight % loss), and 5.65%, respectively. DSC analysis of a sample (12.6 milligrams) was completed using the method of Example 1 with no events detected in the second analysis. MALDI MS was completed on a sample of the product demonstrating a lower mass series with the 160 dalton repeat unit expected for the $C_9H_8ON_2$ repeat structure, as observed in Example 4, but now along with a higher mass series with the repeat unit containing the network Troger's base structure resulting from reaction of the tetrakis(4-aminophenyl)methane. Representative of the lower mass series detected were 501, 661.3, 821.4, 981.4, 1141 dalton. Representative of the higher mass series detected were 1147.5, 1307.6, 1467.6, 1627.7, 1788.8 dalton.

Example 14

Synthesis of Partial Ionically Crosslinked Troger's Base Polymer as Illustrated in Reaction Pathway XVI Reaction Stoichiometry: 1) Troger's base polymer of Example 9 prepared by condensation of 2,4-diaminobenzenesulfonic acid with paraformaldehyde in trifluoroacetic acid, 1.7938 grams used (8.0 milliequivalent based on 224.22 grams/equivalent repeat unit). 2) 1,3-Phenylenediamine, ≥99%, 0.2163 gram used (4.0 milliequivalent). 3) Stock solvent solution of methanol (160 milliliters) plus DI water (240 milliliters).

60/40 volume/volume DI water/methanol solution was added into a 2 liter Erlenmeyer flask along with a magnetic stirring bar. The flask opening was covered with aluminum foil, then heating of the solution with stirring on a hot plate commenced to boiling. All Troger's base polymer was added to the boiling solution giving an orange amber colored solution within one minute. After an additional two minutes heating ceased and all of the 1,3-phenylenediamine was added to the stirred hot solution. The 1,3-phenylenediamine instantly went into solution immediately followed by development of haziness in the solution which progressively increased to give a fine orange colored slurry within 30 seconds of the 1,3-phenylenediamine addition. The stirred slurry was held overnight while cooling to room temperature. HPLC analysis of a sample of the slurry product demonstrated 100% conversion of the 1,3-phenylenediamine. The slurry was rotary evaporated using a maximum hot oil bath temperature of 75° C. A total of 1.92 grams of golden orange colored powder was recovered from the rotary evaporation flask and placed overnight in a vacuum oven at 150° C. TGA of a sample (3.6120 milligrams) was completed using the method of Example 1. Onset to Td and volatiles (% weight) lost up to onset to Td after prehold at 150° C. for 60 minutes were 246.20° C. and 8.17%, respectively. DSC analysis of a sample (10.6 milligrams) was completed using the method of Example 1 with no events detected in the second analysis. The partial ionic crosslinking produced a 35° C. increase in onset to Td from the onset to Td of 211.51° C. for the non-crosslinked Troger's base polymer of Example 9.

Example 15

Synthesis of Partial Covalently Crosslinked Troger's Base Polymer as Illustrated in Reaction Pathway XVII Reaction Stoichiometry: 1) Partial ionically crosslinked Troger's base polymer of Example 14 prepared by reaction of 1,3-phenylenediamine with Troger's base polymer from condensation of 2,4-diaminobenzenesulfonic acid with paraformaldehyde in trifluoroacetic acid, 1.68 grams used (3.343 milliequivalent of amine sulfonate salt). 2) 2,4,6-trichloro-1,3,5-triazine, 99%, 0.204 gram used (3.343 milliequivalent). 3) Acetonitrile, 99.8%, anhydrous, used 100 milliliters. 4) Triethylamine, ≥99.5%, 0.40 gram used (3.95 milliequivalent).

Under dry nitrogen, all reactants and solvent were added to a 250 milliliter, 3 necked, round bottom flask equipped with a poly(tetrafluoroethylene) coated thermocouple, fan cooled spiral condenser, magnetic stirring, ground glass stopped, and a heating mantle controlled by the temperature input from the thermocouple. Heating commenced and the reaction was held at reflux (83° C.) for the next 115.4 hours. During this time, the reaction mixture changed from a light brown to a light orange brown colored slurry. HPLC analysis during the course of the reaction revealed that after 26.9 hours of reaction, only minor residual 2,4,6-trichloro-1,3,5-triazine remained and the minor amount did not change over the next 88.5 hours at reflux.

Heating ceased and the heating mantle was removed from the reactor. Once the stirred slurry had cooled to 28.2° C., triethylamine was added. An exotherm to a maximum of 29.2° C. occurred 21 minutes after the triethylamine addition followed by gradual cooling to 28.1° C. while stirring overnight. The slurry was removed from the dry nitrogen atmosphere 25.1 hours after the triethylamine addition and gravity filtered over paper. The golden yellow brown colored powder on the filter paper was rinsed with acetonitrile to cover and then the product was air dried on the filter. The product from the filter was placed in a ceramic dish and dried in the vacuum oven overnight at 100° C. TGA of a sample (3.1950 milligrams) was completed using the method of Example 1. Onset to Td and volatiles (% weight) lost up to onset to Td after prehold at 150° C. for 60 minutes were 251.24° C. and 14.35%, respectively. The partial covalent crosslinking produced a 40° C. increase in onset to Td from the onset to Td of 211.51° C. for the non-cross-linked Troger's base polymer of Example 9. MALDI MS was completed on a sample of the product demonstrating the 224 dalton repeat unit expected for the $C_9H_8O_3N_2S$ repeat structure along with additional masses with the repeat unit containing the network bis(sulfonamide) crosslinking structure. Representative of the 224 dalton repeat series detected were 875.7, 899.8, 1124, 1348.2 dalton and 1197.0 dalton for a mass including the bis(sulfonamide) crosslinking structure.

Example 16

Condensation of 2,4-diaminophenol Dihydrochloride and 1,3,5-triaminobenzene Trihydrochloride with Paraformaldehyde in Trifluoroacetic Acid as Illustrated in Reaction Pathway XVI Reaction Stoichiometry: 1) 2,4-Diaminophenol dihydrochloride, 98%, 4.96 grams used (25.16 millimole, 50.321 —NH₂ milliequivalent). 2) 1,3,5-Triaminobenzene trihydrochloride, 95%, 1.30 grams used (5.59 millimole, 16.774 —NH₂ milliequivalent). 3) Paraformaldehyde, ≥88%, 4.03 grams used (0.1342 mole). 4) Trifluoroacetic acid (TFA), 99.8% actual GC purity on COA, 110 milliliters used.

2,4-Diaminophenol dihydrochloride; 1,3,5-triaminobenzene trihydrochloride; and paraformaldehyde were weighed under dry nitrogen into a 4 ounce glass bottle along with a magnetic stirring bar and TFA was added with magnetic stirring. The bottle was sealed and magnetically stirred to give a green gray colored slurry which became a medium brown colored slurry overnight. After 139.9 hours, the dark brown colored slurry was transferred to a 1 liter glass beaker along with ice to the 200 milliliter mark with continued stirring followed by pH adjustment from 0-1 to 10 with dilute 5% weight sodium hydroxide solution, then back to pH 4 with dilute aqueous hydrochloric acid. The tan colored slurry was gravity filtered on paper and washed with DI water to cover and allowed to air dry overnight. The resulting powder was recovered and added to 2 ounce glass bottle along with tetrahydrofuran (60 milliliters) and a magnetic stir bar, sealed, and stirred overnight. The product was recovered by gravity filtration on paper. The medium brown colored powder product was washed on the filter paper with tetrahydrofuran, recovered, and added back into the glass bottle along with fresh tetrahydrofuran (60 milliliters) and magnetically stirred overnight. The product was recovered by gravity filtration on paper, washed with tetrahydrofuran, and placed overnight in a vacuum oven at 100° C. The resulting product was a medium orange brown colored powder (5.29 grams).

TGA of a sample (4.6990 milligrams) was completed using the method of Example 1. Onset to Td, end of Td, and volatiles (% weight) lost up to onset to Td after prehold at 150° C. for 60 minutes were 209.33° C., 248.55° C. (minor step, 13.13 weight % loss), and 8.47%, respectively. A second distinct step was noted giving an onset to Td of 371.83° C. DSC analysis of a sample (13.8 milligrams) was completed using the method of Example 1 with no events detected in the second analysis.

Example 17

Higher Temperature Condensation of 2,4-diaminophenol Dihydrochloride with Paraformaldehyde in Trifluoroacetic Acid as Illustrated in Reaction Pathway V Reaction Stoichiometry: 1) 2,4-Diaminophenol dihydrochloride, 98%, 12.00 grams used (60.90 millimole). 2) Paraformaldehyde, ≥88%, 7.31 grams used (0.2436 mole). 3) Trifluoroacetic acid (TFA), 99.8% actual GC purity on COA, 160 milliliters used.

2,4-Diaminophenol dihydrochloride and paraformaldehyde were weighed under dry nitrogen into a 500 milliliter, 3 necked, round bottom, flask equipped with a poly(tetrafluoroethylene) coated thermocouple, fan cooled spiral condenser, magnetic stirring, ground glass stopped, and a heating mantle controlled by the temperature input from the thermocouple. Magnetic stirring commenced simultaneous with the addition of TFA to give a gray brown colored slurry. The heating mantle was placed under the reactor 3.77 hours after the addition of TFA and reflux was achieved after an additional 1.50 hours. The reaction was held at reflux (78.2° C.) for the next 66.42 hours. After cooling to room temperature, the dark brown colored solution was transferred to a 1 liter glass beaker containing ice to the 200 milliliter mark with magnetic stirring and pH adjustment from 0-1 with dilute 5% weight sodium hydroxide solution to 5. At pH 2, a brown colored precipitate formed. At pH 5, a tan colored slurry was present. The slurry was gravity filtered on paper and washed with DI water to cover and allowed to air dry overnight. The resulting powder was recovered and added to 4 ounce glass bottle along with tetrahydrofuran (80 milliliters) and a magnetic stir bar, sealed, and stirred overnight. The product was recovered by gravity filtration on paper. The medium brown colored powder product was washed on the filter paper with tetrahydrofuran, recovered, and added back into the glass bottle along with fresh tetrahydrofuran (80 milliliters) and magnetically stirred overnight. The product was recovered by gravity filtration on paper, washed with tetrahydrofuran, and placed overnight in a vacuum oven at 100° C. The resulting product was a medium brown colored powder (8.93 grams).

TGA of a sample (4.0620 milligrams) was completed using the method of Example 1. Onset to Td, end of Td, and volatiles (% weight) lost up to onset to Td after prehold at 150° C. for 60 minutes were 218.79° C. (minor step, 16.51 weight % loss), 258.43° C., and 6.79%, respectively. A second distinct step was noted giving an onset to Td of 350.81° C. DSC analysis of a sample (12.9 milligrams) was completed using the method of Example 1 with no events detected in the second analysis.

Example 18

Condensation of 3,5-diaminobenzoic Acid Dihydrochloride (12.2 Amine Milliequivalent) and Tetrakis(4-aminophenyl)Methane (3.045 Amine Milliequivalent) with Paraformaldehyde in Trifluoroacetic Acid as Illustrated in Reaction Pathway XIII Reaction Stoichiometry: 1) 3,5-Diaminobenzoic acid dihydrochloride, 99%, 1.37 grams used (6.090 millimole). 2) Tetrakis(4-aminophenyl)methane, 0.2896 gram used (0.7612 millimole). 3) Paraformaldehyde, ≥88%, 0.91 gram used (30.45 millimole). 4) Trifluoroacetic acid (TFA), 99.8% actual GC purity on COA, 25 milliliters used.

3,5-Diaminobenzoic acid dihydrochloride; tetrakis(4-aminophenyl)methane; and paraformaldehyde were weighed under dry nitrogen into a 2 ounce glass bottle along with a magnetic stirring bar and TFA was added with magnetic stirring. The bottle was sealed and magnetically stirred to give a pink colored slurry which became a slurry of white powder in yellow colored liquid overnight. After 96.47 hours, the orange yellow colored slurry was transferred to a 1 liter glass beaker along with ice to the 100 milliliter mark with continued stirring followed by pH adjustment from 0-1 to 10 with dilute 5% weight sodium hydroxide solution and adjustment back to pH 4-5 with dilute aqueous hydrochloric acid. The slurry was gravity filtered on paper and washed with DI water to cover and allowed to air dry overnight. The resulting powder was recovered and added to 2 ounce glass bottle along with tetrahydrofuran (20 milliliters) and a magnetic stir bar, sealed, and stirred overnight. The product was recovered by gravity filtration on paper. The medium brown colored powder product was washed on the filter paper with tetrahydrofuran, recovered, and added back into the glass bottle along with fresh tetrahydrofuran (20 milliliters) and magnetically stirred overnight. The product was recovered by gravity filtration on paper, washed with tetrahydrofuran, allowed to air dry, then placed in a ceramic dish and placed overnight in a vacuum oven at 100° C. The resulting product was a yellow colored powder (1.25 grams).

TGA of a sample (4.2530 milligrams) was completed using the method of Example 1. Onset to Td and volatiles (% weight) lost up to onset to Td after prehold at 150° C. for 60 minutes were 420.21° C. and 12.65%, respectively. DSC analysis of a sample (11.9 milligrams) was completed using the method of Example 1 with no events detected in the second analysis.

Example 19

Condensation of 2,4-diaminobenzenesulfonic Acid (12.2 Amine Milliequivalent) and Tetrakis(4-aminophenyl)Methane (3.045 Amine Milliequivalent) with Paraformaldehyde in trifluoroacetic acid as illustrated in Reaction pathway XIV Reaction Stoichiometry: 1) 3,5-Diaminobenzenesulfonic acid, ≥98%, 1.15 grams used (6.090 millimole). 2) Tetrakis(4-aminophenyl)methane, 0.2896 gram used (0.7612 millimole). 3) Paraformaldehyde, ≥88%, 0.91 gram used (30.45 millimole). 4) Trifluoroacetic acid (TFA), 99.8% actual GC purity on COA, 25 milliliters used.

2.4-Diaminobenzenesulfonic acid; tetrakis(4-aminophenyl)methane; and paraformaldehyde were weighed under dry nitrogen into a 2 ounce glass bottle along with a magnetic stirring bar and TFA was added with magnetic stirring. The bottle was sealed and magnetically stirred to give a lavender colored slurry which became a yellow orange colored solution overnight. After 116.92 hours, the dark orange colored solution was transferred to a 1 liter glass beaker along with ice to the 100 milliliter mark with continued stirring followed by pH adjustment from 0-1 to 10 with dilute 5% weight sodium hydroxide solution and adjustment back to pH 5 with dilute aqueous hydrochloric acid. The orange colored slurry was gravity filtered on paper and washed with DI water to cover and allowed to air dry overnight. The resulting powder was recovered and added to 2 ounce glass bottle along with tetrahydrofuran (20 milliliters) and a magnetic stir bar, sealed, and stirred overnight. The product was recovered by gravity filtration on paper. The medium brown colored powder product was washed on the filter paper with tetrahydrofuran, recovered, and added back into the glass bottle along with fresh tetrahydrofuran (20 milliliters) and magnetically stirred overnight. The product was recovered by gravity filtration on paper, washed with tetrahydrofuran, allowed to air dry, then placed in a ceramic dish and dried overnight in a vacuum oven at 100° C. The resulting product was a medium brown colored powder (0.61 gram).

TGA of a sample (4.3070 milligrams) was completed using the method of Example 1. Onset to Td, end of Td, and volatiles (% weight) lost up to onset to Td after prehold at 150° C. for 60 minutes were 220.14° C., 264.92° C. (minor step, 2.830 weight % loss), and 12.65%, respectively. A second distinct step was noted giving an onset to Td of 416.26° C. DSC analysis of a sample (12.2 milligrams) was completed using the method of Example 1 with a minor step transition detected at 159.6° C. in the second analysis.

Example 20

Condensation of 2,5-diaminobenzenesulfonic Acid (12.2 Amine Milliequivalent) and Tetrakis(4-aminophenyl)Methane (3.045 Amine Milliequivalent) with Paraformaldehyde in Trifluoroacetic Acid as Illustrated in Reaction Pathway XV The reaction stoichiometry and method of Example 19 was used, with substitution of 2,5-diaminobenzenesulfonic acid for 2,4-diaminobenzenesulfonic acid. The resulting product was a medium brown colored powder (0.87 gram). TGA of a sample (5.3590 milligrams) was completed using the method of Example 1. Onset to Td, end of Td, and volatiles (% weight) lost up to onset to Td after prehold at 150° C. for 60 minutes were 226.52° C., 270.24° C., (minor step, 3.845% weight loss), and 13.03%, respectively. A second distinct step was noted giving an onset to Td of 424.60° C. DSC analysis of a sample (13.8 milligrams) was completed using the method of Example 1 with a minor step transition detected at 164.3° C. in the second analysis. Three additional scannings gave the same minor step transition in the DSC analysis.

Example 21

Condensation of Aniline and 2,4-diaminophenol Dihydrochloride with Paraformaldehyde in Trifluoroacetic Acid Reaction Stoichiometry: 1) Aniline, 98%, 2.80 grams used (30.066 millimoles). 2) 2,4-Diaminophenol dihydrochloride, 98%, 4.14 grams used (21.009 millimoles). 3) Paraformaldehyde, ≥88%, 4.32 grams used (0.1439 mole). 4) Trifluoroacetic acid (TFA), 99.8% actual GC purity on COA, 120 milliliters used.

Aniline and 2,4-diaminophenol dihydrochloride were weighed under dry nitrogen into an 8 ounce glass bottle along with a magnetic stirring bar. TFA was added with magnetic stirring forming a gray colored slurry and the bottle was sealed. After 6 minutes, the bottle was opened and pre-weighed paraformaldehyde was added followed by resealing. After stirring for 2 minutes, a drab green colored slurry formed. After a cumulative 5 hours 34 minutes a transparent brown yellow colored solution had formed. After stirring for a cumulative 71 hours 41 minutes, the solution was transferred to a 1 liter glass beaker containing ice to the 400 milliliter mark then stirred followed by pH adjustment from 0-1 to 4 with 20% weight aqueous sodium hydroxide. The product was recovered by gravity filtration on paper, washed with DI water to cover, and air dried overnight. The resulting damp powder was recovered (26.08 grams) from the filter paper, added to a ceramic dish, and dried in a vacuum oven for 25 hours at 100° C. The resulting product was a brown colored powder (5.08 grams). TGA of a sample (6.4070 milligrams) was completed using the method of Example 1. Onset of transition temperature (Td), end of Td, and volatiles lost up to onset to Td after prehold at 150° C. for 60 minutes were 206.92° C., 246.86° C., and 5.08% weight, respectively. DSC analysis of a sample (6.4 milligrams) was completed using the method of Example 1 from 0° C. to 190° C. A second analysis was immediately conducted on the sample using the aforementioned conditions, after the first analysis was completed, with no events detected. MALDI MS confirmed the phenyl termination, with the following proposed structures detected:

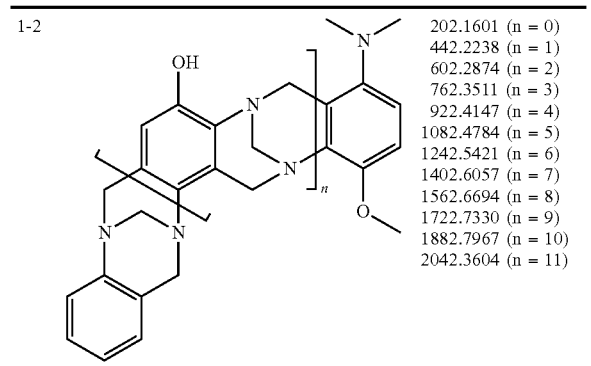

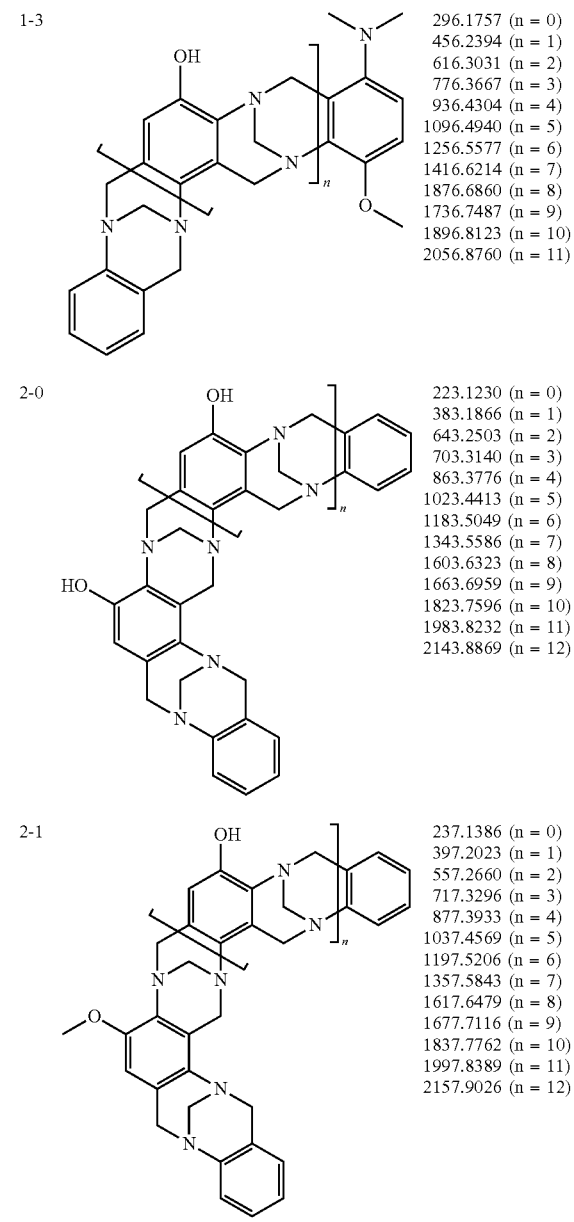

Example 22

Repeat Condensation of Aniline and 2,4-diaminophenol Dihydrochloride with Paraformaldehyde in Trifluoroacetic Acid The reaction of Example 21 was repeated at one-half the original scale: 1) Aniline, 98%, 1.40 grams used (15.033 millimoles). 2) 2,4-Diaminophenol dihydrochloride, 98%, 2.07 grams used (10.504 millimoles). 3) Paraformaldehyde, ≥88%, 2.16 grams used (71.938 millimoles). 4) to Trifluoroacetic acid (TFA), 99.8% actual GC purity on COA, 60 milliliters used. TGA of a sample (3.7770 milligrams) gave an onset to Td, end of Td, and volatiles (% weight) lost up to onset to Td after prehold at 150° C. for 60 minutes of 202.85° C., 244.45° C., and 6.04% weight, respectively.

Example 23

Condensation of Aniline and 2,4-diaminophenol Dihydrochloride with Paraformaldehyde in Trifluoroacetic Acid Using Reduced Amount of Aniline The reaction of Example 22 was repeated using a reduced amount of aniline: 1) Aniline, 98%, 0.84 gram used (9.02 millimoles). 2) 2,4-Diaminophenol dihydrochloride, 98%, 2.07 grams used (10.504 millimoles). 3) Paraformaldehyde, ≥88%, 1.80 grams used (59.948 millimoles). 4) Trifluoroacetic acid (TFA), 99.8% actual GC purity on COA, 60 milliliters used. TGA of a sample (6.6230 milligrams) gave an onset to Td, end of Td, and volatiles (% weight) lost up to onset to Td after prehold at 150° C. for 60 minutes of 209.93° C., 253.62° C., and 6.93% weight, respectively. DSC analysis of a sample (13.5 milligrams) completed from 0° C. to 170° C. detected no events in the second analysis.

Example 24

Condensation of 4-aminophenol and 1,3-phenylenediamine with Paraformaldehyde in Trifluoroacetic Acid Reaction Stoichiometry: 1) 4-Aminophenol, 98+%, 2.95 grams used (27.032 millimoles). 2) 1,3-Phenylenediamine, ≥99%, 3.41 grams used (31.533 millimoles). 3) Paraformaldehyde, ≥88%, 5.41 grams used (0.1802 mole). 4) Trifluoroacetic acid (TFA), 99.8% actual GC purity on COA, 90 milliliters used.

4-Aminophenol, 1,3-phenylenediamine and paraformaldehyde were weighed under dry nitrogen into a 4 ounce glass bottle along with a magnetic stirring bar. TFA was added with magnetic stirring forming an amber colored slurry and the bottle was sealed. After stirring for 8 minutes, a red amber colored solution formed. After stirring for a cumulative 65 hours 44 minutes, the solution was transferred to a 1 liter glass beaker containing ice to the 300 milliliter mark then stirred followed by pH adjustment from 0-1 to 10 with 20% weight aqueous sodium hydroxide, then back to pH=2 with addition of concentrated aqueous hydrochloric acid. The product was recovered by gravity filtration on paper, washed with DI water to cover, and air dried overnight. The resulting damp powder was recovered (14.17 grams) from the filter paper and added to a 2 ounce glass bottle along with tetrahydrofuran (50 milliliters) and a magnetic stir bar, sealed, and stirred for 24 hours and 32 minutes. The orange colored slurry was added to magnetically stirred acetone (200 milliliters) in a glass beaker and then gravity filtered on paper followed by air drying. The resulting slightly damp orange colored powder was recovered from the filter paper, added to a ceramic dish, and dried in a vacuum oven for 23 hours 40 minutes at 100° C. The resulting product was an orange colored powder (4.67 grams). TGA of a sample (7.3850 milligrams) was completed using the method of Example 1. Onset to Td, end of Td, and volatiles (% weight) lost up to onset to Td after prehold at 150° C. for 60 minutes were 206.55° C., 242.82° C., and 4.72% weight, respectively. DSC analysis of a sample (11.0 milligrams) was completed using the method of Example 1 with no events detected in the second analysis.

Example 25

Condensation of 4-aminophenol and 2,4-diaminophenol Dihydrochloride with Paraformaldehyde in Trifluoroacetic Acid Reaction Stoichiometry: 1) 4-Aminophenol, 98+%, 0.98 gram used (8.980 millimoles). 2) Diaminophenol dihydrochloride, 98%, 2.07 grams used (10.504 millimoles). 3) Paraformaldehyde, ≥88%, 1.80 grams used (59.948 millimoles). 4) Trifluoroacetic acid (TFA), 99.8% actual GC purity on COA, 30 milliliters used.

4-Aminophenol, 2,4-diaminophenol dihydrochloride and paraformaldehyde were weighed under dry nitrogen into a 2 ounce glass bottle along with a magnetic stirring bar. TFA was added with magnetic stirring forming a yellow gray colored slurry and the bottle was sealed. After stirring for 1 hour 16 minutes, a gold brown colored slurry formed. After stirring for a cumulative 18 hours 27 minutes, a dark amber colored solution had formed. After stirring for a cumulative 140 hours 15 minutes, the solution was transferred to a 1 liter glass beaker containing ice to the 200 milliliter mark then stirred followed by pH adjustment from 0-1 to 4 with 20% weight aqueous sodium hydroxide. The product was recovered by gravity filtration on paper, washed with DI water to cover, and air dried overnight. The portion of the resulting damp tan colored powder which had not adhered to the filter paper was recovered (1.95 grams) and added to a 2 ounce glass bottle along with tetrahydrofuran (15 milliliters) and mixed on a mechanical shaker for 29 hours and 15 minutes. The slurry was gravity filtered on paper, washed with fresh tetrahydrofuran to cover followed by air drying. The resulting powder was recovered from the filter paper, added to a ceramic dish, and dried in a vacuum oven for 23 hours 30 minutes at 100° C. The resulting product was a reddish brown colored powder (1.35 grams).

TGA of a sample (5.4100 milligrams) was completed using the method of Example 1. Onset to Td, end of Td, and volatiles (% weight) lost up to onset to Td after prehold at 150° C. for 60 minutes were 216.66° C., 250.23° C., and 5.35% weight, respectively. DSC analysis of a sample (14.6 milligrams) was completed using the method of Example 1 from with no events detected in the second analysis. The reaction was repeated with a two-fold scale-up. TGA of a sample (3.7450 milligrams) gave an onset to Td, end of Td, and volatiles (% weight) lost up to onset to Td after prehold at 150° C. for 60 minutes of 217.65° C., 260.56° C., and 5.67% weight, respectively. DSC analysis of a sample (12.8 milligrams) completed detected no events in the second analysis.

Example 26

Epoxidation of Phenyl Terminated Hydroxy Functional Troger's Base Copolymer

Reaction Stoichiometry: 1) Phenyl terminated hydroxy functional Troger's base copolymer from Example 21 (160.154 grams per mole repeat unit), 1.00 gram (nominal 6.24 hydroxy milliequivalents). 2) Epichlorohydrin >99%, 28.88 grams (0.312 mole). 3) Isopropanol, 15.55 grams (35% weight of epichlorohydrin plus isopropanol). 4) Deionized (DI) water, 2.51 grams (8% weight of epichlorohydrin plus DI water). 5) Sodium hydroxide, 98%, 0.225 gram (5.625 millimoles) dissolved in 0.9 gram DI water. 6) Sodium hydroxide, 98%, 0.10 gram (2.50 millimoles) dissolved in 0.4 gram DI water.

Phenyl terminated hydroxy functional Troger's base copolymer from Example 21, epichlorohydrin isopropanol, and DI water were added to a glass reactor equipped with overhead nitrogen inlet (0.5 liter per minute), magnetic stirring, chilled (0° C. condenser), thermometer, and a thermostatically controlled heating mantle. Stirring commenced to give a solution followed by heating to 52° C. Aqueous sodium hydroxide solution from 5) above was added to the dark brown colored solution. After 4 minutes a brown colored slurry formed. After a cumulative 20 minutes aqueous sodium hydroxide solution from 6) above was added to the dark brown colored 51° C. slurry. After 15 minutes the brown colored 50° C. slurry was cooled by removing the heating mantle and directing a pair of fans on the reactor exterior. The 25° C. slurry was gravity filtered on paper, and the recovered amber colored filtrate added to a separatory funnel along with DI water (10 milliliters) and washed. The amber colored filtrate was rotary evaporated using a maximum oil bath temperature of 60° C., then dried in the vacuum oven for 24 hours at 50° C. to provide 0.53 gram of glistening amber colored powder. The solids on the filter paper were washed with DI water to cover, air dried, then dried in the vacuum oven for 24 hours at 50° C. to provide 0.75 gram of light brown colored powder.

TGA of a portion (6.0720 milligrams) of the 0.53 gram of soluble product was completed using the method of Example 1. Onset to Td, end of Td, and volatiles (% weight) lost up to onset to Td after prehold at 150° C. for 60 minutes were 198.58° C., 238.73° C., and 7.77% weight, respectively. DSC analysis of a sample (8.90 milligrams) was completed using the method of Example 1 from 0° C. to 250° C. demonstrating a broad exothermic self-curing peak with an 86.15° C. onset to cure, a 173.48° C. temperature at the exothermic maximum, a 222.61° C. end of cure, and 178.3 joules per gram enthalpy. DSC analysis detected no events in the second analysis. TGA of a portion (4.0000 milligrams) of the 0.75 gram insoluble (self-crosslinked) product was completed using the method of Example 1. Onset to Td, end of Td, and volatiles (% weight) lost up to onset to Td after prehold at 150° C. for 60 minutes were 301.67° C., 395.44° C., and 2.38% weight, respectively. DSC analysis of a sample (8.90 milligrams) was completed using the method of Example 1 from 0° C. to 250° C. demonstrating a residual exothermic self-curing peak with a 92.68° C. onset to cure, a 129.57° C. temperature at the exothermic maximum, a 183.86° C. end of cure, and 13.28 joules per gram enthalpy. DSC analysis detected no events in the second analysis.

MALDI MS confirmed the structure as the phenyl terminated glycidyloxy functional Troger's base copolymer. Specifically, structure 1-2 was observed where m/z of 282.2 (n=0) for the phenyl terminated hydroxy functional Troger's base copolymer from Example 21 gave peaks at m/z=338.2 (exact mass=338.18630) and 394.2. Structure 1-3 was observed where m/z of 296.2 (n=0) for the phenyl terminated hydroxy functional Troger's base copolymer from Example 21 gave a peak at m/z=352.2. Structure 2-0 was observed where m/z of 296.2 (n=1) for the phenyl terminated hydroxy functional Troger's base copolymer from Example 21 gave peaks at m/z=439.2 and 495.2. Each of these increases in m/z were 56 Dalton demonstrating conversion of phenolic hydroxy groups to glycidyloxy groups. Additional peaks were observed when mass increased by 56 Dalton, for example m/z=366.2 and m/z=422.2.

Example 27

Epoxidation of Phenyl Terminated Hydroxy Functional Troger's Base Copolymer Using Milder Reaction Conditions Reaction Stoichiometry: 1) Phenyl terminated hydroxy functional Troger's base copolymer from Example 21 (160.154 grams per mole repeat unit), 1.50 gram (nominal 9.37 hydroxy milliequivalents). 2) Epichlorohydrin >99%, 43.37 grams (0.469 mole). 3) Isopropanol, 23.35 grams (35% weight of epichlorohydrin plus isopropanol). 4) Deionized (DI) water, 3.77 grams (8% weight of epichlorohydrin plus DI water). 5) Sodium hydroxide, 98%, 0.49 gram (12.25 millimoles) dissolved in 1.95 grams DI water.

The method of Example 26 was repeated but with heating to only 40° C. before addition of the aqueous sodium hydroxide solution. After 10 minutes the brown colored 40° C. slurry was gravity filtered on paper, and the recovered amber colored filtrate added to a separatory funnel along with DI water (15 milliliters), washed, then dried over a bed of granular anhydrous sodium sulfate, and passed through a medium fritted glass funnel. The amber colored filtrate was rotary evaporated using a maximum oil bath temperature of 50° C., then dried in the vacuum oven for 24 hours at 50° C. to provide 0.50 gram of amber colored powder. The solids on the filter paper were discarded. DSC analysis of a portion (7.80 milligrams) of the 0.50 gram of soluble product was completed using the method of Example 1 from 0° C. to 250° C. demonstrating a sharp exothermic self-curing peak with an 67.79° C. onset to cure, a 128.68° C. temperature at the exothermic maximum, a 196.26° C. end of cure (tailing of the sharp peak was noted commencing at 138° C.), and 263.8 joules per gram enthalpy. DSC analysis detected no events in the second analysis.

Example 28

Epoxidation of Phenol Terminated Troger's Base Copolymer

Reaction Stoichiometry: 1) Phenol terminated Troger's base copolymer from Example 24, 1.00 gram (nominal 3.17 hydroxy milliequivalents). 2) Epichlorohydrin >99%, 29.34 grams (0.317 mole). 3) Isopropanol, 15.8 grams (35% weight of epichlorohydrin plus isopropanol). 4) Deionized (DI) water, 2.55 grams (8% weight of epichlorohydrin plus DI water). 5) Sodium hydroxide, 98%, 0.164 gram (4.10 millimoles) dissolved in 0.66 gram DI water.

Phenol terminated Troger's base copolymer from Example 24, epichlorohydrin isopropanol, and DI water were added to a glass reactor equipped with overhead nitrogen inlet (0.5 liter per minute), magnetic stirring, chilled (0° C. condenser), thermometer, and a thermostatically controlled heating mantle. Stirring commenced to give an 18° C. solution. Aqueous sodium hydroxide solution from 5) above was added to the orange amber colored solution followed by heating to 52° C. one minute later. After 7 minutes and when 42° C. was achieved, an orange colored slurry formed. After a cumulative 20 minutes of heating, the 51° C. slurry was cooled by removing the heating mantle and directing a pair of fans on the reactor exterior. The 25° C. slurry was gravity filtered on paper, and the recovered amber colored filtrate added to a separatory funnel along with DI water (10 milliliters) and washed. The amber colored filtrate was rotary evaporated using a maximum oil bath temperature of 60° C., then dried in the vacuum oven for 24 hours at 50° C. to provide 0.12 gram of glistening gold colored powder. The solids on the filter paper were washed with DI water to cover, air dried, then dried in the vacuum oven for 24 hours at 50° C. to provide 0.76 gram of light tan colored powder.

TGA of a portion (6.0720 milligrams) of the 0.12 gram of soluble product was completed using the method of Example 1. Onset to Td, end of Td, and volatiles (% weight) lost up to onset to Td after prehold at 150° C. for 60 minutes were 291.90° C., 266.24° C., and 6.33% weight, respectively. DSC analysis of a sample (12.30 milligrams) was completed using the method of Example 1 from 0° C. to 275° C. demonstrating an exothermic self-curing peak with a leading edge shoulder with an 88.47° C. onset to cure, a 180.12° C. temperature at the exothermic maximum, a 227.21° C. end of cure, and 175.9 joules per gram enthalpy. DSC analysis detected no events in the second analysis. TGA of a portion (4.0000 milligrams) of the 0.76 gram insoluble (self-crosslinked) product was completed using the method of Example 1. Onset to Td and volatiles (% weight) lost up to onset to Td after prehold at 150° C. for 60 minutes were 238.60° C. and 3.80% weight, respectively. DSC analysis of a sample (8.30 milligrams) was completed using the method of Example 1 from 0° C. to 275° C. demonstrating a residual exothermic self-curing peak with a 96.27° C. onset to cure, a 124.29° C. temperature at the exothermic maximum, a 181.72° C. end of cure, and 8.30 joules per gram enthalpy. DSC analysis detected no events in the second analysis.

MALDI MS confirmed the structure as the phenylglycidyloxy terminated Troger's base copolymer, with the following proposed structure detected:

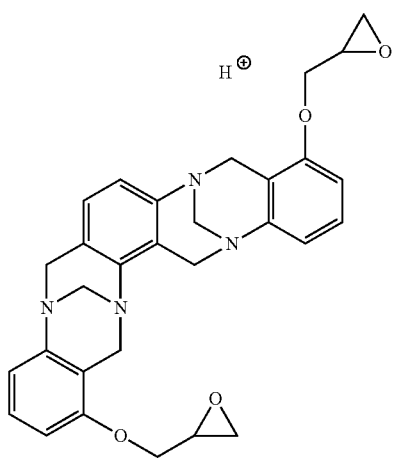

Chemical Formula: $C_{30}H_{31}N_4O_4^+$
Exact Mass: 511.23398

Additional peaks were observed at m/z=655.4 and m/z=799.5 where mass increased by 144.16 Dalton, the mass of the copolymer repeat unit.

Example 29

Thermosetting of Phenyl Terminated Glycidyloxy Functional Troger's Base Copolymer and Phenyl Terminated Hydroxy Functional Troger's Base Copolymer Phenyl terminated hydroxyl functional Troger's base copolymer from Example 21, 0.0357 gram (nominal 0.223 hydroxy milliequivalent) and phenyl terminated glycidyloxy functional Troger's base copolymer from Example 26 (the soluble product), 0.0482 gram (nominal 0.223 epoxide milliequivalent) were weighed into an agate mortar and ground to a very fine homogeneous powder. TGA of a portion (11.2700 milligrams) was completed using the method of Example 1. Onset to Td and volatiles (% weight) lost up to onset to Td after prehold at 150° C. for 60 minutes were 210.55° C. and 14.45% weight, respectively. DSC analysis of a sample (15.60 milligrams) was completed using the method of Example 1 from 0° C. to 250° C. demonstrating a pair of exothermic peaks. The first peak had a 113.11° C. onset to cure, a 143.36° C. temperature at the exothermic maximum, and a 173.33° C. end of cure. The second peak had a 173.33° C. onset to cure beginning before the first peak returned to baseline, a 194.60° C. temperature at the exothermic maximum, a 226.40° C. end of cure, with 219.5 joules per gram enthalpy for the pair of peaks. DSC analysis detected no events in the second analysis.

Example 30

Thermosetting of Unmixed Phenyl Terminated Glycidyloxy Functional Troger's Base Copolymer with Diethylenetriamine Diethylenetriamine, 99%, (20.6288 amine hydrogen equivalent weight), 0.0005 gram (0.024 amine hydrogen milliequivalent) was weighed into an aluminum DSC pan followed by phenyl terminated glycidyloxy functional Troger's base copolymer from Example 26 (the soluble product), 0.0052 gram (nominal 0.024 epoxide milliequivalent). The unmixed sample was immediately sealed and subjected to DSC analysis using the method of Example 1 from 0° C. to 250° C. demonstrating an exothermic curing peak with a leading edge shoulder and a trailing edge shoulder and a 54.45° C. onset to cure, a 139.26° C. temperature at the exothermic maximum, a 215.04° C. end of cure, and 279.4 joules per gram enthalpy. DSC analysis detected no events in the second analysis.

Example 31

Thermosetting of a Mixed Phenyl Terminated Glycidyloxy Functional Troger's Base Copolymer with Diethylenetriamine Diethylenetriamine, 99%, (20.6288 amine hydrogen equivalent weight), 0.0020 gram (0.097 amine hydrogen milliequivalent) was weighed into a glass vial followed by phenyl terminated glycidyloxy functional Troger's base copolymer from Example 26 (the soluble product), 0.021 gram (nominal 0.097 epoxide milliequivalent). The sample was immediately mixed to a homogeneous paste and a portion (10.20 milligrams) subjected to DSC analysis using the method of Example 1 from 0° C. to 270° C. demonstrating an exothermic curing peak with a leading edge shoulder and a trailing edge shoulder and a 53.13° C. onset to cure, a 138.88° C. temperature at the exothermic maximum, a 218.07° C. end of cure, and 289.3 joules per gram enthalpy. DSC analysis detected no events in the second analysis.

Example 32

Thermosetting of Unmixed Phenyl Terminated Glycidyloxy Functional Troger's Base Copolymer with Increased Diethylenetriamine Stoichiometry Diethylenetriamine, 99%, (20.6288 amine hydrogen equivalent weight), 0.0016 gram (0.0776 amine hydrogen milliequivalent) was weighed into an aluminum DSC pan followed by phenyl terminated glycidyloxy functional Troger's base copolymer from Example 26 (the soluble product), 0.0084 gram (nominal 0.0389 epoxide milliequivalent). The unmixed sample was immediately sealed and subjected to DSC analysis using the method of Example 1 from 0° C. to 270° C. demonstrating an exothermic curing peak with a leading edge shoulder and a 14.83° C. onset to cure, a 137.59° C. temperature at the exothermic maximum, a 213.52° C. end of cure, and 303.3 joules per gram enthalpy. DSC analysis detected no events in the second analysis.

Example 33

Thermosetting of Unmixed Phenylglycidyloxy Terminated Troger's Base Copolymer with Diethylenetriamine Diethylenetriamine, 99%, (20.6288 amine hydrogen equivalent weight), 0.0004 gram (0.0193 amine hydrogen milliequivalent) was weighed into an aluminum DSC pan followed by phenylglycidyloxy terminated Troger's base copolymer from Example 28 (the soluble product), 0.0061 gram (nominal 0.0193 epoxide milliequivalent). The unmixed sample was immediately sealed and subjected to DSC analysis using the method of Example 1 from 0° C. to 270° C. demonstrating 3 exothermic peaks. The first peak had a 39.86° C. onset to cure, a 69.72° C. temperature at the exothermic maximum, and a 99.77° C. end of cure, with an enthalpy of 7.42 joules per gram. The second peak had a 122.14° C. onset to cure, a 172.98° C. temperature at the exothermic maximum, a 220.12° C. end of cure, with 76.42 joules per gram enthalpy. The third peak had a 220.12° C. onset to cure, a 234.23° C. temperature at the exothermic maximum, a 254.85° C. end of cure, with 31.20 joules per gram enthalpy. DSC analysis detected no events in the second analysis.

Example 34

Condensation of 4-isopropylaniline and 2,4-diaminophenol Dihydrochloride with Paraformaldehyde in Trifluoroacetic Acid at Room Temperature Reaction Stoichiometry: 1) 4-Isopropylaniline, 98%, 1.24 grams (9.171 millimoles). 2) 2,4-Diaminophenol dihydrochloride, 98%, 6.00 grams (30.448 millimoles). 3) Paraformaldehyde, >88%, 4.21 grams (0.1402 mole). 4) Trifluoroacetic acid (TFA), 99.8% actual GC purity on COA, 60 milliliters used.

4-Isopropylaniline, 2,4-diaminophenol dihydrochloride, and paraformaldehyde were weighed under dry nitrogen into a 4 ounce glass bottle along with a magnetic stirring bar. TFA was added with magnetic stirring forming a gray green colored slurry and the bottle was sealed. After stirring for 20 minutes, a brown colored slurry formed. After stirring for a cumulative 71 hours 27 minutes, the amber colored solution was transferred to a 1 liter glass beaker containing ice to the 200 milliliter mark then stirred followed by pH adjustment from 0-1 to 7 with 20% weight aqueous sodium hydroxide then back to pH=4 with addition of concentrated aqueous hydrochloric acid. The product was recovered by gravity filtration on paper, washed with DI water to cover, and air dried overnight. The resulting damp solid was recovered (13.09 grams) from the filter paper, added to a ceramic dish, and dried in a vacuum oven for 2 hours 45 minutes at 100° C. The solid was added to a 2 ounce glass bottle along with a magnetic stirring bar and acetone (25 milliliters) and stirred for 76 hours 55 minutes. The slurry was gravity filtered on paper, washed with fresh acetone to cover followed by air drying. The resulting powder was recovered from the filter paper, added to a ceramic dish, and dried in a vacuum oven for 18 hours 15 minutes at 100° C. The resulting product was a brown colored powder (3.67 grams).

TGA of a sample (3.0260 milligrams) was completed using the method of Example 1. Onset to Td, end of Td, and volatiles (% weight) lost up to onset to Td after prehold at 150° C. for 60 minutes were 224.06° C., 250.23° C., and 4.38% weight, respectively. DSC analysis of a sample (15.8 milligrams) was completed using the method of Example 1 from 0° C. to 190° C. with no events detected in the second analysis.

Example 35

Condensation of 4-isopropylaniline and 2,4-diaminophenol Dihydrochloride with Paraformaldehyde in Trifluoroacetic Acid at 70° C.

The reaction stoichiometry of Example 34 was used. The reactants were added to a glass reactor in a glove box under a nitrogen atmosphere, equipped with magnetic stirring, a forced air cooled spiral condenser, thermometer, and a thermostatically controlled heating mantle. Stirring commenced to give a 24.2° C. slurry followed by heating to 70° C. 12 minutes later. After 33 minutes and when 62.9° C. was achieved, a brown colored slurry formed. After stirring at 70-71.6° C. for a cumulative 73 hours 22 minutes, the amber colored solution cooled to 25° C. then work-up completed using the method of Example 34. The damp solid recovered weighed 13.57 grams and the dry final product was a brown colored powder weighing 5.13 grams. TGA of a sample (5.3920 milligrams) was completed using the method of Example 1. Onset to Td, end of Td, and volatiles (% weight) lost up to onset to Td after prehold at 150° C. for 60 minutes were 215.98° C., 251.43° C., and 4.26% weight, respectively. DSC analysis of a sample (11.9 milligrams) was completed using the method of Example 1 from 0° C. to 190° C. with no events detected in the second analysis.

Example 36

Condensation of 4-isopropylaniline and 2,4-diaminophenol Dihydrochloride with Paraformaldehyde in Trifluoroacetic Acid Synthesized at Room Temperature Using Increased 4-isopropylaniline Stoichiometry Reaction Stoichiometry: 1) 4-Isopropylaniline, 98%, 1.22 grams (9.023 millimoles). 2) 2,4-Diaminophenol dihydrochloride, 98%, 4.14 grams (21.009 millimoles). 3) Paraformaldehyde, >88%, 3.06 grams (0.1019 mole). 4) Trifluoroacetic acid (TFA), 99.8% actual GC purity on COA, 120 milliliters used.

The method of Example 34 was used. After stirring for a cumulative 117 hours 22 minutes, the amber colored solution was transferred to a 1 liter glass beaker containing ice to the 300 milliliter mark then stirred followed by pH adjustment from 0-1 to 4 with 20% weight aqueous sodium hydroxide. The product was recovered by gravity filtration on paper, washed with DI water to cover, and air dried overnight. The damp solid was recovered (25.88 grams) from the filter paper, added to a ceramic dish, and dried in a vacuum oven for 23 hours 24 minutes at 50° C. The resulting product was a brown colored powder (3.72 grams). TGA of a sample (5.2300 milligrams) was completed using the method of Example 1. Onset to Td, end of Td, and volatiles (% weight) lost up to onset to Td after prehold at 150° C. for 60 minutes were 211.08° C., 261.39° C., and 12.48% weight, respectively. DSC analysis of a sample (10.5 milligrams) was completed using the method of Example 1 with no events detected in the second analysis.

Example 37

Condensation of 4-isopropylaniline and 2,4-diaminophenol Dihydrochloride with Paraformaldehyde in Trifluoroacetic Acid Synthesized at 70° C. Using Increased 4-isopropylaniline Stoichiometry The reaction stoichiometry of Example 36 was used. The method of Example 35 was used. After stirring at 70-70.1° C. for a cumulative 118 hours 29 minutes, the amber colored solution cooled to 25° C. then work-up completed using the method of Example 14. The damp solid was recovered (24.32 grams) from the filter paper, added to a ceramic dish, and dried in a vacuum oven for 20 hours 51 minutes at 50° C. The resulting product was a light brown colored powder (4.97 grams). The product was dried in the vacuum oven for an additional 24 hours at 100° C. TGA of a sample (4.2740 milligrams) was completed using the method of Example 1. Onset to Td, end of Td, and volatiles (% weight) lost up to onset to Td after prehold at 150° C. for 60 minutes were 210.96° C., 252.34° C., and 7.31% weight, respectively. DSC analysis of a sample (12.5 milligrams) was completed using the method of Example 1 with no events detected in the second analysis.

Example 38

Condensation of 4-isopropylaniline and 2,4-diaminophenol Dihydrochloride with Paraformaldehyde in Trifluoroacetic Acid Synthesized at Room Temperature with Further Increase in 4-isopropylaniline Stoichiometry Reaction Stoichiometry: 1) 4-Isopropylaniline, 98%, 2.46 grams (18.194 millimoles). 2) 2,4-Diaminophenol dihydrochloride, 98%, 4.14 grams (21.009 millimoles). 3) Paraformaldehyde, ≥88%, 3.60 grams (0.1199 mole). 4) Trifluoroacetic acid (TFA), 99.8% actual GC purity on COA, 120 milliliters.

The method of Example 36 was used. Reaction time was 117 hours 42 minutes. The damp solid was recovered (23.99 grams) from the filter paper, added to a ceramic dish, and dried in a vacuum oven for 24 hours 15 minutes at 50° C. The resulting product was a light tan brown colored powder (6.33 grams). TGA of a sample (4.1360 milligrams) was completed using the method of Example 1. Onset to Td, end of Td, and volatiles (% weight) lost up to onset to Td after prehold at 150° C. for 60 minutes were 202.89° C., 264.21° C., and 14.57% weight, respectively. DSC analysis of a sample (11.2 milligrams) was completed using the method of Example 1 with no events detected in the second analysis.

Example 39

Condensation of 4-isopropylaniline and 2,4-diaminophenol Dihydrochloride with Paraformaldehyde in Trifluoroacetic Acid Synthesized at 70° C. with Further Increase in 4-isopropylaniline Stoichiometry The reaction stoichiometry of Example 38 was used. The method of Example 37 was used. After stirring at 70-71.6° C. for a cumulative 119 hours 30 minutes, the amber colored solution cooled to 25° C. then work-up completed using the method of Example 34. The damp solid recovered weighed 35.64 grams and the dry final product was a dark brown colored powder weighing 8.26 grams. TGA of a sample (4.3050 milligrams) was completed using the method of Example 1. Onset to Td, end of Td, and volatiles (% weight) lost up to onset to Td after prehold at 150° C. for 60 minutes were 199.05° C., 261.35° C., and 10.76% weight, respectively. DSC analysis of a sample (10.7 milligrams) was completed using the method of Example 1 with no events detected in the second analysis.

Example 40

Quaternization in Dimethylsulfoxide of Isopropylphenyl Terminated Hydroxy Functional Troger's Base Copolymer Synthesized at Room Temperature Reaction Stoichiometry: 1) Isopropylphenyl terminated hydroxy functional Troger's base copolymer from Example 34, 2.00 grams (nominal 12.488 hydroxy milliequivalent based on a 160.154 gram/mole repeat unit). 2) Iodomethane, 99.5%, 36.61 grams (0.2579 mole). 3) Dimethylsulfoxide (DMSO), 99.9+%, anhydrous, 40 milliliters.

The isopropylphenyl terminated hydroxy functional Troger's base copolymer, DMSO and iodomethane were weighed under dry nitrogen into a 4 ounce glass bottle along with a magnetic to stirring bar. The bottle was sealed and stirring commenced for 118 hours 27 minutes. The resultant dark amber colored slurry was vacuum filtered over a medium fritted glass funnel to remove co-produced trimethylsulfoxonium iodide. DI water (80 milliliters) was added to the filtrate solution precipitating a black solid which was dried in the vacuum oven at 50° C. for 21 hours 5 minutes then at 100° C. for 20 hours 10 minutes. The resulting product was a brown colored powder (2.60 grams). TGA of a sample (5.9290 milligrams) was completed using the method of Example 1. Onset to Td and volatiles (% weight) lost up to onset to Td after prehold at 150° C. for 60 minutes were 216.67° C. and 6.23% weight, respectively. DSC analysis of a sample (14.5 milligrams) was completed using the method of Example 1 with no events detected in the second analysis. Both MALDI MS and pyrolysis GC/MS of a hydroxy functional Troger's base co-polymer standard (with no isopropylphenyl terminating groups) which had been quaternized using with iodomethane in DMSO and the aforementioned reaction conditions versus the non-quaternized hydroxy functional Troger's base copolymer confirmed conversion to the quaternized product. Specifically, for the quaternized hydroxy functional Troger's base copolymer, the 650° C. pyrolysis gas chromatograms demonstrate substantially enhanced fragment peaks at 11.25 minutes with m/z=133, 12.11 and 12.70 minutes both with m/z=147, all resulting from quaternization, concurrent with disappearance of fragment peaks at 14.73 minutes with m/z=148, and 15.25, 15.89, and 16.36 minutes, all characteristic of the non-quaternized hydroxy functional Troger's base copolymer

Example 41

Quaternization in Acetonitrile of Isopropylphenyl Terminated Hydroxy Functional Troger's Base Copolymer Synthesized at Room Temperature Reaction Stoichiometry: 1) Isopropylphenyl terminated hydroxy functional Troger's base copolymer from Example 34, 1.71 grams (nominal 10.677 hydroxy milliequivalent based on a 160.154 gram/mole repeat unit). 2) Iodomethane, 99.5%, 31.36 grams (0.2209 mole). 3) Acetonitrile (ACN), 99.9%, anhydrous, 77 milliliters.

The isopropylphenyl terminated hydroxyl functional Troger's base copolymer, ACN and iodomethane were weighed under dry nitrogen into a 4 ounce glass bottle along with a magnetic stirring bar. The bottle was sealed and stirring commenced for 141 hours 32 minutes. The resultant brown colored slurry was vacuum filtered over a medium fitted glass funnel and the powder on the funnel washed with ACN to cover. The damp powder (3.97 grams) was recovered from the funnel, placed in a ceramic dish and dried in the vacuum oven at 100° C. for 52 hours 30 minutes. The resulting product was a brown colored powder (1.88 grams). TGA of a sample (5.0640 milligrams) was completed using the method of Example 1. Onset to Td and volatiles (% weight) lost up to onset to Td after prehold at 150° C. for 60 minutes were 194.64° C. and 9.72% weight, respectively. DSC analysis of a sample (12.1 milligrams) was completed with no events detected in the second analysis. Both MALDI MS and pyrolysis GC/MS of a hydroxy functional Troger's base co-polymer standard (with no isopropylphenyl terminating groups) which had been quaternized using with iodomethane in ACN and the aforementioned reaction conditions versus the non-quaternized hydroxy functional Troger's base copolymer confirmed conversion to the quaternized product.

Example 42

Quaternization in Dimethylsulfoxide of Isopropylphenyl Terminated Hydroxy Functional Troger's Base Copolymer Synthesized at 70° C.

Reaction Stoichiometry: 1) Isopropylphenyl terminated hydroxy functional Troger's base copolymer from Example 35, 2.00 grams (nominal 12.488 hydroxy milliequivalent based on a 160.154 gram/mole repeat unit). 2) Iodomethane, 99.5%, 37.34 grams (0.2631 mole). 3) DMSO, 99.9+%, anhydrous, 40 milliliters.

The isopropylphenyl terminated hydroxyl functional Troger's base copolymer, DMSO and iodomethane were weighed under dry nitrogen into a 4 ounce glass bottle along with a magnetic stirring bar. The bottle was sealed and stirring commenced for 119 hours 18 minutes, followed by work-up completed using the method of Example 40. The resulting product was a brown colored powder (2.94 grams). TGA of a sample (5.8160 milligrams) was completed using the method of Example 1. Onset to Td and volatiles (% weight) lost up to onset to Td after prehold at 150° C. for 60 minutes were 204.04° C. and 5.63% weight, respectively. DSC analysis of a sample (11.1 milligrams) was completed using the method of Example 1 with no events detected in the second analysis.

Example 43

Quaternization in Acetonitrile of Isopropylphenyl Terminated Hydroxy Functional Troger's Base Copolymer Synthesized at 70° C.

Reaction Stoichiometry: 1) Isopropylphenyl terminated hydroxy functional Troger's base copolymer from Example 35, 2.00 grams (nominal 12.488 hydroxy milliequivalent based on a 160.154 gram/mole repeat unit). 2) Iodomethane, 99.5%, 35.80 grams (0.2522 mole). 3) ACN, 99.9%, anhydrous, 90 milliliters.

The isopropylphenyl terminated hydroxy functional Troger's base copolymer, ACN and iodomethane were weighed under dry nitrogen into a 4 ounce glass bottle along with a magnetic stirring bar. The bottle was sealed and stirring commenced for 141 hours 52 minutes, followed by work-up completed using the method of Example 41. The damp powder (3.08 grams) was recovered from the funnel, placed in a ceramic dish and dried in the vacuum oven at 100° C. for 52 hours 30 minutes. The resulting product was a brown colored powder (1.57 grams). TGA of a sample (5.0640 milligrams) was completed using the method of Example 1. Onset to Td and volatiles (% weight) lost up to onset to Td after prehold at 150° C. for 60 minutes were 190.49° C. and 9.67% weight, respectively. DSC analysis of a sample (10.6 milligrams) was completed using the method of Example 1 with no events detected in the second analysis.

Example 44

Quaternization in Acetonitrile of Isopropylphenyl Terminated Hydroxy Functional to Troger's Base Copolymer Synthesized at Room Temperature Using Increased 4-Isopropylaniline stoichiometry Reaction Stoichiometry: 1) Isopropylphenyl terminated hydroxy functional Troger's base copolymer from Example 36, 0.65 gram (nominal 4.059 hydroxy milliequivalent based on a 160.154 gram/mole repeat unit). 2) Iodomethane, 99.5%, 12.04 grams (0.0848 mole). 3) ACN, 99.9%, anhydrous, 30 milliliters.

The isopropylphenyl terminated hydroxyl functional Troger's base copolymer, ACN and iodomethane were weighed under dry nitrogen into a 4 ounce glass bottle along with a magnetic stirring bar. The bottle was sealed and stirring commenced for 140 hours 42 minutes, followed by work-up completed using the method of Example 41. The damp powder (1.19 grams) was recovered from the funnel, placed in a ceramic dish and dried in the vacuum oven at 100° C. for 52 hours 30 minutes. The resulting product was a brown colored powder (0.52 gram). TGA of a sample (3.4790 milligrams) was completed using the method of Example 1. Onset to Td and volatiles (% weight) lost up to onset to Td after prehold at 150° C. for 60 minutes were 191.22° C. and 13.61% weight, respectively. DSC analysis of a sample (11.5 milligrams) was completed using the method of Example 1 with no events detected in the second analysis.

Example 45

Quaternization in Dimethylsulfoxide of Isopropylphenyl Terminated Hydroxy Functional Troger's Base Copolymer Synthesized at Room Temperature with Further Increase in 4-isopropylaniline Stoichiometry Reaction Stoichiometry: 1) Isopropylphenyl terminated hydroxy functional Troger's base copolymer from Example 38, 2.00 grams (nominal 12.488 hydroxy milliequivalent based on a 160.154 gram/mole repeat unit). 2) Iodomethane, 99.5%, 36.93 grams (0.2602 mole). 3) Dimethylsulfoxide (DMSO), 99.9+%, anhydrous, 40 milliliters.

The isopropylphenyl terminated hydroxyl functional Troger's base copolymer, DMSO and iodomethane were weighed under dry nitrogen into a 4 ounce glass bottle along with a magnetic stirring bar. The bottle was sealed and stirring commenced for 169 hours 8 minutes, followed by work-up completed using the method of Example 40. The resulting product was a brown colored powder (2.07 grams). TGA of a sample (5.3250 milligrams) was completed using the method of Example 1. Onset to Td and volatiles (% weight) lost up to onset to Td after prehold at 150° C. for 60 minutes were 194.66° C. and 12.92% weight, respectively. DSC analysis of a sample (11.Q milligrams) was completed using the method of Example 1 with no events detected in the second analysis.

Example 46

Condensation of 4-isopropylaniline and 2,4-diaminobenzenesulfonic Acid with Paraformaldehyde in Trifluoroacetic Acid at Room Temperature Reaction Stoichiometry: 1) 4-Isopropylaniline, 98%, 1.22 grams (9.023 millimoles). 2) 2,4-Diaminobenzenesulfonic acid, ≥98%, 3.95 grams (20.988 millimoles). 3) Paraformaldehyde, ≥88%, 3.06 grams (0.1019 mole). 4) Trifluoroacetic acid (TFA), 99.8% actual GC purity on COA, 60 milliliters used.

4-Isopropylaniline, 2,4-diaminobenzenesulfonic acid, and paraformaldehyde were weighed under dry nitrogen into a 2 ounce glass bottle along with a magnetic stirring bar. TFA was added with magnetic stirring forming a golden brown colored slurry and the bottle was sealed. After stirring for 45 hours 1 minute, the golden brown colored solution was transferred to a 1 liter glass beaker containing ice to the 300 milliliter mark then stirred followed by pH adjustment from 0-1 to 10 with 20% weight aqueous sodium hydroxide then back to pH=1 with addition of concentrated aqueous hydrochloric acid. The product was recovered by gravity filtration on paper, washed with DI water to cover, and air dried. The resulting damp light orange colored solid was recovered from the filter paper, added to a ceramic dish, and dried in a vacuum oven for 39 hours 17 minutes at 100° C. The resulting product was an orange colored powder (7.05 grams). TGA of a sample (3.8200 milligrams) was completed using the method of Example 1. Onset to Td, end of Td, and volatiles (% weight) lost up to onset to Td after prehold at 150° C. for 60 minutes were 218.22° C., 278.02° C., and 8.95% weight, respectively. DSC analysis of a sample (10.6 milligrams) was completed using the method of Example 1 with no events detected in the second analysis.

Example 47

Thermally Induced Crosslinking of an Isopropylphenyl Terminated Hydroxy Functional Troger's Base Copolymer with 4,4'-oxybis(Benzenesulfonyl Azide)

An isopropylphenyl terminated hydroxy functional Troger's base copolymer synthesized using the method of Example 38 (0.0902 gram) and 4,4'-oxybis(benzenesulfonyl azide) (0.0047 gram) were weighed into a glass vial followed by the addition of tetrahydrofuran (1 milliliter). A homogeneous solution rapidly formed in the sealed vial. After vigorous mixing, the solution was pipetted into an aluminum dish and allowed to partially devolatilize in the vented hood. The aluminum pan was placed into an oven and heated to 185° C. and held therein for 92 minutes. The resultant amber colored thin film was removed from the aluminum dish and a portion added to a clean glass vial along with fresh tetrahydrofuran (1 milliliter) which did not dissolve the film but gradually extracted a yellow color into the solvent. TGA of a sample (3.0780 milligrams) was completed using the method of Example 1. Onset to Td, end of Td, and volatiles (% weight) lost up to onset to Td after prehold at 150° C. for 60 minutes were 218.40° C., 264.31° C., and 5.02% weight, respectively. DSC analysis of a sample (10.7 milligrams) was completed using the method of Example 1 from 0° C. to 190° C. with no events detected in the second analysis.

As a control, a sample of the isopropylphenyl terminated hydroxy functional Troger's base copolymer (0.1030 gram) was weighed into a glass vial followed by the addition of tetrahydrofuran (1 milliliter). The solution was added to an aluminum dish, partially devolatilized, then placed into the oven at the same time as the aforementioned crosslinkable mixture containing 4,4'-oxybis(benzenesulfonyl azide). The resultant amber colored thin film was removed from the aluminum dish and a portion added to a clean glass vial along with fresh tetrahydrofuran (1 milliliter) which immediately dissolved the film.

TGA of a sample (2.9020 milligrams) was completed using the method of Example 1. Onset to Td, end of Td, and volatiles (% weight) lost up to onset to Td after prehold at 150° C. for 60 minutes were 221.76° C., 261.96° C., and 10.38% weight, respectively. DSC analysis of a sample (8.7 milligrams) was completed using the method of Example 1 from 0° C. to 190° C. with no events detected in the second analysis. TGA of a sample (5.9830 milligrams) of the isopropylphenyl terminated hydroxy functional Troger's base copolymer that had not undergone any treatment was completed using the method of Example 1. Onset to Td, end of Td, and volatiles (% weight) lost up to onset to Td after prehold at 150° C. for 60 minutes were 218.46° C., 261.02° C., and 13.28% weight, respectively. DSC analysis of a sample (12.5 milligrams) was completed using the method of Example 1 from 0° C. to 190° C. with no events detected in the second analysis.

Example 48

Condensation of 2,4-diaminoisopropylbenzene Dihydrochloride and 2,4-diaminophenol Dihydrochloride with Paraformaldehyde in Trifluoroacetic Acid at Room Temperature Reaction Stoichiometry: 1) 2,4-Diaminoisopropylbenzene dihydrochloride, 98% 0.51 gram (2.285 millimoles). 2) 2,4-Diaminophenol dihydrochloride, 98%, 2.55 grams (12.940 millimoles). 3) Paraformaldehyde, ≥88%, 1.83 grams (60.947 millimoles). 4) Trifluoroacetic acid (TFA), 99.8% actual GC purity on COA, 40 milliliters used.

2,4-Diaminoisopropylbenzene dihydrochloride, 2,4-diaminophenol dihydrochloride, and paraformaldehyde were weighed under dry nitrogen into a 4 ounce glass bottle along with a magnetic stirring bar. TFA was added with magnetic stirring forming a gray colored slurry and the bottle was sealed. After stirring for 13 minutes, a drab green colored slurry formed. After stirring for a cumulative 100 hours 48 minutes, the amber colored solution was transferred to a 1 liter glass beaker containing ice to the 250 milliliter mark then stirred followed by pH adjustment from 0-1 to 4 with 20% weight aqueous sodium hydroxide. The product was recovered by gravity filtration on paper, washed with DI water to cover, and air dried overnight. The resulting damp solid was recovered (18.39 grams) from the filter paper, added to a ceramic dish, and dried in a vacuum oven at room temperature for 2 hours 1 minute. The solid (3.16 grams) was added to a 2 ounce glass bottle along with a magnetic stirring bar and acetone (20 milliliters) and stirred for 24 hours 20 minutes. The slurry was gravity filtered on paper, washed with fresh acetone to cover followed by air drying. The resulting powder was recovered from the filter paper, added to a ceramic dish, and dried in a vacuum oven for 22 at 100° C. The resulting product was a brown colored powder (1.82 grams). TGA of a sample (8.3550 milligrams) was completed using the method of Example 1. Onset to Td, end of Td, and volatiles (% weight) lost up to onset to Td after prehold at 150° C. for 60 minutes were 237.01° C., 260.13° C., and 2.14% weight, respectively. DSC analysis of a sample (10.6 milligrams) was completed using the method of Example 1 from 0° C. to 190° C. with no events detected in the second analysis.

Example 49

Condensation of 2,4-diaminoisopropylbenzene Dihydrochloride and 2,4-diaminophenol Dihydrochloride with Paraformaldehyde in Trifluoroacetic Acid at 70° C.

The reaction stoichiometry of Example 48 was used. The reactants were added to a glass reactor in a glove box under a nitrogen atmosphere, equipped with magnetic stirring, a forced air cooled spiral condenser, thermometer, and a thermostatically controlled heating mantle. Stirring commenced to give a 18.6° C. slurry followed by heating to 70° C. 10 minutes later. After 2 hours 13 minutes and at 70° C., a red brown colored slurry formed. After stirring at 70° C. for a cumulative 97 hours 52 minutes, the burgundy colored solution cooled to 25° C. then work-up completed using the method of Example 48. The damp solid recovered weighed 10.58 grams and was dried to give 5.29 grams which was extracted with acetone. The dry final product was a dark brown colored powder weighing 1.68 grams. TGA of a sample (4.5230 milligrams) was completed using the method of Example 1. Onset to Td, end of Td, and volatiles (% weight) lost up to onset to Td after prehold at 150° C. for 60 minutes were 221.71° C., 260.13° C., and 3.97% weight, respectively. DSC analysis of a sample (12.4 milligrams) was completed using the method of Example 1 from 0° C. to 190° C. with no events detected in the second analysis.

Example 50

Quaternization in Acetonitrile of Isopropylphenyl and Hydroxy Functional Troger's Base Copolymer Synthesized at Room Temperature Isopropylphenyl terminated hydroxy functional Troger's base copolymer from Example 48 (1.31 grams), ACN (59 milliliters) and iodomethane (25.39 grams) were weighed under dry nitrogen into a 4 ounce glass bottle along with a magnetic stirring bar. The bottle was sealed and stirring commenced for 288 hours 55 minutes. The resultant golden colored slurry was vacuum filtered over a medium fitted glass funnel and the powder on the funnel washed with ACN to cover. The damp powder (3.35 grams) was recovered from the funnel, placed in a ceramic dish and dried in the vacuum oven at 100° C. for 24 hours 3 minutes. TGA of a sample (6.0670 milligrams) was completed using the method of Example 1. Onset to Td and volatiles (% weight) lost up to onset to Td after prehold at 150° C. for 60 minutes were 189.04° C. and 13.18% weight, respectively. DSC analysis of a sample (11.7 milligrams) was completed using the method of Example 1 from 0° C. to 190° C. with no events detected in the second analysis.

Example 51

Quaternization in Acetonitrile of Isopropylphenyl and Hydroxy Functional Troger's Base Copolymer Synthesized at 70° C.

Isopropylphenyl terminated hydroxy functional Troger's base copolymer from Example 49 (1.57 grams), ACN (71 milliliters) and iodomethane (28.84 grams) were weighed under dry nitrogen into a 4 ounce glass bottle along with a magnetic stirring bar. The bottle was sealed and stirring commenced for 288 hours 50 minutes. The resultant brown colored slurry was vacuum filtered over a medium fitted glass funnel and the powder on the funnel washed with ACN to cover. The damp powder (3.36 grams) was recovered from the funnel, placed in a ceramic dish and dried in the vacuum oven at 100° C. for 26 hours 17 minutes. TGA of a sample (7.3060 milligrams) was completed using the method of Example 1. Onset to Td and volatiles (% weight) lost up to onset to Td after prehold at 150° C. for 60 minutes were 191.54° C. and 12.16% weight, respectively. DSC analysis of a sample (10.8 milligrams) was completed using the method of Example 1 from 0° C. to 190° C. with no events detected in the second analysis.

The invention claimed is:

1. A polymer comprising a sub-unit comprising a Troger's base moiety represented by Formula I:

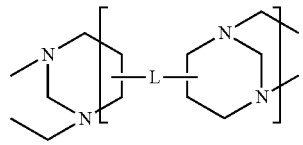

wherein L comprises an arylene group including at least one functional group selected from at least one of: hydroxyl, phosphonic acid, carboxylic acid and sulfonic acid and their corresponding salt or ester; alkynyl, alkynyl ether, cyanate, epoxy and glycidyl ether; and wherein the sub-unit is represented by least one of the following formulae along with their corresponding regioisomers:

Formula IIa

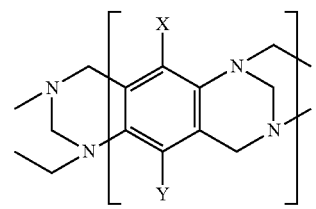

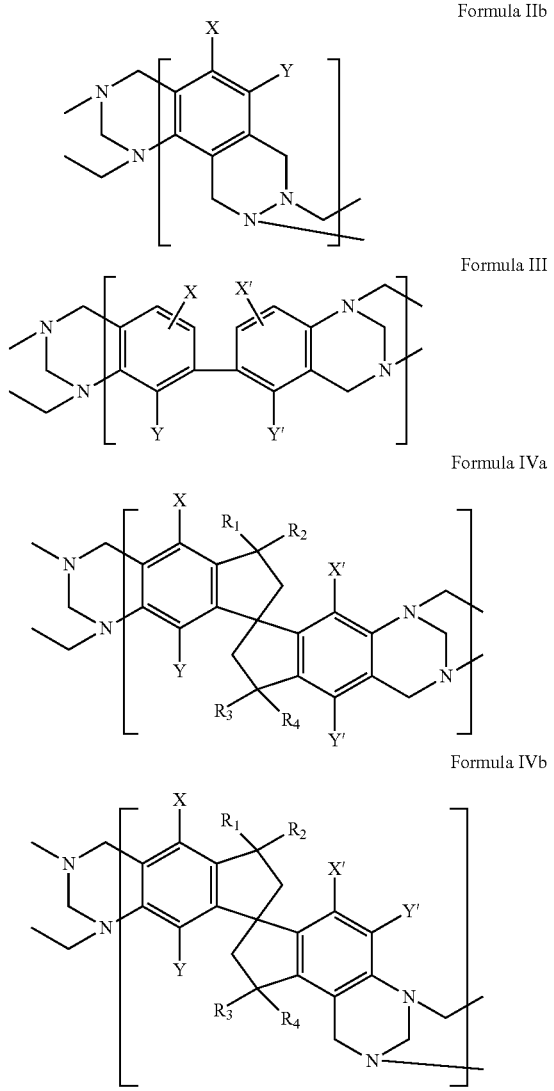

Formula IIb

Formula III

Formula IVa

Formula IVb

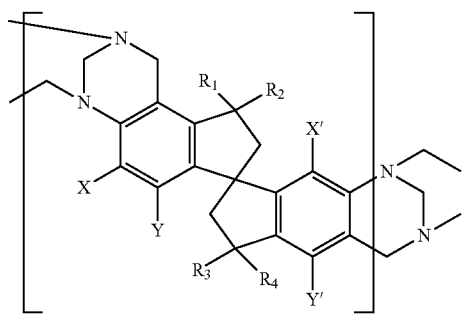

Formula IVc wherein: X and Y, and X' and Y' are independently selected from: phosphonic acid, carboxylic acid and sulfonic acid and their corresponding salt or ester; alkynyl, alkynyl ether, cyanate, hydroxyl and hydrogen; and $R_1$, $R_2$, $R_3$, and $R_4$ are independently selected from alkyl groups comprising from 1 to 6 carbon atoms, and $R_1$ and $R_2$ may collectively form a ketone group or a 9,9'-fluorene group, and $R_3$ and $R_4$ may collectively form a ketone group or a 9,9'-fluorene group.

2. The polymer of claim 1 wherein Formulae IIa, IIb, III, IVa, IVb and IVc represents a repeating unit of the polymer.

3. The polymer of claim 1 wherein two or more different repeat units are incorporated in the form of a copolymer.

4. The polymer of claim 1 wherein one or more substituents X, X', Y and Y' are hydroxyl and at least one or more of the substituents X, X', Y and Y' are hydrogen, and the polymer is covalently crosslinked through diazo-linkages.

5. The polymer of claim 3 wherein one or more substituents X, X', Y' and Y' are hydroxyl and at least one or more of the substituents X, X', Y and Y' are hydrogen, and the polymer is covalently crosslinked through diazo-linkages.

6. The polymer of claim 1 wherein the polymer is covalently crosslinked through at least one of X, X', Y and Y'.

* * * * *